(12) United States Patent
Nakamura

(10) Patent No.: US 11,355,106 B2
(45) Date of Patent: Jun. 7, 2022

(54) INFORMATION PROCESSING APPARATUS, METHOD OF PROCESSING INFORMATION AND STORAGE MEDIUM COMPRISING DOT PER INCH RESOLUTION FOR SCAN OR COPY

(71) Applicant: Yutaka Nakamura, Kanagawa (JP)

(72) Inventor: Yutaka Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 72 days.

(21) Appl. No.: 16/351,629

(22) Filed: Mar. 13, 2019

(65) Prior Publication Data
US 2019/0304453 A1 Oct. 3, 2019

(30) Foreign Application Priority Data

Mar. 30, 2018 (JP) .............................. JP2018-069819
Dec. 28, 2018 (JP) .............................. JP2018-248441

(51) Int. Cl.
| | | |
|---|---|---|
| G03G 15/00 | (2006.01) | |
| G06F 3/12 | (2006.01) | |
| G10L 15/22 | (2006.01) | |
| G10L 15/26 | (2006.01) | |

(52) U.S. Cl.
CPC .............. *G10L 15/22* (2013.01); *G10L 15/26* (2013.01); *G06F 3/1292* (2013.01); *G10L 2015/223* (2013.01)

(58) Field of Classification Search
CPC ... G03G 15/5016; G10L 15/265; G10L 17/22; G10L 15/30; G06K 9/2063; G06F 3/0482; G06F 3/1292
USPC .................. 704/275, 272, 246, 270; 455/411
See application file for complete search history.

(56) References Cited

U.S. PATENT DOCUMENTS

| | | | | |
|---|---|---|---|---|
| 6,253,184 | B1 * | 6/2001 | Ruppert | G03G 15/5016 704/272 |
| 6,865,284 | B2 * | 3/2005 | Mahoney | G06K 9/2063 283/72 |
| 2003/0218642 | A1 | 11/2003 | Sakayori et al. | |
| 2006/0009980 | A1 * | 1/2006 | Burke | G10L 15/30 704/270 |
| 2007/0061150 | A1 * | 3/2007 | Sawano | G10L 15/265 704/275 |

(Continued)

FOREIGN PATENT DOCUMENTS

| | | |
|---|---|---|
| JP | 2003-323081 | 11/2003 |
| JP | 2014-203024 | 10/2014 |
| JP | 2016-063415 | 4/2016 |

*Primary Examiner* — Farzad Kazeminezhad
(74) *Attorney, Agent, or Firm* — Harness, Dickey & Pierce, P.L.C.

(57) ABSTRACT

An information processing apparatus includes circuitry configured to acquire audio information to be used for operating a target apparatus, recognize the audio information, obtain specific instruction information indicating specific information processing to be instructed to the target apparatus based on a recognition result of the acquired audio information, convert the specific instruction information into specific operation execution information described in an information format interpretable by the target apparatus, and output the specific operation execution information to the target apparatus.

11 Claims, 30 Drawing Sheets

(56) References Cited

U.S. PATENT DOCUMENTS

2007/0168190 A1* 7/2007 Itagaki .................. G10L 17/22
                                                        704/246
2013/0109353 A1* 5/2013 Chang .................. G06F 3/0482
                                                        455/411
2019/0306341 A1* 10/2019 Matysiak ............. G06F 3/1292

* cited by examiner

FIG. 10

| printColor | |
|---|---|
| ☑Define synonyms ⓘ  ☐Allow automated expansion | |
| auto_color | auto_color |
| monochrome | monochrome, black and white |
| color | color, full color |
| two_color | two color |
| single color | single color |
| red_and_black | red and black |

FIG. 11A

| |
|---|
| " Add USER expression |

| |
|---|
| " Please copy this by setting of two color, double sides and 2 in 1. |
| " Please copy this document by setting of Tray 1, fitting, and double sides. |
| " Make two copies of this document by monochrome and dark. |
| " Make three copies with 4 in 1. |
| " Execute copy by setting of color and auto tray. |
| " Please Copy this document with 80% on Tray 1. |
| " Copy dark on one side. |
| " copy by black and white and dark. |

FIG. 11B

Action

| |
|---|
| copy |

RELATED PARAMETER

FIG. 11C

| Entity | ENTITY ⓘ | VALUE |
|---|---|---|
| ☐ copies | @copies | Scopies |
| ☐ paperTray | @paperTray | SpaperTray |
| ☐ magnification | @magnification | Smagnification |
| ☐ printColor | @printColor | SprintColor |
| ☐ printSide | @printSide | SprintSide |
| ☐ combine | @combine | Scombine |
| ☐ density | @density | Sdensity |
| ⋮ | ⋮ | ⋮ |

INFORMATION PROCESSING APPARATUS, METHOD OF PROCESSING INFORMATION AND STORAGE MEDIUM COMPRISING DOT PER INCH RESOLUTION FOR SCAN OR COPY

CROSS-REFERENCE TO RELATED APPLICATION

This application claims priority pursuant to 35 U.S.C. § 119(a) to Japanese Patent Application Nos. 2018-069819, filed on Mar. 30, 2018 and 2018-248441, filed on Dec. 28, 2018 in the Japan Patent Office, the disclosure of which is incorporated by reference herein in its entirety.

BACKGROUND

Technical Field

This disclosure relates to an information processing apparatus, a method of processing information, and non-transitory computer readable storage medium storing program code for causing a computer to execute an information processing method.

Background Art

Artificial intelligence (AI) audio assistants used for operating devices or apparatuses are known. Further, smart home appliances that can be operated by audio are known, and the field of audio-based operation is expected to grow further in the future.

In case of image forming apparatuses such as multifunction peripherals (MFPs) that are widely used, a setting operation, a print execution operation, and the like are performed based on a manual operation using the graphical user interface (GUI).

However, even if users are accustomed to operations of conventional image forming apparatuses, it is necessary to make a fine setting through an operation unit every time. Further, users who are not familiar with the operations need to refer to manuals to learn how to operate image forming apparatuses.

SUMMARY

As one aspect of the present invention, an information processing apparatus is devised. The information processing apparatus includes circuitry configured to acquire audio information to be used for operating a target apparatus, recognize the audio information, obtain specific instruction information indicating specific information processing to be instructed to the target apparatus based on a recognition result of the acquired audio information, convert the specific instruction information into specific operation execution information described in an information format interpretable by the target apparatus, and output the specific operation execution information to the target apparatus.

As another aspect of the present invention, a method of processing information is devised. The method includes acquiring audio information to be used for operating a target apparatus, recognizing the audio information, obtaining specific instruction information indicating specific information processing to be instructed to the target apparatus based on a recognition result of the acquired audio information, converting the specific instruction information into specific operation execution information described in an information format interpretable by the target apparatus, and outputting the specific operation execution information to the target apparatus.

As another aspect of the present invention, a non-transitory computer readable storage medium storing one or more instructions that, when performed by one or more processors, cause the one or more processors to execute a method of processing information is devised. The method includes acquiring audio information to be used for operating a target apparatus, recognizing the audio information, obtaining specific instruction information indicating specific information processing to be instructed to the target apparatus based on a recognition result of the acquired audio information, converting the specific instruction information into specific operation execution information described in an information format interpretable by the target apparatus, and outputting the specific operation execution information to the target apparatus.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 10 illustrates entity information used in interpreting an audio input by a user in an audio-based operation system according to the first embodiment;

FIGS. 11A, 11B and 11C (FIG. 11) illustrate entity information registered based on a spoken phrase in an audio-based operation system according to the first embodiment;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an audio-based operation system applied to an information processing system, an information processing apparatus, an information processing method, and an information processing program.

First Embodiment

Figure 1:
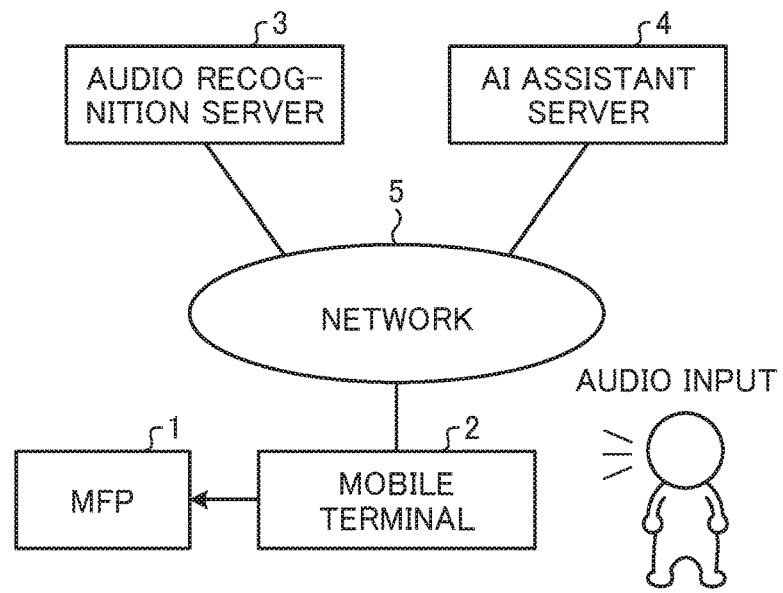
FIG. 1 is a system configuration of an audio-based operation system according to a first embodiment of the present disclosure.

System Configuration:

FIG. 1 is a diagram illustrating a system configuration of an audio-based operation system according to a first embodiment of the present disclosure. As illustrated in FIG. 1, the audio-based operation system can be configured by connecting a multifunction peripheral (MFP) 1 (an example of external apparatus), a mobile terminal 2 (an example of information processing apparatus), such as smart phone or tablet terminal, an audio recognition server 3, and an AI assistant server 4 via a network 5, such as local area network (LAN). The external apparatus is not limited to the multi-function peripheral (MFP) but can be a variety of electronic apparatuses and devices including office apparatuses, such as electronic information board and projector.

The mobile terminal 2 receives an audio (e.g., voice), input by a user, to perform an audio-based operation of the MFP 1. Further, the mobile terminal 2 feeds back the received operation to the user using audio, such as sound. Further, the mobile terminal 2 relays data communication (text data communication to be described later) to the audio recognition server 3 and the AI assistant server 4. The audio recognition server 3 analyzes audio data received from the mobile terminal 2 and converts the audio data into text data. The audio recognition server 3 corresponds to a first server in this description. The AI assistant server 4 analyzes the text data, which may be received from the audio recognition server 3, and converts the text data into a user intention registered in advance, such as a job execution instruction of the MFP 1, and transmits the job execution instruction to the mobile terminal 2.

The AI assistant server 4 corresponds to a second server in this description. The MFP 1 executes the job execution instruction transmitted from the mobile terminal 2. The communication between the mobile terminal 2 and the MFP 1 can be wireless communication or wired communication. That is, the mobile terminal 2 can be an operation terminal connected to the MFP 1 in a fixed manner.

In this example case, two servers such as the audio recognition server 3 and the AI assistant server 4 are provided, but the audio recognition server 3 and the AI assistant server 4 can be integrated as a single server. Further, each of the audio recognition server 3 and the AI assistant server 4 can be configured using a plurality of servers.

Hardware Configuration of MFP:

The MFP 1 includes a plurality of functions, such as a printer function and a scanner function. That is, as illustrated in FIG. 2, the MFP 1 includes, for example, a controller 7, a communication unit 15, an operation unit 16, a scanner engine 17, and a printer engine 18.

Figure 2:
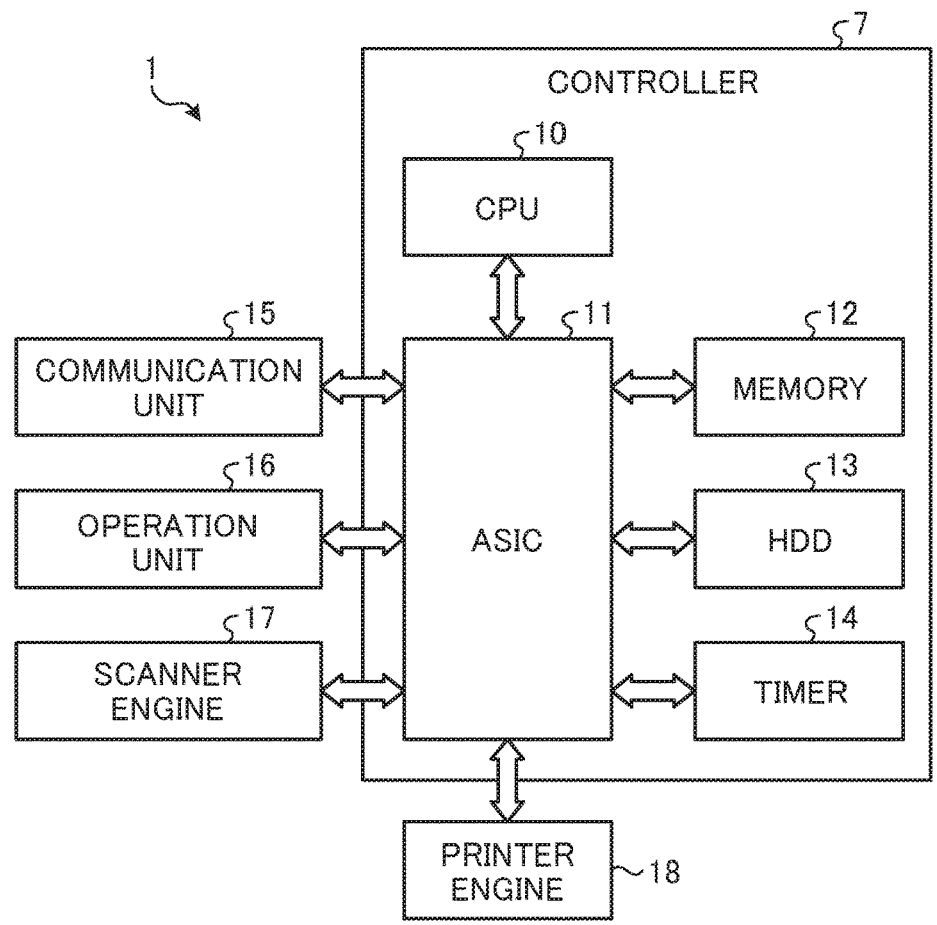
FIG. 2 is a hardware block diagram of a multifunction peripheral (MFP) provided for an audio-based operation system according to the first embodiment.

As illustrated in FIG. 2, the controller 7 includes, for example, a central processing unit (CPU) 10, an application specific integrated circuit (ASIC) 11, a memory 12, a hard disk drive (HDD) 13, and a timer 14. The CPU 10 to the timer 14 are connected to each other to enable interactive communication via a bus line.

The communication unit 15 is connected to the network 5, and acquires a job execution instruction, such as a scan instruction or a print instruction, input by using the mobile terminal 2, to be described later.

The operation unit 16 is, for example, a touch panel integrating a liquid crystal display (LCD) and a touch sensor. When an operator (user) inputs an execution instruction of a desired operation using the operation unit 16, the operator can designate the desired operation by operating one or more operation buttons (e.g., software keys) displayed on the operation unit 16.

The scanner engine 17 controls a scanner unit to optically read document. The printer engine 18 controls an image writing unit to print an image on, for example, a transfer sheet. The CPU 10 controls the image forming apparatus entirely. The ASIC 11, which is a large-scale integrated circuit (LSI), performs various image processing necessary for images processed by the scanner engine 17 and the printer engine 18. The scanner engine 17 and the printer engine 18, which are engines for executing the job execution instruction acquired from the mobile terminal 2, correspond to the functional units.

The memory 12 stores applications to be executed by the CPU 10 and various data to be used when executing various applications. The HDD 13 stores image data, various programs, font data, various files, and the like. It should be noted that a solid state drive (SSD) can be provided in place of the HDD 13 or along with the HDD 13.

Figure 3:
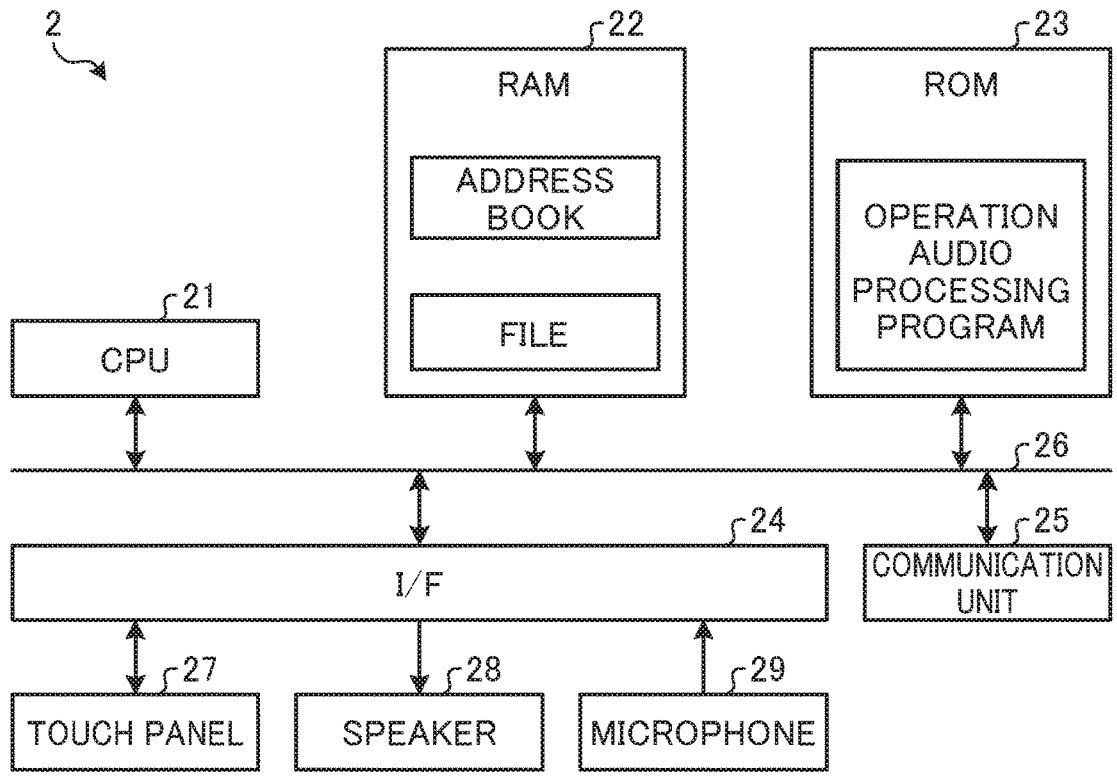
FIG. 3 is a hardware block diagram of a mobile terminal provided for an audio-based operation system according to the first embodiment.

Hardware Configuration of Mobile Terminal:

As illustrated in FIG. 3, the mobile terminal 2 includes, for example, the CPU 21, the RAM 22, the ROM 23, the interface (I/F) 24, and the communication unit 25 connected with each other via a bus line 26. The RAM 22 stores an address book storing e-mail addresses of users who can become transmission destinations of e-mail, scanned image, and the like. The RAM 22 further stores files of image data to be printed.

The ROM 23 stores an operation audio processing program. When the CPU 21 executes the operation audio processing program, an audio input operation of the MFP 1 can be performed.

The I/F 24 is connected to a touch panel 27, a speaker 28, and a microphone 29. The microphone 29 collects (acquires) an input audio indicating a job execution instruction to the MFP 1 in addition to voice calling. The input audio is transmitted to the audio recognition server 3 via the communication unit 25, and then converted into text data in the audio recognition server 3.

Figure 4:
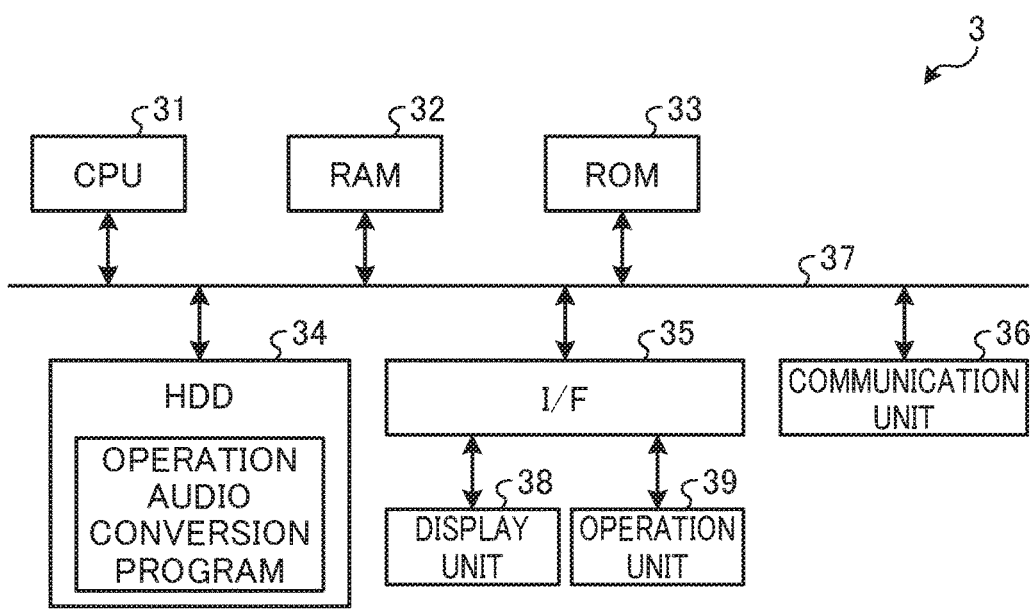
FIG. 4 is a hardware block diagram of an audio recognition server provided for an audio-based operation system according to the first embodiment.

Hardware Configuration of Audio Recognition Server:

As illustrated in FIG. 4, the audio recognition server 3 includes, for example, a CPU 31, a RAM 32, a ROM 33, a hard disk drive (HDD) 34, an interface (I/F) 35, and a communication unit 36 connected with each other via a bus line 37. The I/F 35 is connected to a display unit 38 and an operation unit 39. The HDD 34 stores an operation audio conversion program used for converting audio data into text data. The CPU 31 executes the operation audio conversion program to convert the audio data transmitted from the mobile terminal 2 into text data, and then returns the text data to the mobile terminal 2.

Figure 5:
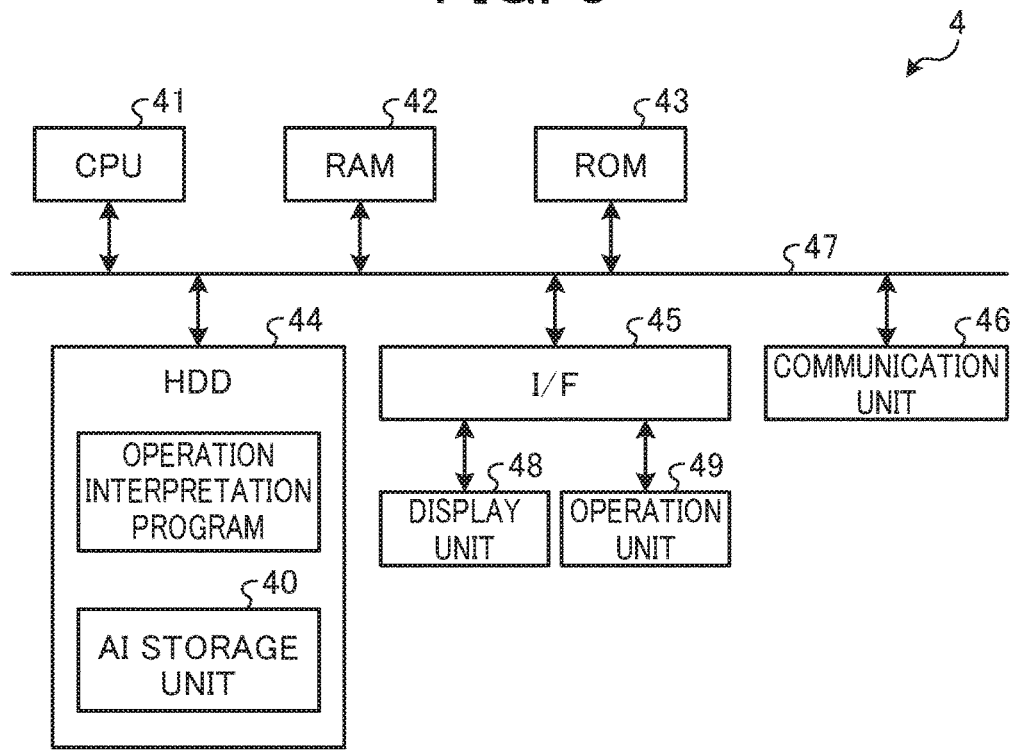
FIG. 5 is a hardware block diagram of an artificial intelligence (AI) assistant server provided for an audio-based operation system according to the first embodiment.

Hardware Configuration of AI Assistant Server:

As illustrated in FIG. 5, the AI assistant server 4 includes, for example, a CPU 41, a RAM 42, a ROM 43, an HDD 44, an interface (I/F) 45, and a communication unit 46 connected to each other via a bus line 47. The I/F 45 is connected to a display unit 48 and an operation unit 49. The HDD 44 stores an operation interpretation program used for interpreting a job instructed by a user. The CPU 41 executes the operation interpretation program to interpret the job instructed by the user from the text data generated (converted) by the audio recognition server 3. Then, an interpretation result is transmitted to the mobile terminal 2. The mobile terminal 2 converts the interpretation result into a job instruction, and transmits the job instruction to the MFP 1. As a result, the MFP 1 can be operated by the audio input via the mobile terminal 2.

Figure 6:
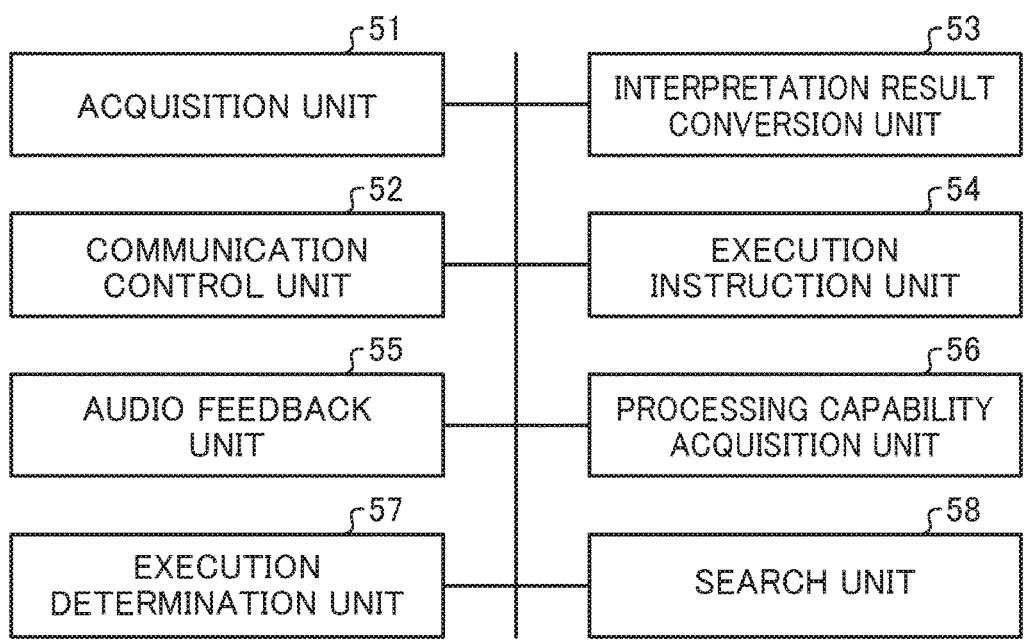
FIG. 6 is a functional block diagram of a mobile terminal provided for an audio-based operation system according to the first embodiment.

Function of Mobile Terminal:

When the CPU 21 of the mobile terminal 2 executes the operation audio processing program stored in the ROM 23, the CPU 21 implements functions, such as an acquisition unit 51, a communication control unit 52, an interpretation result conversion unit 53, an execution instruction unit 54, an audio feedback unit 55, a processing capability acquisition unit 56, an execution determination unit 57, and a search unit 58 as illustrated in FIG. 6.

The acquisition unit 51, which is an example of an acquisition unit and a first acquisition unit, acquires an audio instruction input by a user collected via the microphone 29, which is used for an audio-based operation of the MFP 1.

The communication control unit 52, which is an example of an output unit, a first output unit, a second output unit, a third output unit, a second acquisition unit and a third acquisition unit, controls communication between the mobile terminal 2 and the MFP 1, communication between the mobile terminal 2 and the audio recognition server 3, and communication between the mobile terminal 2 and the AI assistant server 4.

The interpretation result conversion unit 53, which is an example of a conversion unit, converts an interpretation result of text data corresponding to user's audio instruction into a job execution instruction of the MFP 1. To be described later in this specification, the AI assistant server 4 interprets the text data received from another apparatus, such as the mobile terminal 2, to obtain the interpretation result of text data, and transmits the interpretation result of text data to another apparatus, such as the mobile terminal 2.

The execution instruction unit 54 transmits the job execution instruction to the MFP 1 to instruct a job execution.

The audio feedback unit 55, which is an example of a modification unit, feeds back audio for prompting an input of data that is determined to be insufficient, and feeds back audio for prompting a confirmation of the input of data in order to implement an interactive audio input operation.

The processing capability acquisition unit 56, which is an example of a processing capability detection unit, acquires processing capability of the MFP 1, such as the maximum number of pixels that can be processed in the MFP 1 from the MFP 1.

The execution determination unit 57 compares the processing capability of the MFP 1 and the job designated by the user to determine whether or not the job designated by the user can be executed using the processing capability of the MFP 1.

The search unit 58, which is an example of a print information detection unit and an address detection unit, searches a transmission destination and/or a file instructed by the user in a memory, such as the RAM 22.

In this example case, the acquisition unit 51 to the search unit 58 are implemented by software, but a part or all of the acquisition unit 51 to the search unit 58 can be implemented by hardware, such as integrated circuit (IC). Further, the functions implemented by the acquisition unit 51 to the search unit 58 can be implemented by the operation audio processing program unit alone, or a part of the functions implemented by the acquisition unit 51 to the search unit 58 can be implemented by using other programs, or the functions implemented by the acquisition unit 51 to the search unit 58 can be implemented indirectly by executing other programs. For example, information such as the processing capability of MFP 1 can be acquired by other programs, and the processing capability acquisition unit 56 can acquire the information acquired by other programs, in which the processing capability acquisition unit 56 can acquire the information set for the MFP 1 indirectly.

Figure 7:
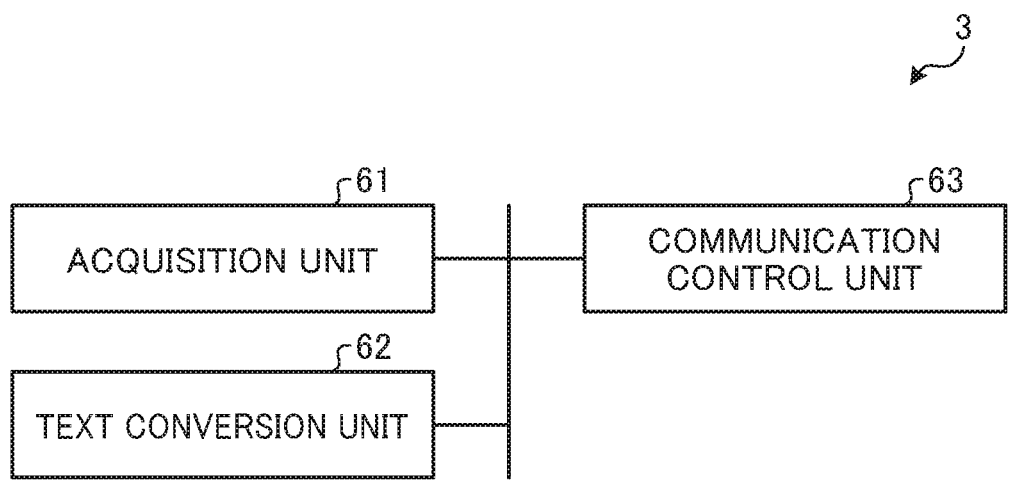
FIG. 7 is a functional block diagram of an audio recognition server provided for an audio-based operation system according to the first embodiment.

Function of Audio Recognition Server:

The CPU 31 of the audio recognition server 3 executes the operation audio conversion program stored in the HDD 34 to implement functions, such as an acquisition unit 61, a text conversion unit 62, and a communication control unit 63 as illustrated in FIG. 7. The acquisition unit 61 acquires audio data input by a user, which is transmitted from the mobile terminal 2. The text conversion unit 62, which is an example of an audio recognition unit, converts the audio data input by the user into text data. The communication control unit 63 controls communication of the communication unit 36 to receive the audio data input by the user and to transmit the text data to the mobile terminal 2.

In this example case, the acquisition unit 61 to the communication control unit 63 are implemented by software, but a part or all of the acquisition unit 61 to the communication control unit 63 can be implemented by hardware, such as integrated circuit (IC). Further, the functions implemented by the acquisition unit 61 to the communication control unit 63 can be implemented by the operation audio conversion program alone, a part of the functions implemented by the acquisition unit 61 to the communication control unit 63 can be implemented by using other programs, or the functions implemented by the acquisition unit 61 to the communication control unit 63 can be implemented indirectly by executing other programs.

Figure 8:
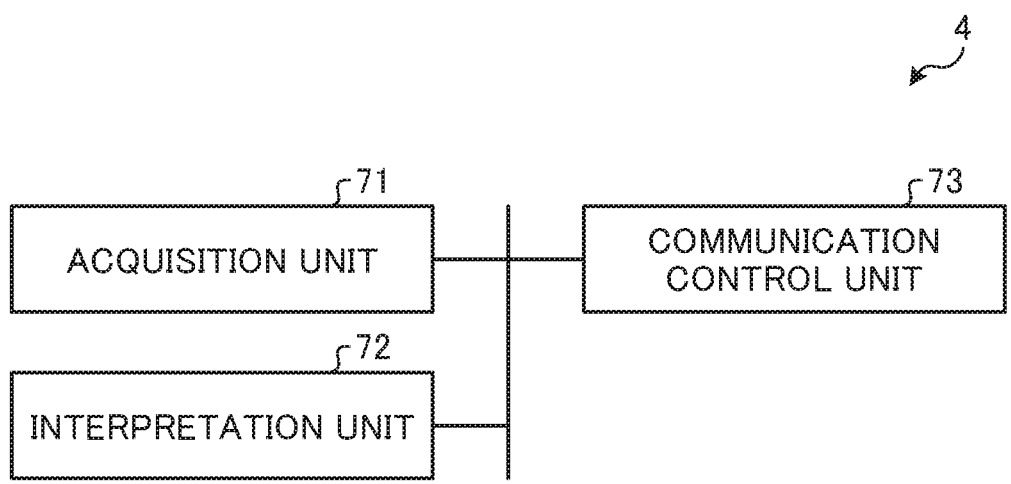
FIG. 8 is a functional block diagram of an AI assistant server provided for an audio-based operation system according to the first embodiment.

Function of AI Assistant Server:

The CPU 41 of the AI assistant server 4 executes the operation interpretation program stored in the HDD 44 to implement functions, such as an acquisition unit 71, an interpretation unit 72, and a communication control unit 73 as illustrated in FIG. 8. The acquisition unit 71 acquires the text data, corresponding to the audio data input by the user, which is transmitted from the mobile terminal 2. The interpretation unit 72, which is an example of an extraction unit, interprets an operation instruction input by the user based on the text data. The communication control unit 73 controls communication of the communication unit 46 to transmit an interpretation result to the mobile terminal 2 and to receive the text data corresponding to the audio data input by the user.

In this example case, the acquisition unit 71 to the communication control unit 73 are implemented by software, but a part or all of the acquisition unit 71 to the communication control unit 73 can be implemented by hardware, such as integrated circuit (IC). Further, the functions implemented by the acquisition unit 71 to the communication control unit 73 can be implemented by the operation interpretation program alone, or a part of the functions implemented by the acquisition unit 71 to the communication control unit 73 can be implemented by using other programs, or the functions implemented by the acquisition unit 71 to the communication control unit 73 can be implemented by executing other programs.

Further, the operation audio processing program, the operation audio conversion program, and the operation interpretation program can be recorded on a recording medium such as compact disk ROM (CD-ROM), flexible disk (FD), readable by computers, in an installable format or an executable format file. Further, the operation audio processing program, the operation audio conversion program, and the operation interpretation program can be recorded on a recording medium, such as compact disk recordable (CD-R), digital versatile disk (DVD), Blu-ray Disc (registered trademark) and semiconductor memory, readable by computers. Further, the operation audio processing program, the operation audio conversion program, and the operation interpretation program can be provided via a network such as the Internet or the like, or can be provided in advance in a ROM or the like disposed in the apparatus.

Figure 9:
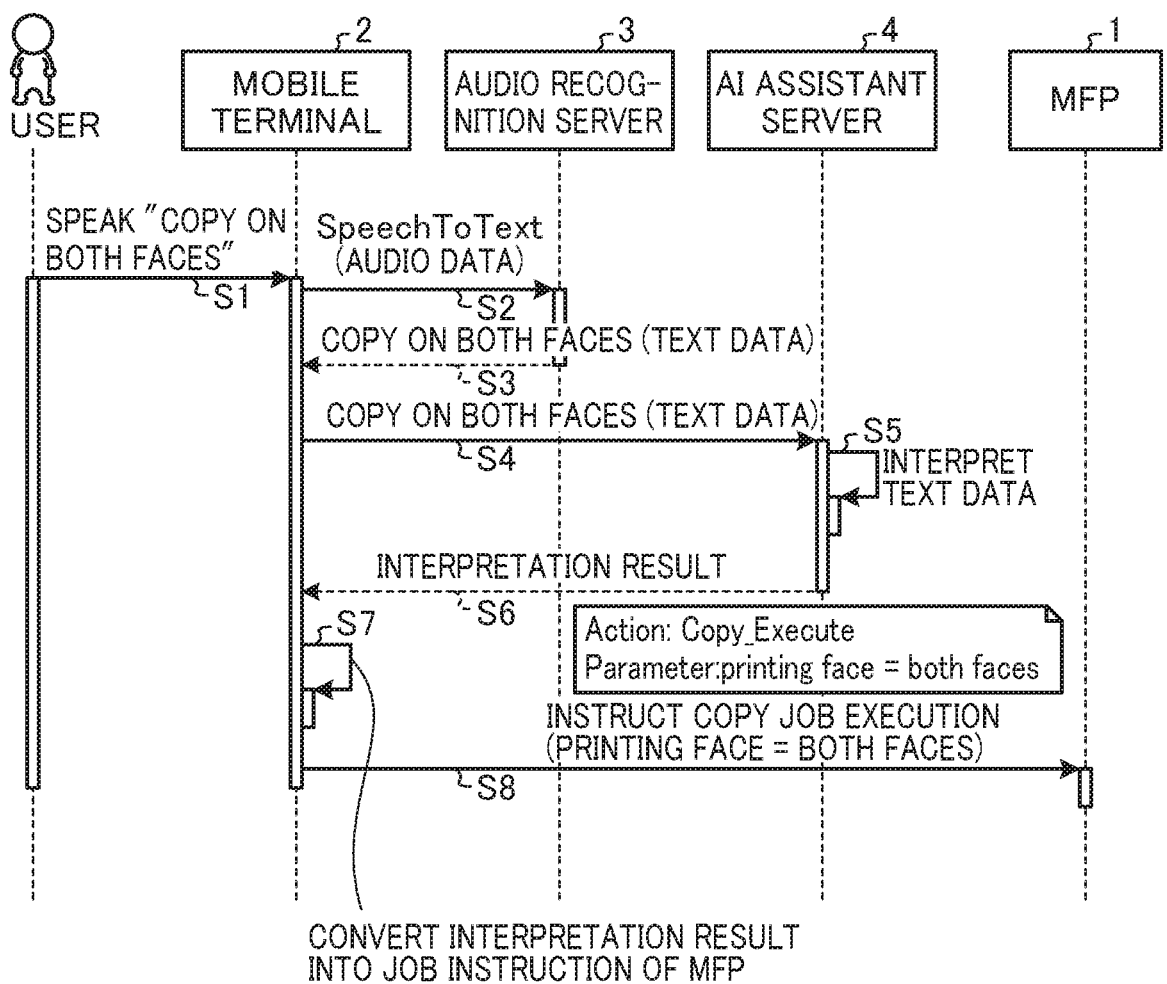
FIG. 9 is a sequence diagram illustrating a flow of an overall operation of audio-based operation in an audio-based operation system according to the first embodiment.

Audio Input Operation:

Hereinafter, a description is given of an audio input operation in the audio-based operation system according to the first embodiment with reference to FIG. 9. FIG. 9 illustrates an example of a sequence of operating the MFP 1 to perform a both-face (both-side) copying function based on an audio input operation via the mobile terminal 2. In this example case, a user activates the operation audio processing program of the mobile terminal 2, and then outputs (speaks), for example, "copy on both faces" to the mobile terminal 2. Then, the audio (e.g., voice) of the user is collected by the microphone 29 of the mobile terminal 2 and then acquired by the acquisition unit 51 of the mobile terminal 2 (step S1).

Then, the communication control unit 52 of the mobile terminal 2 transmits audio data of "copy on both faces" to the audio recognition server 3 and controls the communication unit 25 to transmit an audio-to-text conversion request to the audio recognition server 3 (step S2).

Then, the text conversion unit 62 of the audio recognition server 3 converts the audio data of "copy on both faces" into text data. Then, the communication control unit 63 of the audio recognition server 3 controls the communication unit 36 to transmit the text data, converted from the audio data, to the mobile terminal 2 (step S3).

Then, the communication control unit 52 of the mobile terminal 2 transmits the text data of "copy on both faces" to the AI assistant server 4 (step S4).

In this example case, the interpretation unit 72 of the AI assistant server 4 interprets the text data of "copy on both faces" as an operation to be requested to the MFP 1 such as "copy (Action: Copy_Execute)" and interprets that "printing face is both faces (printing face=both faces)" (step S5). In this manner, the interpretation unit 72 generates an interpretation result indicating the type (action) and contents (parameter) of a job designated by the user based on the text data. In this description, the type (action) and contents (parameter) included in the interpretation result can be used as specific instruction information obtained from the text data. The specific instruction information can be used to instruct specific information processing, such as copying printing, and scanning, to a target apparatus that can perform the specific information processing, such as the MFP 1.

Then, the communication control unit 63 of the AI assistant server 4 transmits the interpretation result to the mobile terminal 2 via the communication unit 46 (step S6).

Then, the interpretation result conversion unit 53 of the mobile terminal 2 converts the interpretation result received from the AI assistant server 4 into a job instruction of the MFP 1 (step S7). The following table 1 illustrates an example of the interpretation result and the job instruction converted from the interpretation result. In order to convert the interpretation result into the job instruction, the interpretation result conversion unit 53 can be configured to store information corresponding to Table 1 in the storage unit of the mobile terminal 2 and to refer to the information corresponding to Table 1 as needed.

TABLE 1

| Name | Value | Processing by voice actions application |
|---|---|---|
| Action | COPY_EXECUTE | Execution of copy job |
| | SCAN_EXECUTE | Execution of scan job |
| | PRINT_EXECUTE | Execution of print job |
| | FAX_EXECUTE | Execution of fax job |
| Parameter | printing face | Change setting value of printing face |
| | number of copies | Change setting value of number of copies |
| | *parameter may include any value designatable as job setting value | |

In an example of Table 1, "COPY_EXECUTE," "SCAN_EXECUTE," "PRINT_EXECUTE," and "FAX_EXECUTE" are set as examples of the Action. Further, the "printing face" and "number of copies" are indicated as examples of the Parameter. The Parameter includes any parameter that can be designated as the job setting value.

The interpretation result conversion unit 53 of the mobile terminal 2 converts an interpretation result of "COPY_EXECUTE" into a job instruction of the MFP 1, such as "Execution of copy job." Similarly, the interpretation result conversion unit 53 converts an interpretation result of "SCAN_EXECUTE" into a job instruction of the MFP 1 such as "Execution of scan job." Similarly, the interpretation result conversion unit 53 converts an interpretation result of "PRINT_EXECUTE" into a job instruction of the MFP 1 such as "Execution of print job." Similarly, the interpretation result conversion unit 53 converts an interpretation result of "FAX_EXECUTE" into a job instruction of the MFP 1 such as "Execution of fax job."

Further, if the interpretation result includes the Parameter of "printing face," the interpretation result conversion unit 53 of the mobile terminal 2 generates a job instruction of the MFP such as "change setting value of printing face." Similarly, if the interpretation result includes the Parameter of "number of copies," the interpretation result conversion unit 53 generates a job instruction of the MFP such as "change setting value of number of copies."

That is, the interpretation result conversion unit 53 of the mobile terminal 2 determines a type of job to be executed in the MFP 1 based on the information included in "Action" of the interpretation result, determines a value included in the "Parameter" as the job setting value, and converts the interpretation result into the job instruction.

Then, the communication control unit 52 of the mobile terminal 2 controls the communication unit 25 to transmit the job instruction generated as above described to the MFP 1 (step S8). In this example case, the job instruction of "copy job execution (printing face=both faces)" is transmitted to MFP 1. As a result, the duplex printing is executed in the MFP 1.

Interpretation in AI Assistant Server:

The AI storage unit 40 of the HDD 44 of the AI assistant server 4 stores AI assistant service information used for interpreting a job instructed by an audio input by a user. The AI assistant service information includes, for example, entity information (Entity), action information (Action), and intent information (Intent). The entity information is information that associates a parameter of job with natural language, and more than one synonym can be registered for one parameter. The action information is information indicating a type of job. The intent information associates a user spoken phrase (natural language) and the entity information, and a user spoken phrase (natural language) and the action information, respectively. The intent information enables a correct interpretation even if a sequence or nuance of the parameter is slightly changed. Further, the intent information can be used to generate response text (interpretation result) based on the input contents.

FIG. 10 is an example of the entity information corresponding to print color. In FIG. 10, characters of "printColor" indicates an entity name. Further, in FIG. 10, characters such as "auto_color," "monochrome," "color," and the like in the left column indicate specific parameter names, respectively. Further, in FIG. 10, characters such as "auto_color," "monochrome, black and white," "color, full color," or the like in the right column indicate specific synonyms, respectively.

As indicated in FIG. 10, the parameters and synonyms can be associated with each other as the entity information. By registering the associated parameters and synonyms, for example, if a copying of monochrome is to be instructed, the parameter can be set even if a user outputs (speaks) "Please copy by black and white" and "Please copy by monochrome."

FIG. 11A illustrates spoken phrases of user according to the embodiment. FIG. 11B is illustrates an action name according to the embodiment. FIG. 11C illustrates the entity information according to the embodiment. As illustrated in FIGS. 11A to 11C, by operating the operation unit 49 on a screen displayed on the display unit 48 provided for the AI assistant server 4, user spoken contents can be dragged. Alternatively, if another apparatus is connected to the AI assistant server 4, by operating an operation unit of another apparatus that have accessed the AI assistant server 4 via the network, the user spoken contents can be dragged.

With this configuration, the entity information, which is a target of association, can be selected. Further, when a value ("VALUE" in FIG. 11C) is set for the selected entity information, the parameter, which is entered as the response, is changed. For example, if the user outputs (speaks) "Please copy by black and white," and the value is "SprintColor," a return value of "printColor=monochrome" is returned. In contrast, if the value is "SprintColor.original," then a return value of "printColor=black and white" is returned. In this case, if the value is "SprintColor.original," the user spoken contents itself can be returned as the parameter of the response.

Interactive Operation:

Hereinafter, a description is given of an interactive operation system implemented in the audio-based operation system of the first embodiment, in which the interactive operation system responds based on audio contents input by a user. In the audio-based operation system of the first embodiment, in addition to responding to common phrases necessary for the interactive operation, an interactive MFP operation system can be implemented by performing two types of responses, such as "input insufficient feedback" and "input confirmation feedback" as the responses specifically set for the operation of the MFP 1.

The "input insufficient feedback" is a response that is output when information required to execute a job is not enough. If the information contents input by the user cannot be recognized by the system, or if the required parameter is determined to be insufficient, the "input insufficient feedback" is output. That is, for parameters other than the required parameters (hereinafter, non-relevant parameter), it is not necessary to provide insufficient feedback even if the non-relevant parameter is not instructed. Further, in addition to the parameters, a process of checking to-be-used functions, such as a copying function and a scanning function, can be also included in the "input insufficient feedback."

For example, depending on the type of an external apparatus connected to the mobile terminal 2, the functions and the parameters to be checked by the user can be changed. In this case, the processing capability acquisition unit 56 acquires information indicating the type and function of the external apparatus at a given timing after the communication with the external apparatus is established, and then, for example, the audio feedback unit 55 can determine the function and the parameter to be confirmed by the user based on the acquired information. For example, if the type of external apparatus is MFP 1, the functions included in MFP 1 such as copying, printing, scanning, facsimile can be confirmed by the user, and the functions, such as copying, printing, scanning, facsimile, included only in the MFP 1 can be confirmed by the user.

The "input confirmation feedback" is a response that is output when the information required to execute the job is completely prepared. That is, the input confirmation feedback is output only when all of the required parameters are instructed. Further, the input confirmation feedback is performed to prompt the user to select whether to execute the job using the current setting values or to change the current setting values. In order to confirm whether or not to execute the job using the current setting values, all of the parameters (any required parameter and any non-required parameter) instructed by the user can be output as an audio sound so that the parameters can be confirmed by the user.

Figure 12:
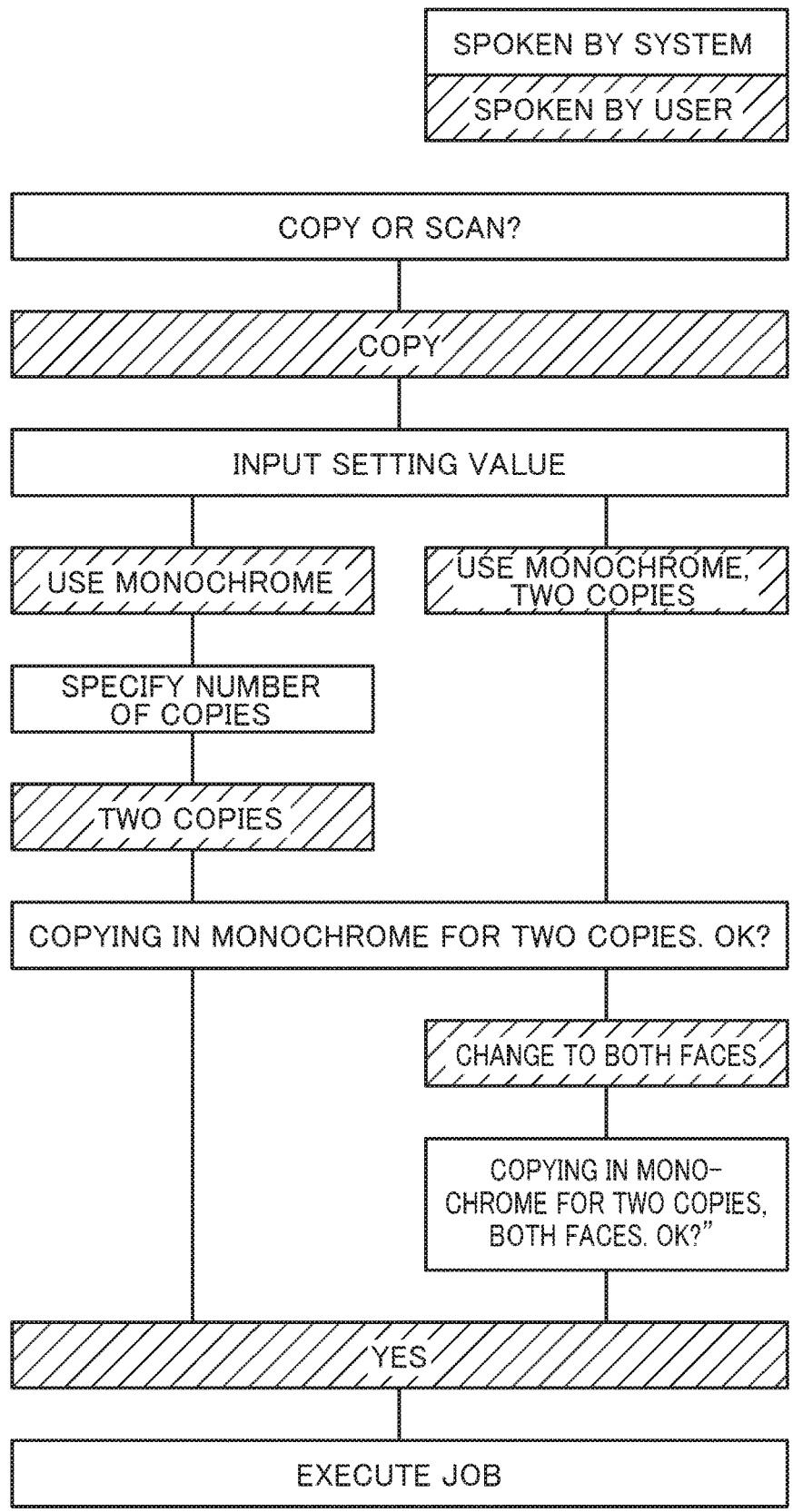
FIG. 12 is a diagram illustrating a flow of an interactive input operation in an audio-based operation system according to the first embodiment.

An example of an interactive operation between the interactive operation system and a user, including the above described feedback, is illustrated in FIG. 12. FIG. 12 is an example of an operation of the MFP 1 to perform copying of two copies of a monochrome image on both faces of a recording medium, such as sheet. In this example case, the number of copies (=two copies) becomes the required parameter. The required parameter is not limited to the number of copies, but may include a plurality of parameters, such as monochrome, color, and sheet size.

It is to be noted that one or more required parameters can be determined from a plurality of parameters and can be stored in advance in the storage unit of the AI assistant server 4. Further, a user can appropriately change which parameter(s) are the required parameter(s) by accessing the AI assistant server 4 via the operation unit 49 the AI assistant server 4 or via the network.

In an example case illustrated in FIG. 12, sections indicated by a diagonal line is spoken by a user (audio of user) and sections without the diagonal line is spoken by the system (audio of system). At first, when the system outputs an audio of "copy or scan?", the user outputs (speaks) "copy" to instruct to use the copy function. Then, the system outputs an audio of "input setting value" to request the user to enter one or more setting values used for "copy" designated by the user.

Then, it is assumed that the user outputs (speaks) "use monochrome." In this case, as described above, the number of copies is the required parameter. Therefore, the system requests the number of copies, such as "specify number of copies." This is an example of "input insufficient feedback." As to such "input insufficient feedback," the user specifies number of copies, such as "two copies." Thus, the insufficient input state is solved, so that the system responds with an audio of "copying in monochrome for two copies. OK?" and prompts the user to start the copying. This is the "input confirmation feedback" that is output when the information necessary to execute the job becomes complete.

Further, if the user responds with an audio of "use monochrome, two copies" to the "input confirmation feedback," the information necessary for executing the job becomes complete, and thereby the system outputs the above described "input confirmation feedback" such as "copying in monochrome for two copies. OK?"

Then, if a copy mode is changed from the one face (one-sided) copying to the duplex (two-face) copying, the user outputs (speaks) an audio of "change to both faces." In this case, since the information necessary to execute the job becomes complete, the system outputs "the input confirmation feedback" such as "copying in monochrome for two copies, both faces. OK?"

Then, if the user responds "YES" to the "input confirmation feedback such as "copying in monochrome for two copies. OK?" or "copying in monochrome for two copies, both faces. OK?", the system responds with an audio of "Execute job," and executes the job designated by the user.

Figure 13:
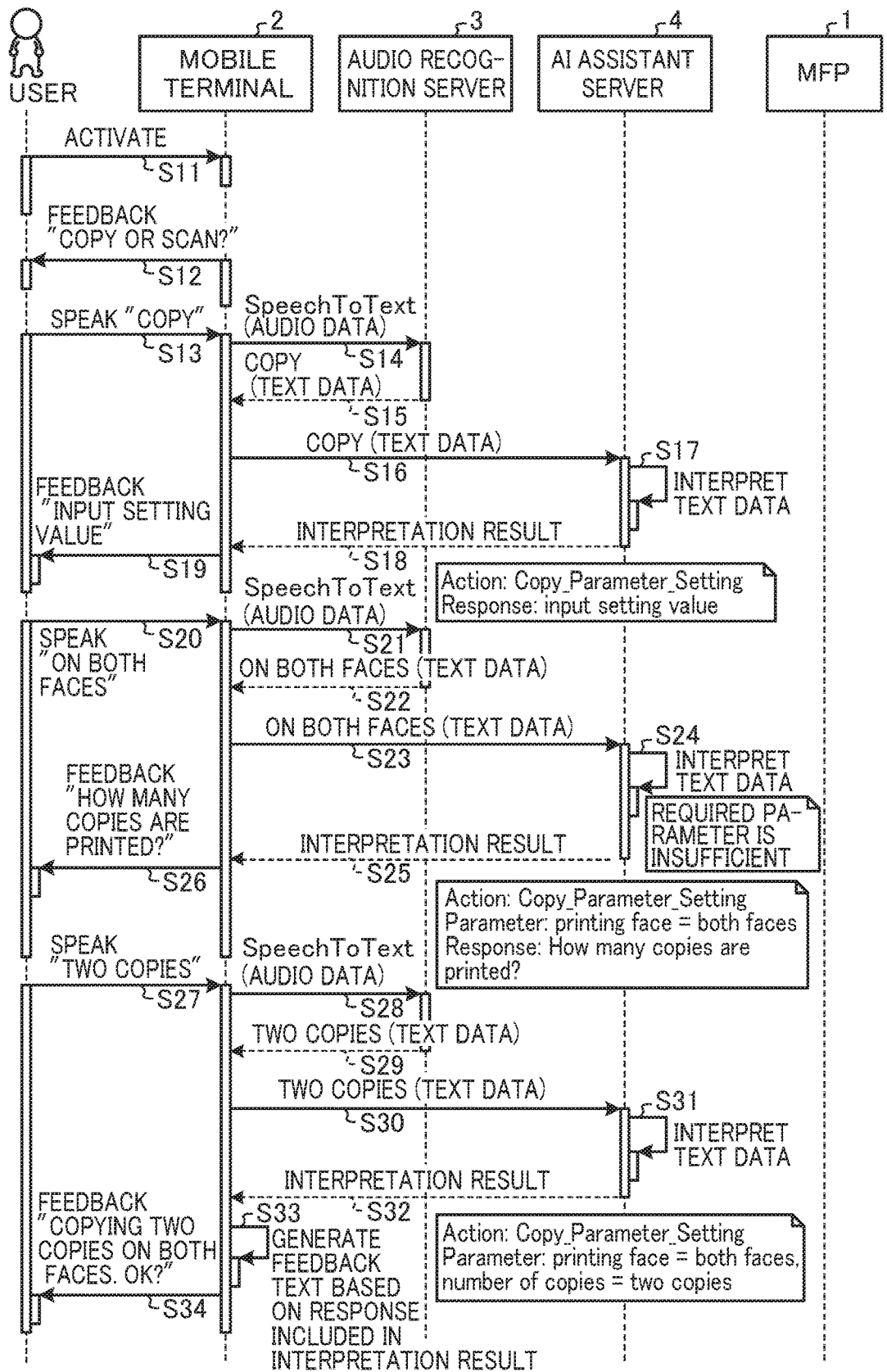
FIG. 13 is a sequence diagram illustrating a flow of a first half of an interactive input operation in an audio-based operation system according to the first embodiment.
Figure 14:
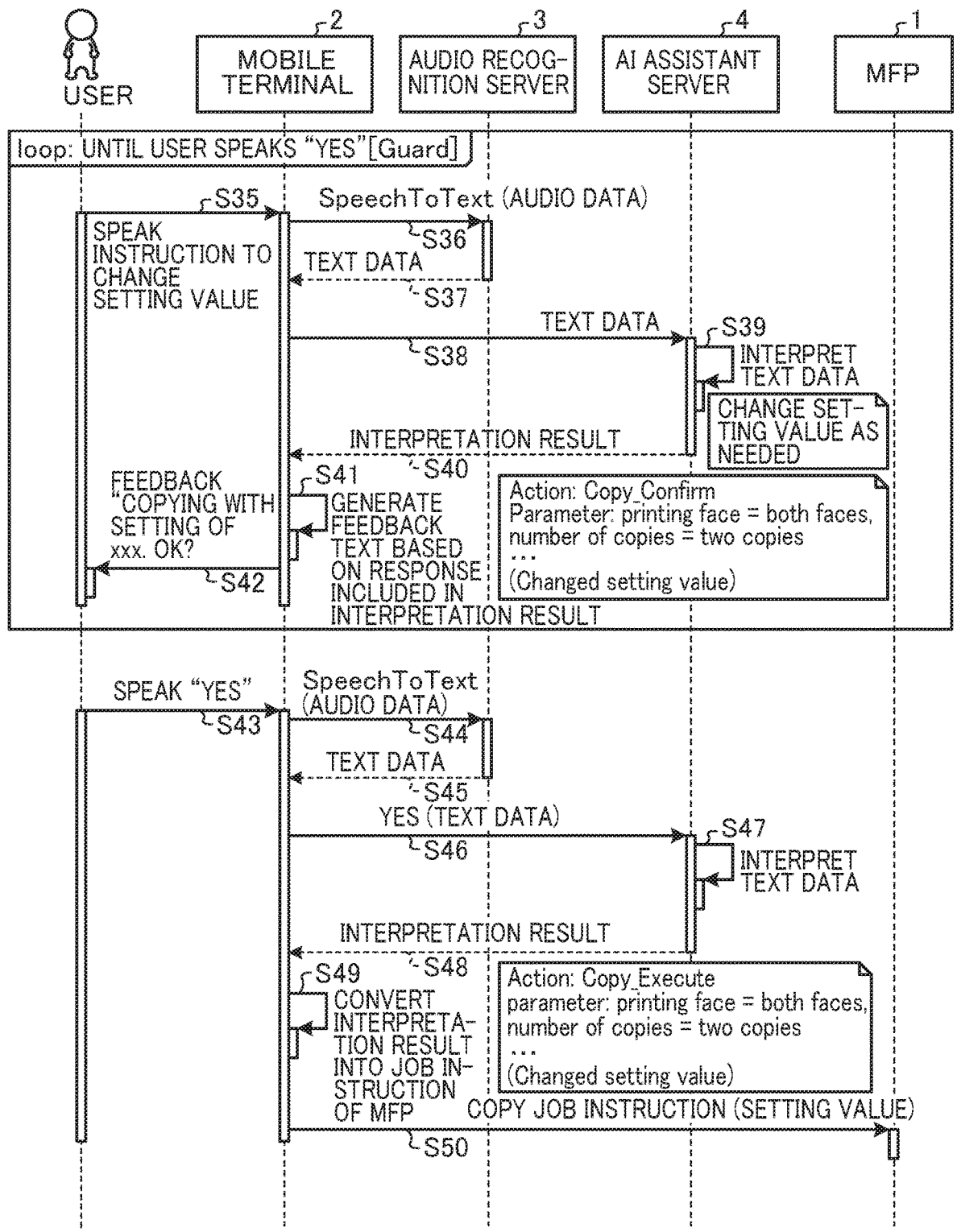
FIG. 14 is a sequence diagram illustrating a flow of a second half of an interactive input operation in an audio-based operation system according to the first embodiment, continued from the first half of the interactive input operation of FIG. 13.

Flow of Interactive Operation:

FIGS. 13 and 14 are sequence diagrams illustrating a flow of the interactive operation according to the embodiment. The sequence diagram of FIG. 13 illustrates a flow of a first half of the interactive operation, and the sequence diagram of FIG. 14 illustrates a flow of a second half of the interactive operation.

At first, when the operation audio processing program of the mobile terminal 2 is activated by a user (step S11), the audio feedback unit 55 outputs (speaks) an audio feedback of "copy or scan?" (step S12).

If the user outputs (speaks) "copy" (step S13), the communication control unit 52 of the mobile terminal 2 transmits audio data of "copy" to the audio recognition server 3 with an audio-to-text conversion request (step S14).

Then, the text conversion unit 62 of the audio recognition server 3 converts the audio data of "copy" to text data, and transmits the text data to the mobile terminal 2 (step S15). In this description, the text data converted from the audio data can be used as a recognition result of the audio data (audio information) acquired by the information processing apparatus, such as the mobile terminal 2 or the like.

Then, the acquisition unit 51 of the mobile terminal 2 acquires the text data from the audio recognition server 3. Further, the communication control unit 52 of the mobile terminal 2 transmits the acquired text data to the AI assistant server 4 (step S16). As described with reference to FIGS. 10 and 11, the interpretation unit 72 of the AI assistant server 4 interprets the Action and Parameter based on a user-spoken phrase indicated by the received text data. In this example case, since the user only outputs (speaks) "copy," the number of copies is unknown (insufficient input).

Therefore, the interpretation unit 72 generates an interpretation result adding the Response of "input setting value" to the Action of "Copy_Parameter_Setting" (step S17).

Then, the communication control unit 73 of the AI assistant server 4 transmits the interpretation result to the mobile terminal 2 (step S18).

Then, based on the interpretation result, the audio feedback unit 55 of the mobile terminal 2 outputs an audio of "input setting value" via the speaker 28, and also instructs the touch panel 27 to display the text of "input setting value" (step S19: input insufficient feedback). The Response, such as "input setting value," included in the interpretation result generated by the interpretation unit 72 can be used as modification information for prompting a modification of specific instruction information, such as the type (action) and contents (parameter), set by a user so that specific information processing indicated by the specific instruction information is executable at the target apparatus, such as MFP 1, and the audio feedback unit 55 of the mobile terminal 2 outputs a message (e.g., audio message) based on the modification information, for prompting the modification of the specific instruction information.

Then, since the input insufficient feedback is output, the user outputs (speaks), for example, "on both faces" (step S20).

Then, the communication control unit 52 of the mobile terminal 2 transmits audio data of "on both faces" to the audio recognition server 3 with an audio-to-text conversion request (step S21).

Then, the text conversion unit 62 of the audio recognition server 3 converts the audio data of "on both faces" to text data, and transmits the text data to the mobile terminal 2 (step S22).

Then, the acquisition unit 51 of the mobile terminal 2 acquires the text data from the audio recognition server 3. Then, the communication control unit 52 of the mobile terminal 2 transmits the acquired text data to the AI assistant server 4 (step S23). The interpretation unit 72 of the AI assistant server 4 interprets the Action and Parameter based on the user-spoken phrase indicated by the received text data. In this example case, since the user only outputs (speaks) "copy" and "on both faces," the number of copies is unknown (insufficiency of required parameter).

The required parameters among a plurality of parameters can be stored in the storage unit such as the HDD 44 of the AI assistant server 4 in advance. In this case, based on information of all of the required parameters stored in the storage unit, the interpretation unit 72 of the AI assistant server 4 can determine whether the parameters acquired from the mobile terminal 2 can be used to set all of the required parameters. If one or more of the required parameters have not been set, the interpretation unit 72 can prompt the user to set the required parameter(s) via the mobile terminal 2.

Therefore, the interpretation unit 72 generates an interpretation result adding the Response of "How many copies are printed?" to the Action of "Copy_Parameter_Setting" and the Parameter of "printing face=both faces" (step S24).

Then, the communication control unit 73 of the AI assistant server 4 transmits the interpretation result to the mobile terminal 2 (step S25).

Then, the audio feedback unit 55 of the mobile terminal 2 outputs an audio of "How many copies are printed" via the speaker 28, and also instructs the touch panel 27 to display the text of "How many copies are printed?" (step S26: input insufficient feedback).

Then, since the input insufficient feedback is output again, the user outputs (speaks), for example, "two copies" (step S27).

Then, the communication control unit 52 of the mobile terminal 2 transmits audio data of "two copies" to the audio recognition server 3 with an audio-to-text conversion request (step S28).

Then, the text conversion unit 62 of the audio recognition server 3 converts the audio data of "two copies" to text data, and transmits the text data to the mobile terminal 2 (step S29).

Then, the acquisition unit 51 of the mobile terminal 2 acquires the text data from the audio recognition server 3. Then, the communication control unit 52 of the mobile terminal 2 transmits the acquired text data to the AI assistant server 4 (step S30). The interpretation unit 72 of the AI assistant server 4 interprets the Action and Parameter based on the user-spoken phrase indicated by the received text data. In this example case, if the user transmits the audio data of "two copies," the insufficient state of the required parameter of the copy job is solved.

Therefore, the interpretation unit 72 of the AI assistant server 4 generates an interpretation result adding the Parameter of "printing face=both faces, and number of copies=two copies" to the Action of "Copy_Confirm" (step S31).

Then, the communication control unit 73 of the AI assistant server 4 transmits the interpretation result to the mobile terminal 2 (step S32).

Since the insufficient state of the required parameter of the copy job is solved, and it is ready to start the copying, the audio feedback unit 55 of the mobile terminal 2 generates, for example, a feedback text of "copying two copies on both faces. OK?" based on the Response included in the interpretation result (step S33). In this stage, the text can be generated by reading all or a part of the text data stored in the storage unit of the mobile terminal 2, and by combining all or a part of the read text data.

The audio feedback unit 55 can be configured to generate the feedback text not only in step 33 but also in any other steps in the same manner if the interpretation result is acquired from the AI assistant server 4, but if the feedback text information is included in the Response of the interpretation result, the audio feedback unit 55 is not required to generate the feedback text.

Then, the above described input confirmation feedback is performed (step S34). In response to this input confirmation feedback, the user performs an audio input instructing a change of setting value and/or a start of copying.

FIG. 14 is an example of a sequence diagram illustrating a flow of an operation when a change of setting value is instructed by an audio (e.g., voice), which is indicated in steps S35 to S42.

In FIG. 14, if the user outputs (speaks) an instruction of changing the setting value (step S35), the text conversion unit 62 of the audio recognition server 3 generates text data of the changed setting value and transmits the text data of the changed setting value to the AI assistant server 4 via the mobile terminal 2 (steps S36 to S38).

Then, the AI assistant server 4 generates an interpretation result including the changed setting value based on the user-spoken phrase indicated by the received text data (step S39), and transmits the interpretation result to the mobile terminal 2 (step S40).

Then, the audio feedback unit 55 of the mobile terminal 2 generates a feedback text based on the Response included in the interpretation result (step S41), and performs the above described input confirmation feedback, such as "copying with setting of xxx. OK?" to check or confirm whether or not to start the copying with the changed setting value (step S42).

FIG. 14 is a sequence diagram illustrating a flow of an operation when the start of copying is instructed, which is indicated in steps S43 to S50. That is, if the user responds with "YES" to the above described input confirmation feedback (step S43), audio data of "YES" is converted into text data by the audio recognition server 3, and then the text data is transmitted to the AI assistant server 4 via the mobile terminal 2 (steps S44 to S46).

If the AI assistant server 4 recognizes a copy start instruction based on the received text data, the AI assistant server 4 generates an interpretation result adding the Parameter of "printing face=both faces, number of copies=two copies" to the Action of "Copy_Execute" and transmits the interpretation result to the mobile terminal 2 (steps S47 to S48).

Then, the interpretation result conversion unit 53 of the mobile terminal 2 converts the interpretation result into a job instruction of the MFP 1 (step S49), and transmits the job instruction to the MFP 1 (step S50). Thus, the MFP 1 can be controlled for executing the copying using the above described audio input operation. Feedback Information from AI Assistant Server:

The following Table 2 illustrates an example of the interpretation result fed back to the mobile terminal 2 from the AI assistant server 4.

TABLE 2

| Name | Value | Processing by voice actions application |
|---|---|---|
| Action | COPY_PARAMETER_SETTING | Prompting to input job setting value |
|  | COPY_CONFIRM | Prompting to confirm job setting value |
|  | COPY_EXECUTE | Execution of copy job |
| Parameter | printing face | Change setting value of printing face |
|  | number of copies | Change setting value of number of copies |
|  | *parameter may include any value designatable as job setting value |  |
| Response | Text | Feedback contents specified by text to user |

As illustrated in Table 2, the Action, such as "COPY_PARAMETER_SETTING" for prompting a user to input a job setting value, "COPY_CONFIRM" for prompting a user to confirm a job setting value, and "COPY_EXECUTE" for notifying a start of a copy job execution to a user are included in the interpretation result, and fed back to the mobile terminal 2.

The audio feedback unit 55 can determine the feedback to the user in accordance with the Action, Parameter, and Response included in the interpretation result. In order to determine the contents of feedback, the audio feedback unit 55 can be configured to store information corresponding to Table 2 in the storage unit of the mobile terminal 2 and refer to the information corresponding to Table 2. Although a case of copying is described in Table 2, the Action similar to Table 2 can be set for printing, scanning, and facsimile, such as "PARAMETER_SETTING" to prompt a user to input a job setting value, and "CONFIRM" to prompt a user to confirm a job setting value.

Further, the Parameter, such as the setting value of printing face indicating both faces or one face, or the setting value of number of copies, and the like, can be included in the interpretation result, and then the interpretation result is fed back to the mobile terminal 2. Further, if the required parameter is insufficient, a message prompting an input of the missing parameter (insufficient parameter) can be included in the interpretation result as the Response, and then the interpretation result is fed back to the mobile terminal 2.

Figure 15:
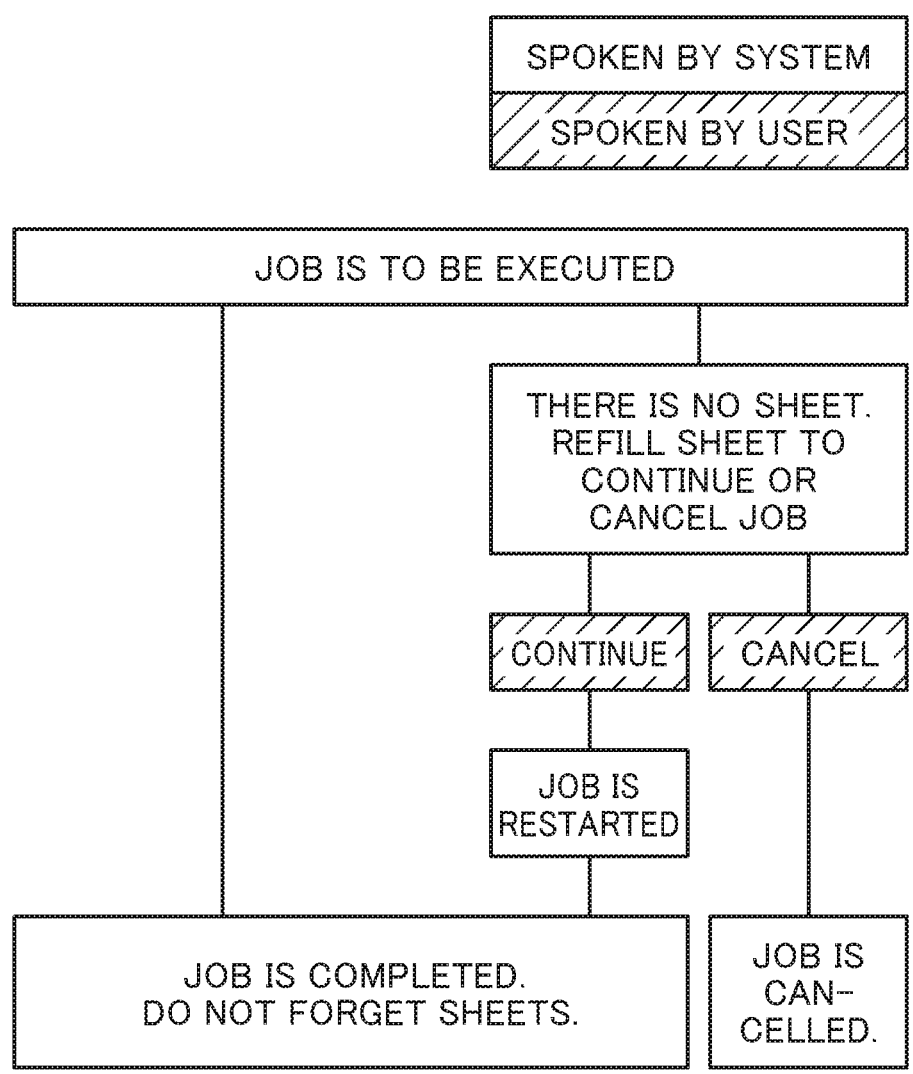
FIG. 15 is a diagram illustrating a flow of an interactive input operation when an error occurs in an audio-based operation system according to the first embodiment.

Interactive Operation when Job is Executed and Error Occurs:

Hereinafter, a description is given of an example of interactive operation when a job is executed and/or when an error occurs with reference to FIG. 15. FIG. 15 illustrates an example of an interactive operation when a user responds with "YES" to the above described input confirmation feedback such as "Job is to be executed. OK?" At first, if the user responds with "YES" to the above input confirmation feedback such as "Job is to be executed. OK?," the job is executed in the MFP 1. If the job is completed without any problems, for example, a completion message (audio and/or text message) such as "Job is completed. Do not forget sheets" is output via the mobile terminal 2.

On the other hand, if an error occurs, such as sheet amount is insufficient, a job confirmation feedback, such as "There is no sheet. Refill sheet to continue or cancel job" is output via the mobile terminal 2. If the user refills sheets in the MFP 1 and responds with "Continue" to the job confirmation feedback of "There is no sheet. Refill sheet to continue or cancel job," the continuation of job is instructed to the MFP 1 and the job is restarted in the MFP 1. On the other hand, if the user responds with "Cancel" to the job confirmation feedback of "There is no sheet. Refill sheet to continue or cancel job" to instruct a job cancellation, the MFP 1 is notified with the job cancellation and cancels the job after the error occurred. Then, a confirmation feedback such as "Job is canceled" is output using the audio and/or text via the mobile terminal 2.

Figure 16:
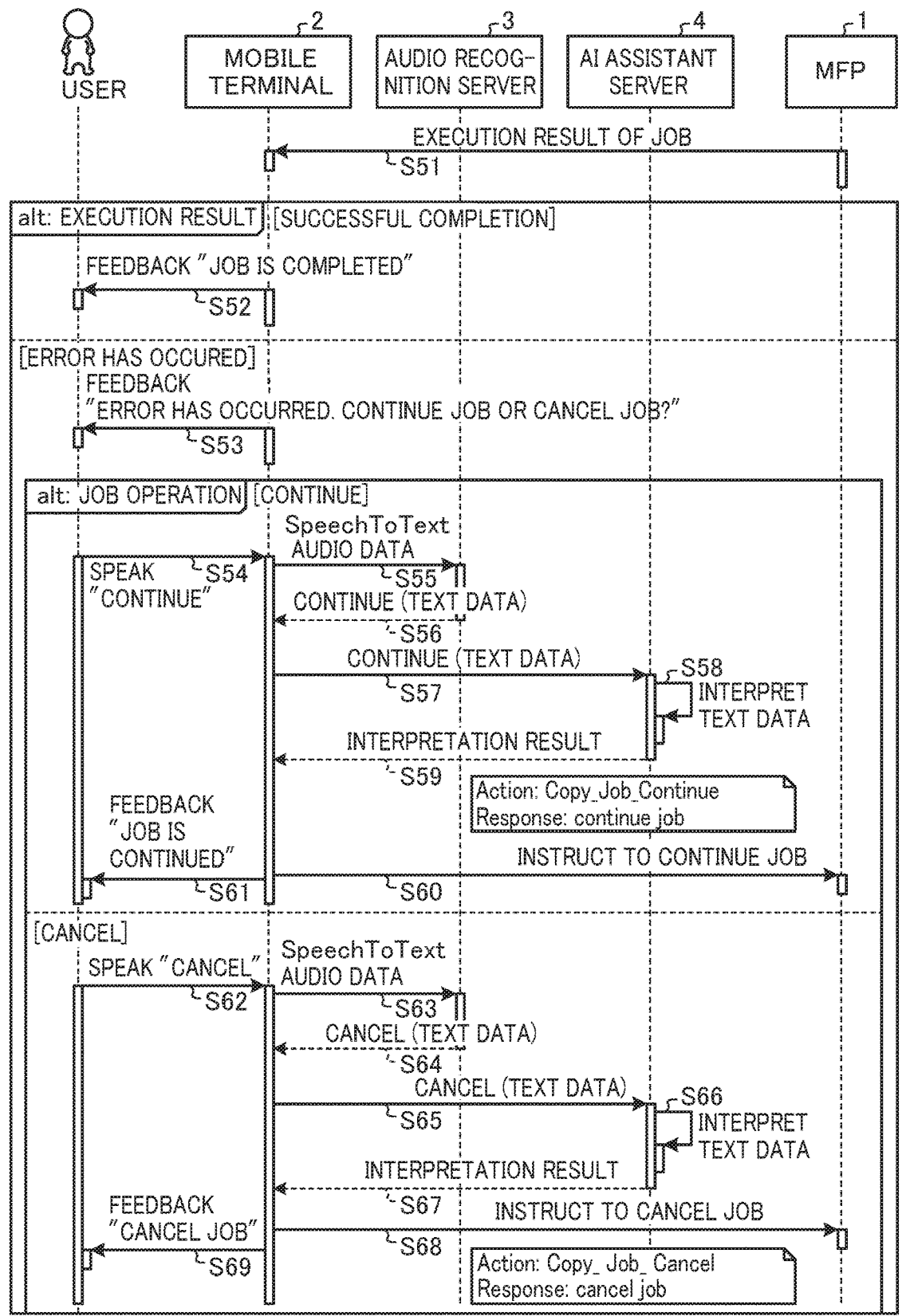
FIG. 16 is a sequence diagram illustrating a flow of an interactive input operation when an error occurs in an audio-based operation system according to the first embodiment.

Flow of Interactive Operation when Job is Executed and Error Occurs:

FIG. 16 is a sequence diagram illustrating a flow of an interactive operation when a job is executed and an error occurs according to the embodiment. When the MFP 1 executes an instructed job, the MFP 1 transmits an execution result indicating that the job has been completed or an execution result indicating that an error has occurred to the mobile terminal 2 (step S51).

If the mobile terminal 2 receives the execution result of a successful completion of job, the audio feedback unit 55 of the mobile terminal 2 outputs (speaks) an audio message, such as "Job is completed" (step S52).

On the other hand, if the mobile terminal 2 receives the execution result of indicating that the error has occurred, the audio feedback unit 55 of the mobile terminal 2 outputs (speaks) an audio message of inquiring whether the job is to be continued or not, such as "Error has occurred. Continue job or cancel job?" (step S53).

In FIG. 16, steps S54 to S61 indicate a sequence diagram illustrating a flow of an operation of each part when the user designates the job continuation. That is, when the audio feedback unit 55 of the mobile terminal 2 outputs the audio message inquiring "Error has occurred. Continue job or cancel job?" and then the user removes the cause of the error and responds to the inquiring by speaking "Continue" (step S54), audio data of "Continue" is converted to text data, and then the text data is transmitted to the AI assistant server 4 (steps S55 to S57).

Then, the AI assistant server 4 sets the Action of "COPY_JOB_CONTINUE" and generates an interpretation result setting the Response of "continue job," and then transmits the interpretation result to the mobile terminal 2 (steps S58 to S59).

Then, the execution instruction unit 54 of the mobile terminal 2 instructs the MFP 1 to continue the job (step S60).

Further, the audio feedback unit 55 of the mobile terminal 2 outputs (speaks) an input confirmation feedback of "Job is continued" (step S61).

On the other hand, in FIG. 16, steps S62 to S69 indicate a sequence diagram illustrating a flow of operation of each part when the user designates the job cancellation. That is, if the audio feedback unit 55 of the mobile terminal 2 outputs the audio message inquiring "Error has occurred. Continue job or cancel job?" and then the user responds with "Cancel job" to the inquiring (step S62), audio data of "Cancel job" is converted to text data, and then the text data is transmitted to the AI assistant server 4 (steps S63 to step 65).

Then, the AI assistant server 4 sets the Action "Copy_Job_Cancel" and generates an interpretation result setting the Response of "cancel job," and transmits the interpretation result to the mobile terminal 2 (steps S66 to S67).

Then, the execution instruction unit 54 of the mobile terminal 2 instructs the MFP 1 to cancel the job (step S68).

Further, the audio feedback unit 55 of the mobile terminal 2 outputs (speaks) an input confirmation feedback of "cancel job" (step S69).

Figure 17:
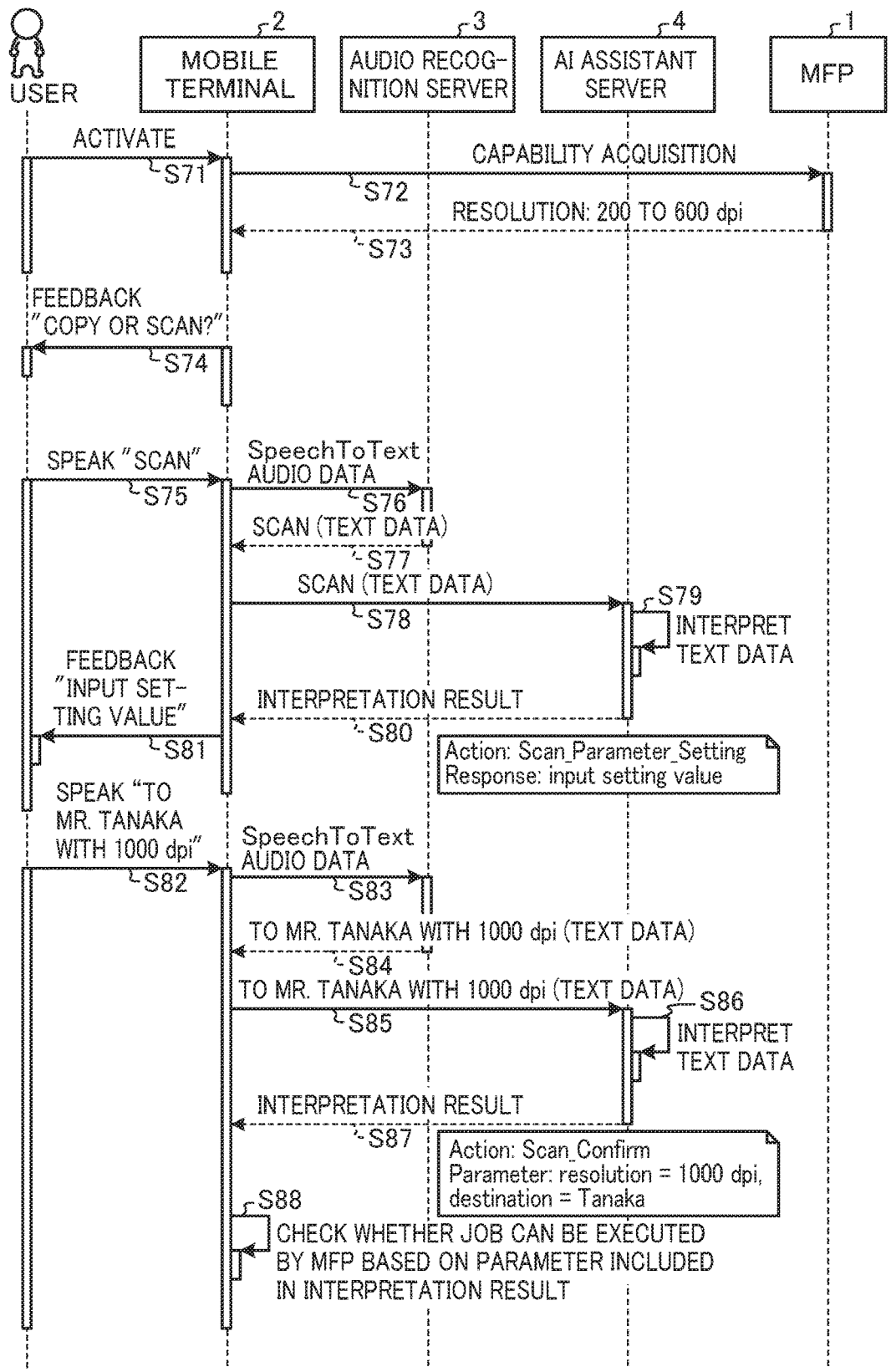
FIG. 17 is a sequence diagram illustrating a flow of a first half of an operation of performing a scan according to an apparatus capability of an MFP by an interactive input operation in an audio-based operation system according to the first embodiment.
Figure 18:
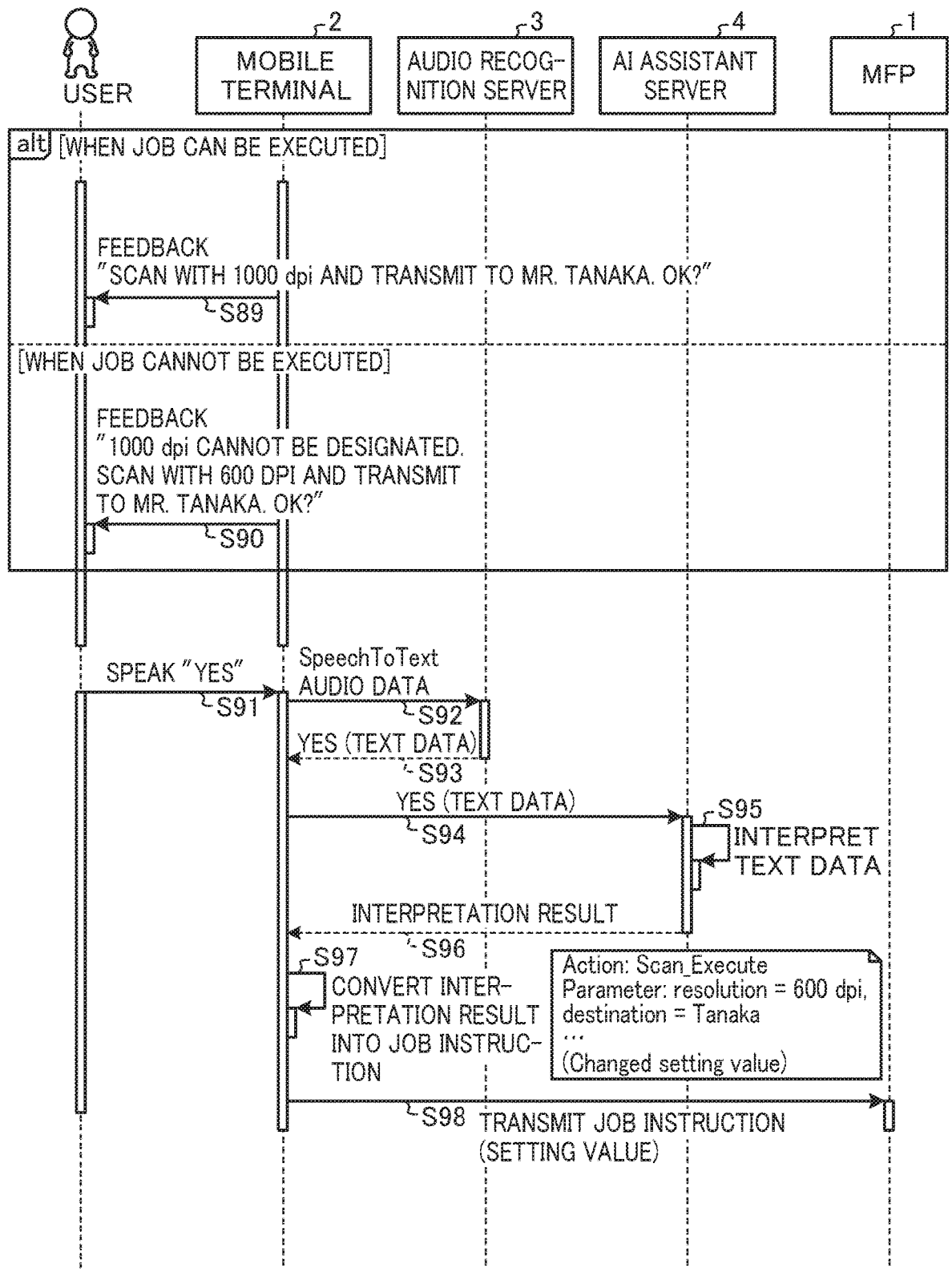
FIG. 18 is a sequence diagram illustrating a flow of a second half of an operation of performing a scan according to an apparatus capability of an MFP by an interactive input operation in an audio-based operation system according to the first embodiment, continued from the first half of the operation of FIG. 17.

Adjustment of Parameter Depending on Apparatus Capability of MFP Using Interactive Operation:

In the audio-based operation system according to the first embodiment, the job execution corresponding to an apparatus capability of the MFP 1 is implemented by performing an interactive operation. FIG. 17 is a sequence diagram illustrating a flow of an operation of determining whether the MFP 1 has the apparatus capability required for a job instructed by a user according to the embodiment. FIG. 18 is a sequence diagram illustrating a flow of operation when the job can be executed and when the job is difficult to execute using the apparatus capability of the MFP 1 according to the embodiment.

At first, in the sequence diagram of FIG. 17, when a mobile audio processing program of the mobile terminal 2 is activated (step S71), the processing capability acquisition unit 56 of the mobile terminal 2 inquires the MFP 1, for example, a resolution that can be processed by the MFP 1 (capability acquisition: step S72).

In response to this inquiry, the MFP 1 transmits processable resolution such as "resolution: 200 dpi to 600 dpi" to the mobile terminal 2 (step S73), in which "dpi" means "dot per inch." As a result, the resolution that can be processed by the MFP 1 can be recognized at the mobile terminal 2.

The processing capability acquisition unit 56 can acquire information of the processing capability (processing capability information) at a pre-set timing after the communication between the mobile terminal 2 and the MFP 1 has been established. Further, the processing capability information of the MFP 1 can be acquired by executing another program, and then the processing capability acquisition unit 56 can acquire the processing capability information of the MFP 1 from another program indirectly.

Then, the audio feedback unit 55 of the mobile terminal 2 outputs an audio feedback of "copy or scan?" for prompting the user to enter or input a job instruction (step S74).

If the user outputs (speaks) "scan" (step S75), audio data of "scan" is converted to text data, and then the text data is transmitted to the AI assistant server 4 (steps S76 to S78).

Since the scan instruction alone lacks the required parameter, the interpretation unit 72 transmits an interpretation result setting the Action of "Scan_Parameter_Setting" and the Response of "input setting value" to the mobile terminal 2 (steps S79 to S80).

Then, the audio feedback unit 55 of the mobile terminal 2 outputs (speaks) an input insufficient feedback of "input setting value" (step S81).

If the user outputs (speaks) "To Mr. Tanaka with 1000 dpi" to the input insufficient feedback of "input setting value," audio data of "To Mr. Tanaka with 1000 dpi" is converted to text data, and then the text data is transmitted to the AI assistant server 4 (steps S82 to S85).

Then, the interpretation unit 72 of the AI assistant server 4 transmits an interpretation result setting the Action of "Scan_Confirm" and the Parameter of "resolution=1000 dpi, destination=Tanaka" to the mobile terminal 2 (steps S86 to S87).

Based on the Parameter included in the interpretation result, the execution determination unit 57 of the mobile terminal 2 determines whether the job designated by the user can be executed by the MFP 1 or not (step S88).

If the MFP 1 can perform the image processing using the resolution of 1000 dpi, the audio feedback unit 55 of the mobile terminal 2 outputs (speaks) an input confirmation feedback of "scan with 1000 dpi and transmit to Mr. Tanaka. OK?" (step S89) as indicated in FIG. 18.

If the user responds with "YES" to this input confirmation feedback (step S91), audio data of "YES" is converted to text data, and then the text data is transmitted to the AI assistant server 4 (steps S92 to S94).

Then, the AI assistant server 4 transmits an interpretation result setting the Action of "Scan_Execute" and the Parameter of "resolution=1000, destination=Tanaka" to the mobile terminal 2 (steps S95 to S96).

Then, the interpretation result conversion unit 53 of the mobile terminal 2 converts the interpretation result into a job instruction (step S97).

Then, the communication control unit 52 of the mobile terminal 2 transmits the job instruction to the MFP 1 (step S98).

On the other hand, if the resolution of 600 dpi is the maximum resolution set for the processing capability of MFP 1, the image processing using the resolution of 1000 dpi designated by the user is difficult to perform by the MFP 1. In this case, in step S90, the mobile terminal 2 outputs (speaks) a confirmation feedback such as "1000 dpi cannot be designated. Scan with 600 dpi and transmit to Mr. Tanaka. OK?"

The execution determination unit 57 of the mobile terminal 2 can select the function or processing capability value that is the closest to the function or processing capability value designated by the user within a range of processing capability of the MFP 1. For example, if the resolution of the MFP 1 is designed in a range of 200 dpi to 600 dpi, the resolution of 600 dpi, which is the closest to 1000 dpi instructed by the user, can be selected. Then, the audio feedback unit 55 outputs the processing capability value selected by the execution determination unit 57 as a confirmation feedback.

Then, if the user outputs (speaks) "YES" to this confirmation feedback (step S91), audio data of "YES" is converted to text data, and then the text data is transmitted to the AI assistant server 4 (steps S92 to S94).

Then, the AI assistant server 4 sets the Action of "SCAN_EXECUTE" and transmits an interpretation result including the Parameter of "resolution=600, destination=Tanaka" to the mobile terminal 2 (steps S95 to S96).

Then, the interpretation result conversion unit 53 of the mobile terminal 2 converts the interpretation result into a job instruction (step S97).

Then, the communication control unit 52 of the mobile terminal 2 transmits the job instruction to the MFP 1 (step S98). As a result, the MFP 1 can be operated using the audio input operation to execute the job within the processing capability of the MFP 1.

Operation of Transmitting Scanned Image to Transmission Destination Searched from Address Book of Mobile Terminal:

Hereinafter, a description is given of an operation of transmitting a scanned image to a transmission destination retrieved or searched from an address book of the mobile terminal 2. The sequence diagram of FIG. 19 illustrates a flow of a first half of the operation, and the sequence diagram of FIG. 20 illustrates a flow of a second half of the operation.

Figure 19:
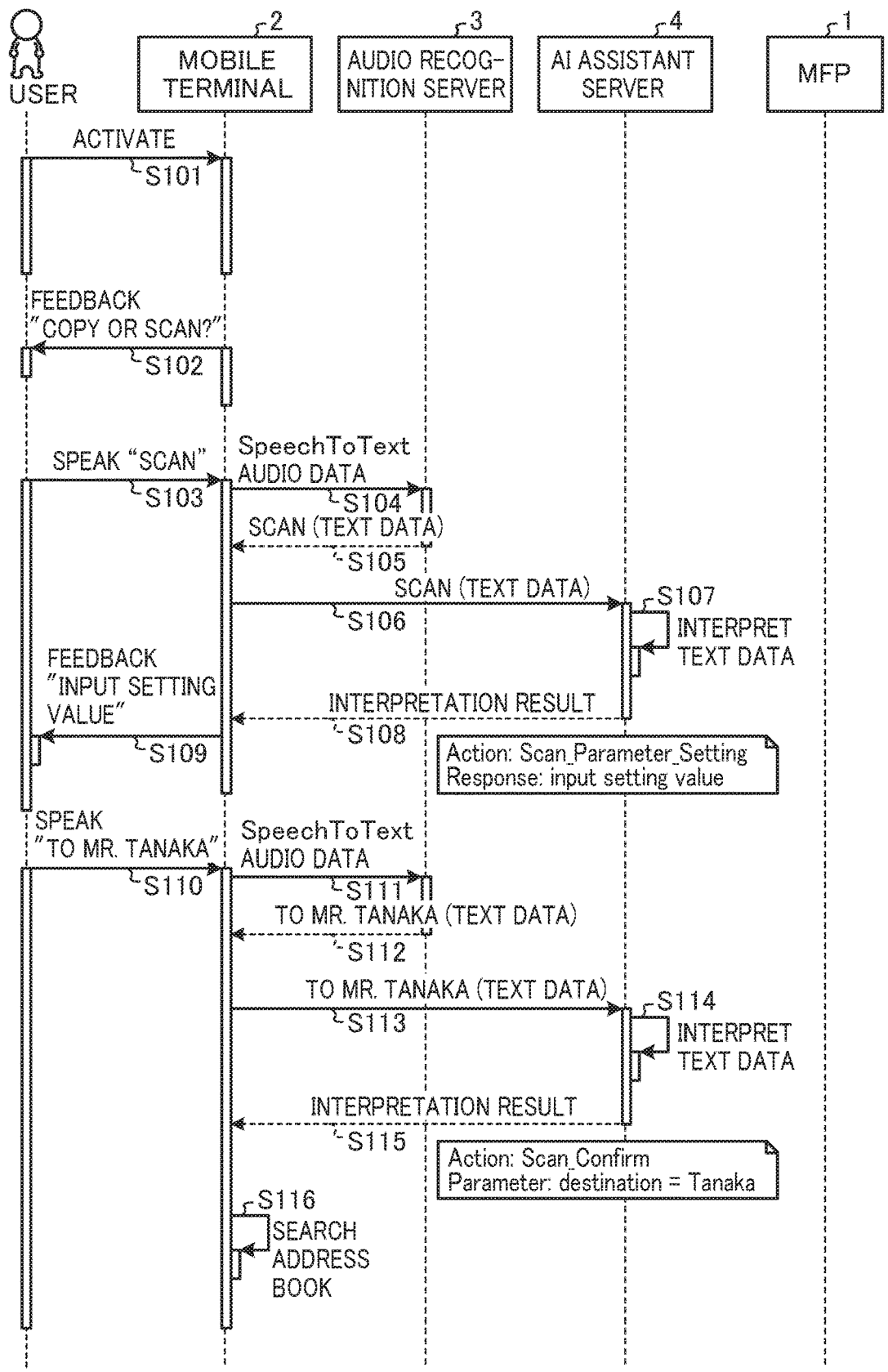
FIG. 19 is a sequence diagram illustrating a flow of a first half of an operation of transmitting a scanned image to a user designated from an address book by an interactive input operation in an audio-based operation system according to the first embodiment.
Figure 20:
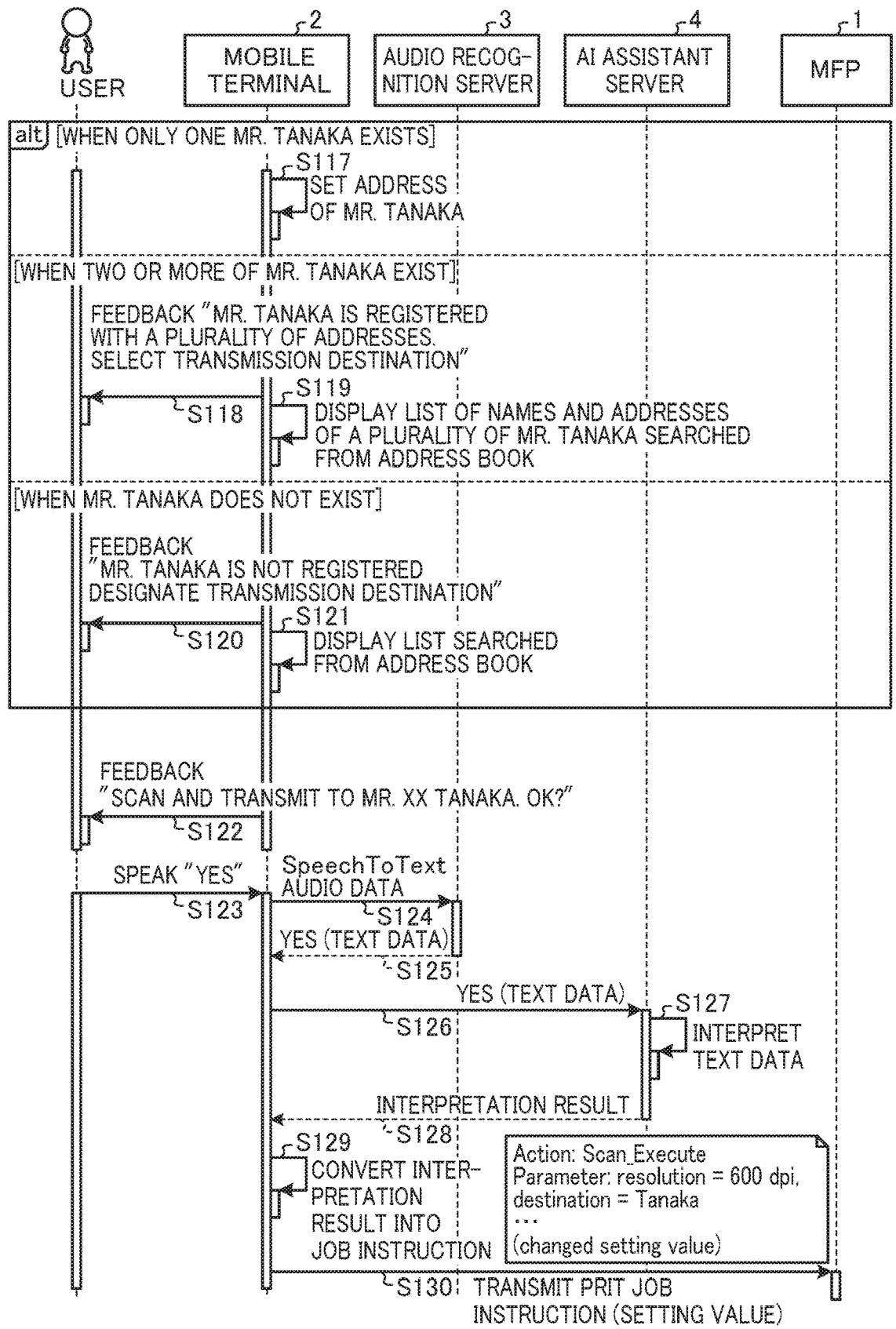
FIG. 20 is a sequence diagram illustrating a flow of a second half of an operation of transmitting a scanned image to a user designated from an address book by an interactive input operation in an audio-based operation system according to the first embodiment, continued from the first half of the operation of FIG. 19.

In the sequence diagram of FIG. 19, at first, when the mobile audio processing program of the mobile terminal 2 is activated (step S101), the audio feedback unit 55 outputs (speaks), for example, an audio feedback of "copy or scan?" for prompting a user to enter or input a job instruction (step S102).

If the user outputs (speaks) "scan" (step S103), audio data of "scan" is converted to text data, and then the text data is transmitted to the AI assistant server 4 (steps S104 to S106).

Since the scan instruction alone lacks the required parameter, the interpretation unit 72 transmits an interpretation result setting the Action of "Scan_Parameter_Setting" and the Response of "input setting value" to the mobile terminal 2 (steps S107 to S108).

Then, the audio feedback unit 55 of the mobile terminal 2 outputs (speaks) an input insufficient feedback of "input setting value" (step S109).

Then, if the user outputs (speaks) "To Mr. Tanaka" to this input insufficient feedback of "input setting value," audio data of "To Mr. Tanaka" is converted to text data, and then the text data is transmitted to the AI assistant server 4 (steps S111 to S113).

Then, the interpretation unit 72 of the AI assistant server 4 transmits an interpretation result setting the Action of "Scan_Confirm" and the Parameter of "destination=Tanaka" to the mobile terminal 2 (steps S114 to S115).

Then, the search unit 58 of the mobile terminal 2 searches an e-mail address of Mr. Tanaka from a storage area of the address book stored in the RAM 22 based on the Parameter included in the interpretation result (step S116).

The search area to be searched may not be limited to the RAM 22, but can be a server connected to the mobile terminal 2 via the network, or an inquiry whether or not an appropriate e-mail address exists in the MFP 1 can be transmitted to the MFP 1.

If only one Mr. Tanaka is recorded in the storage area of the address book, in step S117 of FIG. 20, the communication control unit 52 of the mobile terminal 2 creates an e-mail by setting the e-mail address of Mr. Tanaka stored in the storage area of the address book as a transmission destination. Then, the e-mail is transmitted by attaching the scanned image. As a result, the scanned image is transmitted to Mr. Tanaka.

If two or more of Mr. Tanaka are recorded in the storage area of the address book, that is, if a plurality of transmission destinations including information of "Tanaka" identifying the transmission destination exist, the audio feedback unit 55 of the mobile terminal 2 outputs (speaks) an input insufficient feedback of "Mr. Tanaka is registered with a plurality of addresses. Select transmission destination" (step S118).

Then, the search unit 58 of the mobile terminal 2 displays, on the touch panel 27, a list of names and e-mail addresses related to the plurality of Mr. Tanaka retrieved or searched from the storage area of the address book (step S119).

The user can select the desired Mr. Tanaka from the list. Then, the communication control unit 52 of the mobile terminal 2 creates an e-mail setting the e-mail address of Mr. Tanaka selected by the user as a transmission destination. Then, the e-mail is transmitted by attaching the scanned image. As a result, the scanned image is transmitted to Mr. Tanaka, corresponding to the transmission destination desired by the user.

If Mr. Tanaka is not recorded in the storage area of the address book, the audio feedback unit 55 of the mobile terminal 2 outputs (speaks) an input insufficient feedback of "Mr. Tanaka is not registered. Designate transmission destination" (step S120).

Then, the search unit 58 of the mobile terminal 2 displays, for example, a list of names and e-mail addresses retrieved or searched from the storage area of the address book, for example, in the alphabetical order, on the touch panel 27 (step S121).

Further, by displaying a keyboard on the touch panel 27, the user can manually input the e-mail address corresponding to the transmission destination using the keyboard, with which the name and the e-mail address can be acquired. Further, the acquired name and e-mail address can be registered in the address book.

The user can select a desired transmission destination from the list. Then, the communication control unit 52 of the mobile terminal 2 creates an e-mail address of the transmission destination selected by the user. Then, the e-mail is transmitted by attaching the scanned image. As a result, the scanned image is transmitted to the transmission destination desired by the user.

That is, when Mr. Tanaka or another person who are to be transmitted with the scan image is selected, the audio feedback unit 55 of the mobile terminal 2 outputs (speaks), for example, a confirmation feedback of "Scan and transmit to Mr. xxxxx Tanaka. OK?" (step S122).

If the user outputs (speaks) "YES" to this confirmation feedback (step S123), audio data of "YES" is converted to text data, and then the text data is transmitted to the AI assistant server 4 (steps S124 to S126).

Then, the AI assistant server 4 transmits an interpretation result setting the Action of "Scan_Execute" and the parameter of "resolution=600, destination=Tanaka" to the mobile terminal 2 (steps S127 to S128).

Then, the interpretation result conversion unit 53 of the mobile terminal 2 converts the interpretation result into a job instruction (step S129).

Then, the communication control unit 52 of the mobile terminal 2 transmits the job instruction to the MFP 1 together with the transmission destination information such as the name and the e-mail address used as the transmission destination (step S130). As a result, the scanned image is transmitted to the transmission destination desired by the user.

Operation of Printing File Searched from Memory of Mobile Terminal:

Hereinafter, a description is given of an operation of printing a file retrieved or searched from a memory such as the RAM 22 of the mobile terminal 2. The sequence diagram of FIG. 21 illustrates a flow of a first half of the operation, and the sequence diagram of FIG. 22 illustrates a flow of a second half of the operation.

Figure 21:
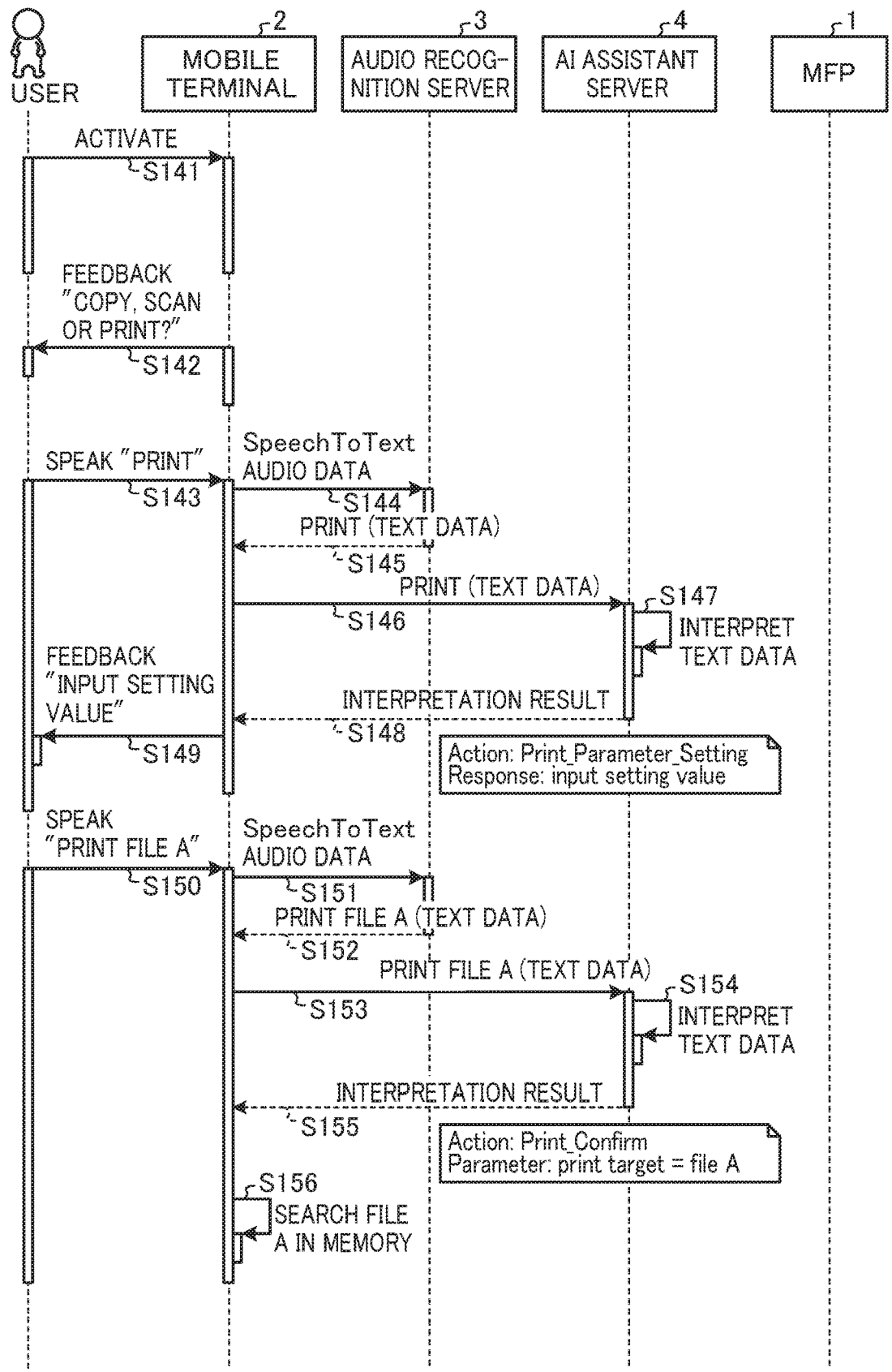
FIG. 21 is a sequence diagram illustrating a flow in a first half of an operation of printing a file designated from a memory by an interactive input operation in an audio-based operation system according to the first embodiment.
Figure 22:
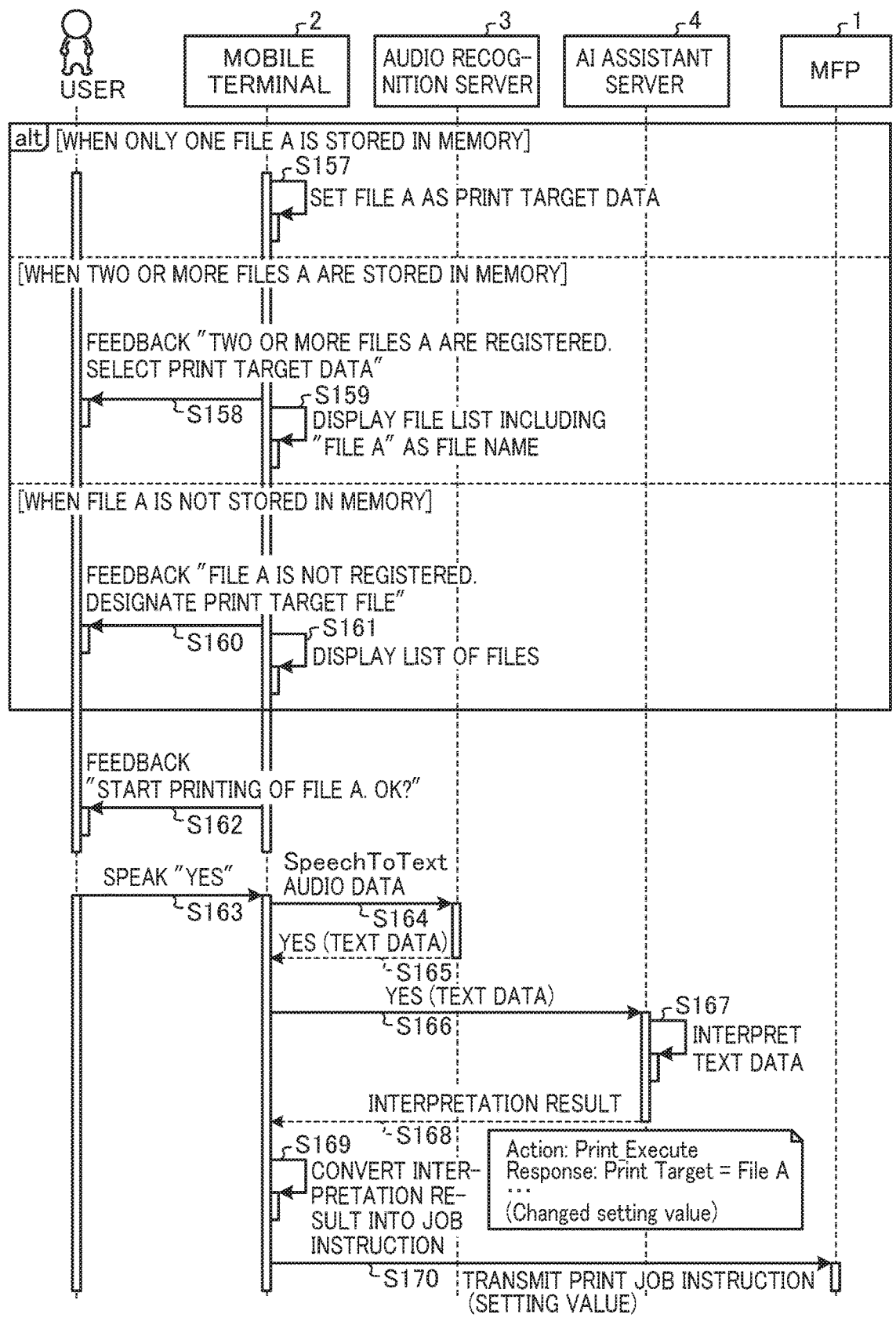
FIG. 22 is a sequence diagram illustrating a flow of a second half of an operation for printing a file designated from a memory by an interactive input operation in an audio-based operation system according to the first embodiment, continued from the first half of the operation of FIG. 21.

In the sequence diagram of FIG. 21, when the mobile audio processing program of the mobile terminal 2 is activated (step S141), the audio feedback unit 55 outputs (speaks) an audio feedback, such as "copy, scan, or print?" for prompting the user to enter or input a job instruction (step S142).

If the user outputs (speaks) "print" (step S144), audio data of "print" is converted to text data, and then the text data is transmitted to the AI assistant server 4 (steps S144 to S146).

Since the "print" instruction alone lacks the required parameter, the interpretation unit 72 transmits an interpretation result setting the Action of "Print_Parameter_Setting" and the Response of "input setting value" to the mobile terminal 2 (steps S147 to S148).

Thus, the audio feedback unit 55 of the mobile terminal 2 outputs (speaks) an input insufficient feedback of "input setting value" (step S149).

Then, if the user outputs (speaks) "print file A" to the input insufficient feedback (step S150), audio data of "print file A" is converted to text data, and then the text data is transmitted to the AI assistant server 4 (steps S151 to S153).

Then, the interpretation unit 72 of the AI assistant server 4 transmits an interpretation result setting the Action of "Print_Confirm" and the Parameter of "print target=file A" to the mobile terminal 2 (steps S154 to S155).

Then, the search unit 58 of the mobile terminal 2 searches the file A in the memory of the RAM 22 based on the Parameter included in the interpretation result (step S156).

The search area to be searched may not be limited to the RAM 22, but can be a server connected to the mobile terminal 2 via the network, or an inquiry whether or not an appropriate e-mail address exists in the MFP 1 can be transmitted to the MFP 1.

If only one file A is stored in the memory, in step S157 of FIG. 22, the communication control unit 52 of the mobile terminal 2 sets the file A as print target data or print target information. Then, the print target data of the file A is transmitted to the MFP 1 and printed.

If two or more files A are stored in the memory, the audio feedback unit 55 of the mobile terminal 2 outputs (speaks) an input insufficient feedback of "two or more files A are registered. Select print target data" (step S158).

Then, the search unit 58 of the mobile terminal 2 displays a file list including "file A" as the file name, retrieved or searched from the memory, on the touch panel 27 (step S159). Then, the user selects a desired file A from the file list. To be described later, the communication control unit 52 of the mobile terminal 2 transmits the file A selected by the user to the MFP 1 with a print request.

If the file A is not stored in the memory, the audio feedback unit 55 of the mobile terminal 2 outputs (speaks) an insufficient feedback of "file A is not registered in memory. designate print target file" (step S160).

Then, the search unit 58 of the mobile terminal 2 display a list of files retrieved or searched from the memory on the touch panel 27 (step S161). Then, the user selects a desired file from the file list. The communication control unit 52 of the mobile terminal 2 transmits the file selected by the user to the MFP 1 with the print request.

That is, when the file A or another file to be printed is selected, the audio feedback unit 55 of the mobile terminal 2 outputs (speaks), for example, a confirmation feedback of "start printing of file A. OK?" (step S162).

If the user outputs (speaks) "YES" to this confirmation feedback (step S163), audio data of "YES" is converted to text data, and then the text data is transmitted to the AI assistant server 4 (steps S164 to S166).

Then, the AI assistant server 4 transmits an interpretation result setting the Action of "Print_Execute" and the Response of "print target=file A" to the mobile terminal 2 (steps S167 to S168).

Then, the interpretation result conversion unit 53 of the mobile terminal 2 converts the interpretation result into a job instruction (step S169).

Then, the communication control unit 52 of the mobile terminal 2 transmits the job instruction to the MFP 1 together with the file selected by the user (step S170). In this way, the file selected by the user can be printed by the MFP 1.

As above described, the audio-based operation system of the first embodiment installs the operation audio processing program on the mobile terminal 2 as a platform application program, and the platform application program is used to relay the communication between the MFP 1, the audio recognition server 3, and the AI assistant server 4 in the first embodiment. When the user outputs (speaks) to the microphone 29 provided to the mobile terminal 2, the platform application program is executed to analyze the user spoken contents and operates the MFP 1 to perform the operation instructed by the user (audio input operation).

In this configuration, a complicated operation can be instructed using the audio input without operating a graphical user interface (GUI) displayed on the touch panel 27 or the like. Therefore, even if a user familiar with the operation by the GUI of the touch panel, the input operation can be performed further quickly and easily. Further, even if elder persons or users inexperienced in the operation using the GUI of the touch panel are to perform the input operation, the operation desired by the user, such as complicated network setting, advanced job setting and/or installing of a new application can be quickly and easily performed using the interactive operation assistance or support.

Further, since the user intention is analyzed based on the text of the user spoken contents, the AI assistant server 4 can determine the processing contents based on the user spoken contents.

Second Embodiment

Hereinafter, a description is given of an audio operation system according to a second embodiment.

Figure 23:
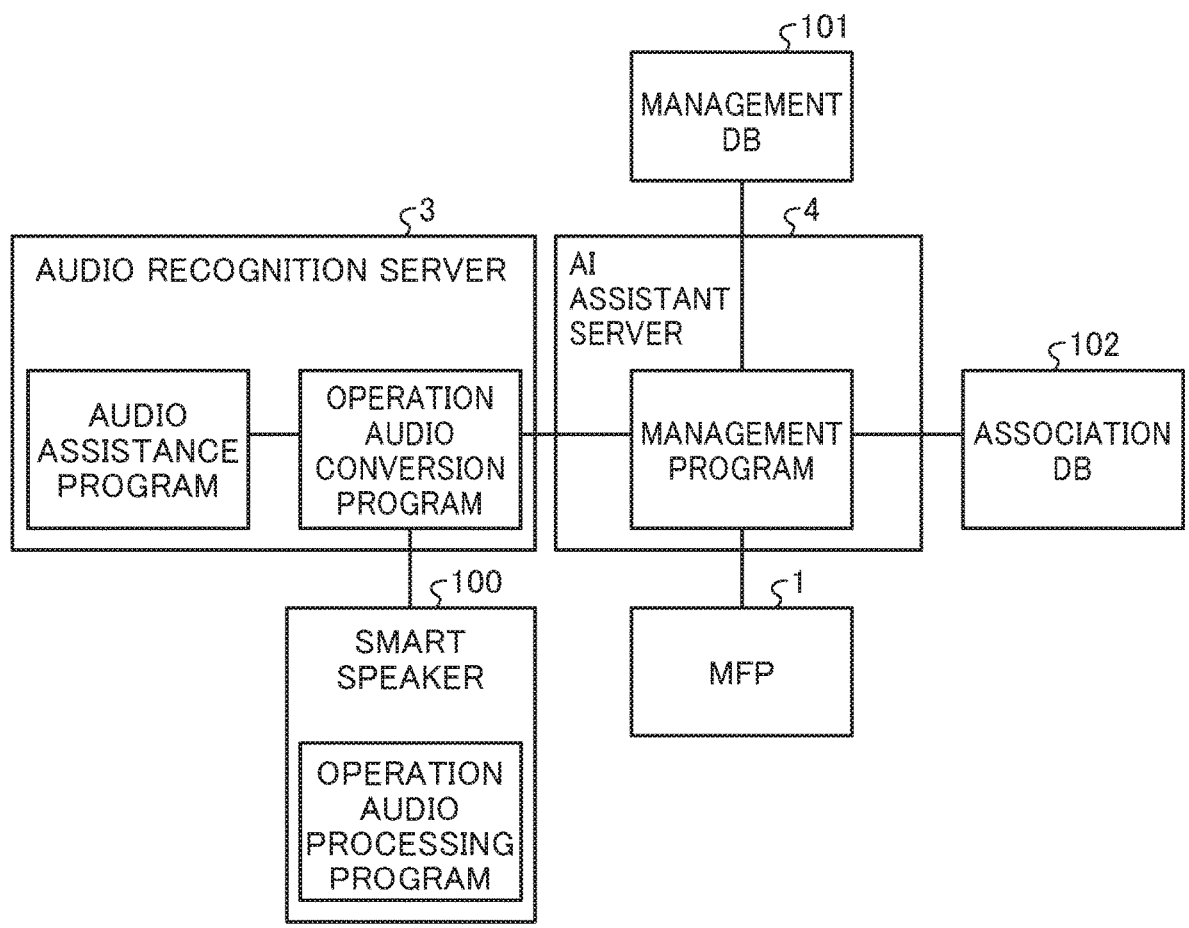
FIG. 23 is a system configuration of an audio-based operation system according to a second embodiment of the present disclosure.

System Configuration:

FIG. 23 illustrates a system configuration of an audio-based operation system according to the second embodiment of the present disclosure. As illustrated in FIG. 23, the audio-based operation system of the second embodiment includes, for example, one or more MFPs 1, one or more smart speakers 100 (or smart phones, tablet terminals, etc.), one or more audio recognition servers 3, and one or more AI assistant servers 4. The MFP 1, the smart speaker 100, the audio recognition server 3, and the AI assistant server 4 are connected to each other via a network 5, such as local area network (LAN). With this configuration, the audio recognition server 3 and the AI assistant server 4 can provide a cloud service.

Further, as an external apparatus, other electronic devices such as an electronic blackboard or a projector can be provided in addition to the MFP 1 or in place of the MFP 1.

As illustrated in FIG. 23, the AI assistant server 4 is provided with, for example, a management database (DB) 101 and an association database (DB) 102. The management DB 101 stores contents (data), such as text data, image data, audio data, and the like providable by the AI assistant server 4 as the cloud service. Further, the association DB 102 stores, for example, each device identification (ID) identifying each smart speaker 100 and the device identification (ID) of the MFP 1 associated with each smart speaker 100, in association with each other. That is, the association DB stores the device ID of each smart speaker 100 and the device ID of the MFP 1 in association with each other so that the MFP 1 that can be operated using the audio-based operation using each smart speaker 100 can be identified.

As to the management DB 101 and the association DB 102, a storage unit such as an HDD on the network 5, usable by the cloud service, can be used. Further, as to the management DB 101 and the association DB 102, one or both of the management DB 101 and the association DB 102 can be stored in another server accessible by the cloud service via the network 5.

The smart speaker 100 includes a microphone (corresponding to the microphone 29 in FIG. 3) for acquiring an audio input from a user to be used for audio-based operation of the MFP 1. Further, the smart speaker 100 includes a speaker (corresponding to the speaker 28 in FIG. 3) for performing an audio feedback to prompt the user to input information determined to be insufficient or the like. Further, the smart speaker 100 performs data communication with the audio recognition server 3 and the AI assistant server 4, which provide the cloud service, to communicate, for example, audio data, text data, image data, and the like. The audio recognition server 3 analyzes audio data received from the smart speaker 100, and converts the audio data into text data. Further, the audio recognition server 3 interprets user intention based on text data and dictionary information registered in advance, and transmits an interpretation result to the AI assistant server 4.

The AI assistant server 4 converts the interpretation result received from the audio recognition server 3 into a job execution instruction using an information format interpretable by the MFP 1, and transmits the job execution instruction to the MFP 1. The MFP 1 executes the job execution instruction transmitted from the cloud service. In this description, the job execution instruction can be used as specific operation execution information described in the information format interpretable by the target apparatus, such as the MFP 1.

Hardware Configuration of MFP:

The MFP 1 includes a plurality of image processing functions, such as a printer function and a scanner function. That is, as described with reference to FIG. 2, the MFP 1 includes the controller 7, the communication unit 15, the operation unit 16, the scanner engine 17, and the printer engine 18.

The controller 7 includes the CPU 10, the ASIC 11, the memory 12, the hard disk drive (HDD) 13, and the timer 14. The CPU 10 to the timer 14 are connected to each other via the bus line to enable communication with each other.

The communication unit 15 is connected to the network 5, and, to be described later, acquires a job execution instruction, such as a scan instruction or a print instruction, input by audio using the mobile terminal 2.

The operation unit 16 is a so-called touch panel, in which a liquid crystal display unit (LCD) and a touch sensor are integrally formed. When an operator performs an execution instruction of a desired operation using the operation unit 16, the operator can designate the desired operation by performing a touch operation on one or more operation buttons (software keys) displayed by using the operation unit 16.

The scanner engine 17 controls the scanner unit to optically read document. The printer engine 18 controls the image writing unit to print an image on, for example, a transfer sheet. The CPU 10 controls the image forming apparatus entirely. The ASIC 11 is a large-scale integrated circuit (LSI), and performs various image processing necessary for images to be processed by the scanner engine 17 and the printer engine 18. The scanner engine 17 and the printer engine 18, which are engines for executing the job execution instruction acquired from the mobile terminal 2, correspond to the functional units.

The memory 12 stores various applications to be executed by the CPU 10 and various data to be used when executing various applications. The HDD 13 stores image data, various programs, font data, various files, and the like. A solid state drive (SSD) can be provided in place of the HDD 13 or along with the HDD 13.

Hardware Configuration of Smart Speaker:

Similar to the mobile terminal 2 illustrated in FIG. 3, the smart speaker 100 includes, for example, the CPU 21, the RAM 22, the ROM 23, the interface (I/F) 24, and the communication unit 25 connected with each other via the bus line 26.

The ROM 23 stores the operation audio processing program. By executing the operation audio processing program, the CPU 21 acquires audio information from the microphone 29 and transmits the audio information to the cloud service. Further, the CPU 21 controls the touch panel 27 to display data (e.g., audio data, text data, image data) acquired from the cloud service, and controls an audio output via the speaker 28.

The I/F 24 is connected to the touch panel 27, the speaker 28, and the microphone 29. The microphone 29 collects (acquires) an audio input from a user as a job execution command to the MFP 1 in addition to voice calling. The input audio is transmitted to the cloud service via the communication unit 25.

Hardware Configuration of Cloud Service:

As illustrated in FIG. 4, the audio recognition server 3 (and the AI assistant server 4), which constitute the cloud service, includes, for example, the CPU 31 (41), the RAM 32 (42), the ROM 33 (43), the HDD 34 (44), the interface (I/F) 35 (45), and the communication unit 36 (46) connected to each other via the bus line 37 (47).

The I/F 35 is connected to the display unit 38 and the operation unit 39. The HDD 34 stores the operation audio conversion program to convert audio data into text data, determine whether the text data matches pre-set dictionary information, and, if the text data matches the pre-set dictionary information, to convert the text data into an intent indicating a user intention and one or more parameters indicating variables of job conditions. Further, the HDD 34 stores an audio assistant program for storing the dictionary information, and a management program for transmitting data to the registered MFP after converting the job execution instruction using an information format interpretable by the MFP based on the intent and parameter.

The CPU 31 executes these programs. The operation audio conversion program, the audio assistant program, and the management program can be executed by one server, or can be executed by different servers, respectively. Further, these programs can be executed by cooperating a plurality of servers.

Figure 24:
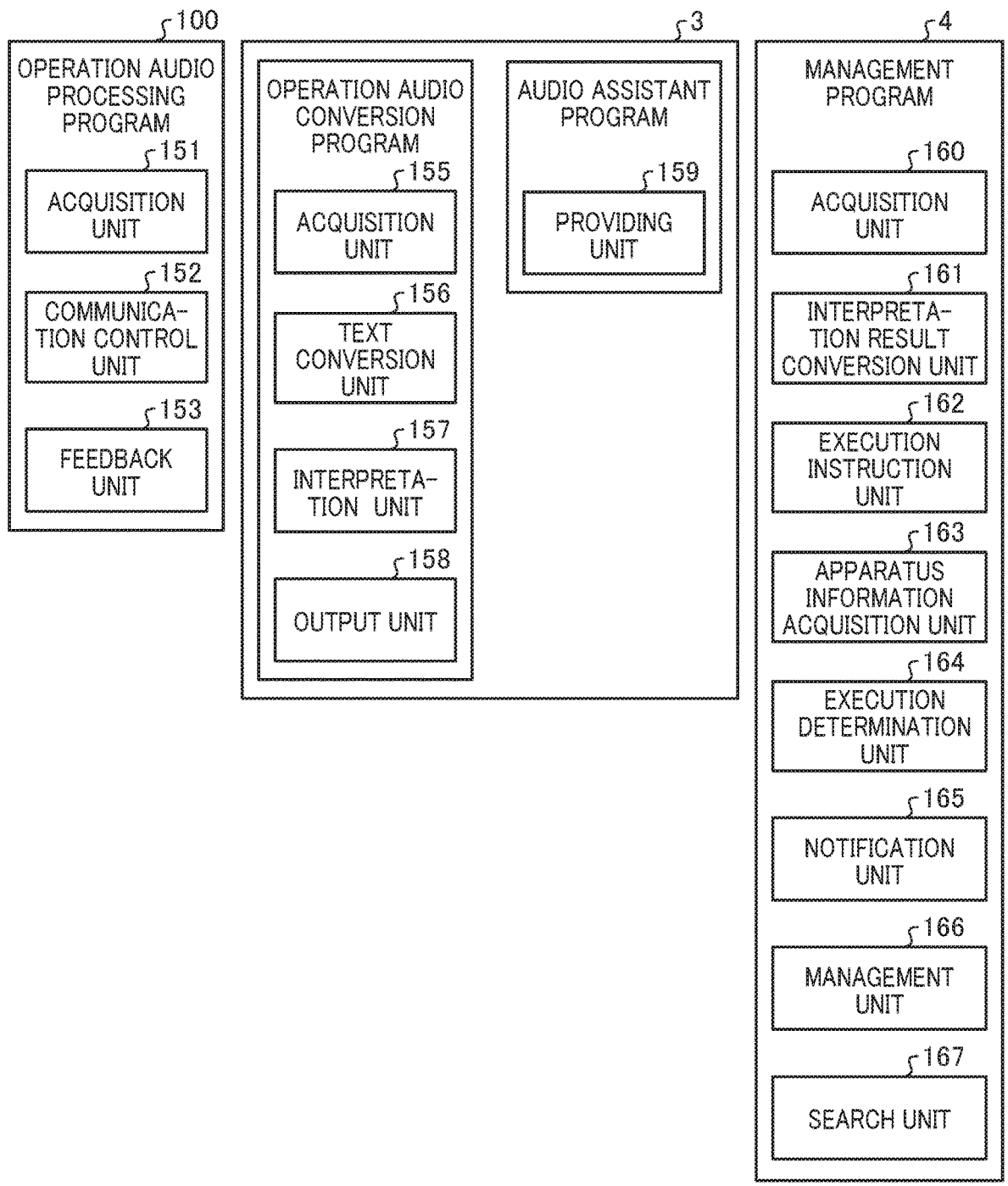
FIG. 24 is a diagram illustrating functions implemented by a smart speaker by executing an operation audio processing program, functions implemented by an audio recognition server by executing an operation audio conversion program and an audio assistant program, and functions implemented by an AI assistant server by executing a management program according to the second embodiment.

Function Implementable by Program:

FIG. 24 is an example of a functional block diagram illustrating each functional unit implemented by the CPU 21 of the smart speaker 100 by executing the operation audio processing program. FIG. 24 is also an example of a functional block diagram illustrating each functional unit implemented by the CPU 31 of the audio recognition server 3 by executing the operation audio conversion program and the audio assistant program. FIG. 24 is also an example of a functional block diagram illustrating each functional unit implemented by the CPU 41 of the AI assistant server 4 by executing the management program.

Function of Operation Audio Processing Program:

The CPU 21 of the smart speaker 100 executes the operation audio processing program stored in a storage such as the ROM 23 to implement functions, such as an acquisition unit 151, a communication control unit 152, and a feedback unit 153.

The acquisition unit 51 acquires an audio instruction (i.e., audio information) of user to be used for the audio-based operation of the MFP 1, via the microphone 29. Further, the acquisition unit 151 can obtain or acquire a user operation and instruction via a touch panel or a physical switch.

The communication control unit 152 controls communication between the smart speaker 100 and the cloud service. The communication control unit 152 transmits information acquired by the acquisition unit 151 to the cloud service, and acquires text data, image data, and audio data from the cloud service. Further, when transmitting information acquired by the acquisition unit 151 to the cloud service, the communication control unit 152 transmits the device ID identifying the smart speaker 100.

In order to implement an interactive audio input operation, for example, the feedback unit 153 feeds back audio that prompts an operation of inputting or entering the missing data (insufficient data), and feeds back audio that is used to confirm the input operation. Further, the feedback unit 153 can provide text and/or image as the feedback to a user using the display function of the touch panel 27.

In this example case, the acquisition unit 151 to the feedback unit 153 are implemented by the software, but a part or all of the acquisition unit 151 to the feedback unit 153 can be implemented by hardware such as integrated circuit (IC). Further, the acquisition unit 151 to the feedback unit 153 can be implemented by the operation audio processing program alone, or a part of the acquisition unit 151 to the feedback unit 153 can be implemented by another program, or the acquisition unit 151 to the feedback unit 153 can be implemented indirectly by another program.

Function of Operation Audio Conversion Program:

The CPU 31 of the audio recognition server 3 executes the operation audio conversion program stored in the HDD 34 to implement functions, such as an acquisition unit 155, a text conversion unit 156, an interpretation unit 157, and an output unit 158.

The acquisition unit 155 acquires audio data input by a user, which is transmitted from the smart speaker 100. Further, the acquisition unit 155 can also acquire a user operation on a touch panel, a button, a switch, or the like of the smart speaker 100.

The text conversion unit 156 converts the audio data input by the user into text data.

The interpretation unit 157 interprets a user instruction based on the text data. Specifically, based on the dictionary information provided by the audio assistant program, the interpretation unit 157 checks or confirms whether a word (i.e., term) included in the text data matches the dictionary information. If the word included in the text data matches the dictionary information, the interpretation unit 157 converts the text data into an intent indicating a user intention, and one or more parameters indicating variables of job conditions. The interpretation unit 157 transmits the intent and parameter to the management program together with the device ID of the smart speaker 100 identifying the smart speaker 100 that is used to acquire the audio data.

The output unit 158 controls the communication unit 36 to transmit data, such as text data, audio data, image data, and the like to the smart speaker 100.

In this example case, the acquisition unit 155 to the output unit 158 are implemented by the software, but a part or all of the acquisition unit 155 to the output unit 158 can be implemented by hardware such as integrated circuit (IC). Further, the acquisition unit 155 to the output unit 158 can be implemented by the operation audio conversion program alone, or a part of the acquisition unit 155 to the output unit 158 can be implemented by another program, or the acquisition unit 155 to the output unit 158 can be implemented indirectly by another program. For example, a part or all of the functions of the interpretation unit 157 of the operation audio conversion program can be executed using the audio assistant program. In this case, for example, the confirmation of whether or not the word in the text data matches the dictionary information can be performed using the audio assistant program, and if the word in the text data matches the dictionary information, the conversion of the text data into the intent indicating the user intention and the parameters indicating variables of job conditions can be performed using the audio assistant program, and then the interpretation unit 157 acquires the intent and the parameters from the audio assistant program.

Function of Audio Assistant Program:

The CPU 31 of the audio recognition server 3 executes the audio assistant program stored in the HDD 34 to implement a providing unit 159. The providing unit 159 manages the dictionary information, defining the relationship between the text data, intent and parameters in advance, stored in the HDD 34, and provides the dictionary information to the operation audio conversion program. Further, an operation instruction input by a user can be interpreted based on the text data. Specifically, the text data is acquired from the operation audio conversion program, and then it is determined whether a word included in the text data matches the dictionary information, and if the word included in the text data matches the dictionary information, the text data is converted into the intent and parameters. Thereafter, the intent and the parameters are provided to the operation audio conversion program.

In this example case, the providing unit 159 is implemented by the software, but a part or all of the providing unit 159 can be implemented by hardware such as integrated circuit (IC) as similar to other programs described above.

Function of Management Program:

The CPU 41 of the AI assistant server 4 executes the management program stored in the HDD 44 to implement functions, such as an acquisition unit 160, an interpretation result conversion unit 161, an execution instruction unit 162, an apparatus information acquisition unit 163, an execution determination unit 164, a notification unit 165, a management unit 166, and a search unit 167.

The acquisition unit 160 acquires the intent, the parameter and the device ID of the smart speaker 100, which are transmitted from the audio recognition server 3. The interpretation result conversion unit 161 converts the interpretation result such as the intent and parameter, converted by the operation audio conversion program, into a job execution instruction using an information format interpretable by the MFP 1. The execution instruction unit 162 transmits the job execution instruction to the MFP 1 to instruct the MFP 1 to execute the job.

The execution instruction unit 162 refers to the association DB 102 and transmits the job execution instruction to the MFP 1 associated with the smart speaker 100. That is, the execution instruction unit 162 acquires the device ID identifying the smart speaker 100 used by the user together with the intent and parameter, searches the MFP 1 associated with the acquired device ID identifying the smart speaker 100 from the association DB 102, and transmits the job execution instruction to the searched MFP 1.

The apparatus information acquisition unit 163 acquires, from the MFP 1, apparatus information indicating processing capability, such as the maximum number of pixels processable by the MFP 1. Further, the apparatus information acquisition unit 163 stores and manages the apparatus information acquired from a plurality of external apparatuses, such as the MFP 1, in a storage unit such as an HDD, in association with identification information such as the device ID identifying each external apparatus.

Further, the apparatus information acquisition unit 163 acquires apparatus state information including connection state information indicating whether a communication connection with the MFP 1 has been established, power state information such as ON/OFF or sleep mode of the power supply of the MFP 1, information on existence/non-existence of error and type of error, residual state information of consumable such as sheet and toner, user login state information, and access right information indicating functions that are allowed to be used by a log-in user, and the like.

The execution determination unit 57 compares the processing capability of the MFP 1 indicated by the apparatus information with the job designated by the user (i.e., the intent and parameter generated by the operation audio conversion program) to determine whether the job designated by the user can be executed by using the processing capability of the MFP 1. If the execution determination unit 57 determines that the job designated by the user is executable by using the processing capability of the MFP 1, the execution determination unit 57 transmits the job execution instruction to the MFP 1. Further, if the execution determination unit 57 determines that the job designated by the user is not executable by using the processing capability of the MFP 1, the execution determination unit 57 feeds back response information such as an error message to the smart speaker 100 via the operation audio conversion program.

The notification unit 165 notifies the text data, audio data, image data, and the like to the operation audio conversion program as the response to the job execution instruction by the user. Further, if the parameter indicating the job condition to be used for executing the job is determined to be insufficient, the notification unit 165 provides a feedback to the terminal (e.g., smart speaker 100) via the operation audio conversion program to prompt the user to input the parameter determined to be insufficient. In this case, the parameter information can be transmitted as the information that is necessary to check and confirm the missing parameter (insufficient parameter), or the text data, audio data, and image data can be transmitted as the information necessary to prompt the user to designate the parameter.

The management unit 166 associates and registers the device ID of the smart speaker 100 and the device ID of the MFP 1 in the association DB 102 based on information and instruction input to a client device connected to the cloud service via the MFP 1, the smart speaker 100, or the network. The association DB 102 stores information associating the device ID of the smart speaker 100 and the device ID of the MFP 1 in, for example, a management table or the like.

In this example case, the acquisition unit 160 to the search unit 167 are implemented by the software, but a part or all of the acquisition unit 160 to the search unit 167 can be implemented by hardware such as integrated circuit (IC) as similar to other programs described above.

Further, the operation audio processing program, the operation audio conversion program, the audio assistant program, and the management program may be recorded on a recording medium readable by a computer device such as a compact disk ROM (CD-ROM), a flexible disk (FD) or the like in a file of an installable format or an executable format. Further, the operation audio processing program, the operation audio conversion program, the audio assistant program, and the management program may be recorded on a recording medium readable by a computer device such as CD-R, digital versatile disk (DVD), Blu-ray Disc (registered trademark), semiconductor memory, or the like. Further, the operation audio processing program, the operation audio conversion program, the audio assistant program, and the management program may be installed from a network such as the Internet or the like, or may be provided in advance in a ROM or the like.

Figure 25:
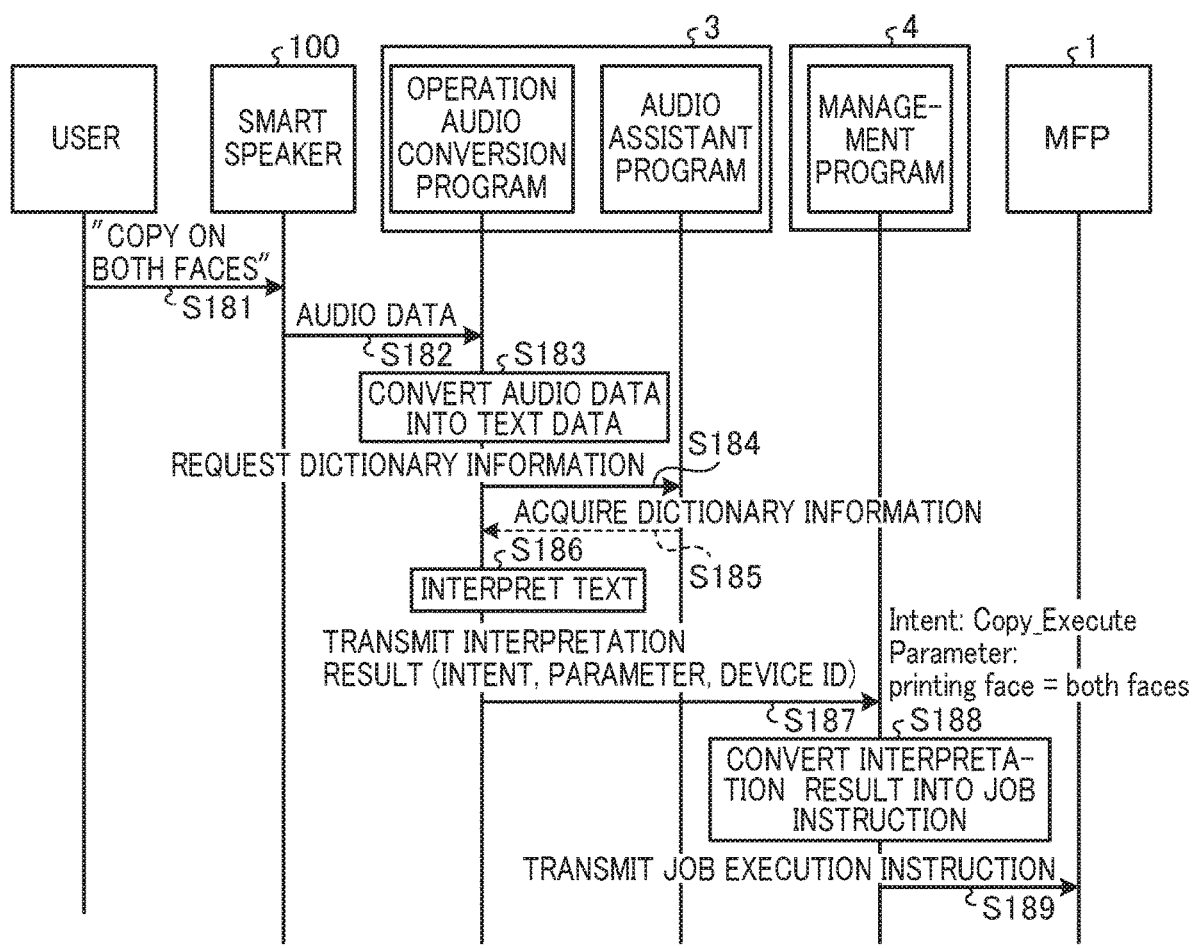
FIG. 25 is a diagram illustrating an overall operation of an audio input operation in an audio-based operation system according to the second embodiment.

Operation of Audio Input:

Hereinafter, a description is given of an overall operation of audio input operation in the audio-based operation system according to the second embodiment with reference to FIG. 25. In example case in FIG. 25, the both-face (both-side) copying function of the MFP 1 is operated using an audio input via the smart speaker 100.

In this example case, a user activates the operation audio processing program of the smart speaker 100 and outputs (speaks), for example, "copy on both faces" (step S181). The audio (voice) of the user is collected by the microphone 29 of the smart speaker 100 and is then acquired by the acquisition unit 151. The operation audio processing program may be activated simultaneously with activation of the smart speaker 100, or may be activated when a given operation or a given audio input is performed on the smart speaker 100.

Then, the communication control unit 152 of the smart speaker 100 transmits audio data of "copy on both faces" to the audio recognition server 3 used as the cloud service (step S182). In step S182, the communication control unit 152 transmits the device ID of the smart speaker 100 identifying the smart speaker 100 to the audio recognition server 3.

Then, the text conversion unit 156 of the audio recognition server 3 converts the audio data of "copy on both faces" into text data (step S183).

Then, based on the dictionary information acquired from the audio assistant program (steps S184, S185), the interpretation unit 157 checks or confirms whether a word included in the text data matches the dictionary information (step S186).

If the word included in the text data matches the dictionary information, the interpretation unit 157 converts the text data into an intent indicating an operation instructed by the user and one or more parameters indicating variables of job conditions, and transmits the intent and the parameter to the AI assistant server 4 together with the device ID identifying the smart speaker 100 that is used to acquire the audio data (step S187).

Specifically, in this example case, the interpretation unit 157 interprets an operation to be requested to the MFP 1 is "copy (Intent: Copy_Execute)" and interprets that "printing face is both faces (printing face=both faces) (step S186). In this manner, based on the text data, the interpretation unit 157 generates an interpretation result indicating the type (Intent) and the content (Parameter) of the job designated by the user.

Then, the interpretation unit 157 transmits the interpretation result to the management program (step S187). In step S187, the interpretation unit 157 can transmit the device ID identifying the smart speaker 100, used as a transmission source of the audio data, to the AI assistant server 4 in association with the interpretation result.

Then, the interpretation result conversion unit 161 implemented by the management program of the AI assistant server 4 converts the interpretation result acquired from the smart speaker 100 into a job instruction of the MFP 1 (step S188). An example of the interpretation result and an example of the job instruction converted from the interpretation result are described above with reference to Table 1. Further, the interpretation result conversion unit 161 may store the information corresponding to Table 1 in a storage unit such as the HDD 44 of the AI assistant server 4, and refers to Table 1 to convert the interpretation result into the job instruction.

In the above example case in Table 1, "COPY_EXECUTE," "SCAN_EXECUTE," "PRINT_EXECUTE," and "FAX_EXECUTE" are examples of the Intent. Further, "printing face," "number of copies," and the like are examples of the Parameter. The Parameter includes all parameters that can be designated as the job setting values.

The interpretation result conversion unit 161 of the AI assistant server 4 converts an interpretation result of "COPY_EXECUTE" into a job instruction of the MFP 1, such as "execution of copy job." Similarly, the interpretation result conversion unit 161 converts an interpretation result of "SCAN_EXECUTE" into a job instruction of the MFP 1, such as "execution of scan job." Similarly, the interpretation result conversion unit 161 converts an interpretation result of "PRINT_EXECUTE" into a job instruction of the MFP 1, such as "execution of print job." Similarly, the interpretation result conversion unit 161 converts an interpretation result of "FAX_EXECUTE" into a job instruction of the MFP 1, such as "execution of FAX job."

Although the above description is an example of basic jobs executable in the MFP 1, the jobs that can be interpreted by the cloud service are not limited to the basic jobs. For example, a job that causes a communication target apparatus to collect apparatus information and to transmit the apparatus information to the cloud service, or a job that causes the communication target apparatus to display given information stored in a storage unit of the communication target apparatus on a display of the communication target apparatus can be instructed.

Further, if the interpretation result includes the parameter of "printing face," the interpretation result conversion unit 161 generates a job instruction of the MFP 1, which may require "changing setting value of printing face." Similarly, if the interpretation result includes the parameter of "number of copies," the interpretation result conversion unit 161 generates a job instruction of the MFP, which may require "changing setting value of the number of copies."

That is, the interpretation result conversion unit 161 determines the user intention, such as a type of job to be executed by the MFP 1, based on the information included in the "Intent" of the interpretation result, and determines the value included in the "Parameter" as the job setting value, and then converts the interpretation result into the job instruction.

Then, the interpretation result conversion unit 161 of the AI assistant server 4 transmits the job instruction, generated as above described, to the MFP 1 via the communication unit 36 (step S189). In this example case, the job instruction of "copy job execution (printing face=both faces)" is transmitted to MFP 1. The communication control unit 52 transmits the job instruction to the MFP 1 identified by the management unit 166. That is, the user can instruct the MFP 1 identified by the device ID, associated with the device ID identifying the terminal (e.g., smart speaker 100) used as the transmission source of audio data, to execute the job. As a result, the duplex printing is executed in the MFP 1.

Interpretation in Cloud Service:

The dictionary information is stored, for example, in the HDD 34 of the audio recognition server 3. The operation audio conversion program generates the Intent and Parameter based on the dictionary information. More specifically, the operation audio conversion program determines whether a word included in text data converted from audio data matches the dictionary information, and, if the word included in the text data converted from the audio data matches the dictionary information, the operation audio conversion program generates an interpretation result including the Intent and Parameter defined in the dictionary information The dictionary information can be any form as long as the Intent and Parameter can be generated. For example, in this description, the dictionary information includes entity information (Entity), intent information (Intent), and association information. The entity information is information that associates a parameter of job with natural language, and more than one synonym can be registered for one parameter. The intent information is information indicating the type of job. The association information is information that associates the user spoken phrase (natural language) and the entity information, and the user spoken phrase (natural language) and the intent information, respectively. The association information enables a correct interpretation even if the spoken order of the parameter and/or nuance of the parameter are slightly changed. Further, based on the associated information, text of response (interpretation result) can be generated based on the input contents.

FIG. 10 illustrates the entity information according to the embodiment. The example illustrated in FIG. 10 is the entity information corresponding to the print color. In FIG. 10, a character string of "printColor" indicates an entity name. In FIG. 10, each of characters strings such as "auto_color," "monochrome," "color," and the like in the left column indicates a parameter name. In FIG. 10, each of character strings such as "auto_color," "monochrome, black and white," "color, full color," and the like in the right column indicates synonyms.

As indicated in FIG. 10, the parameters and synonyms are associated with each other and stored as the entity information. By registering the synonyms together with parameters, for example, when copying in monochrome is instructed, the parameter can be set even if a user speaks "please copy black and white" and "please copy by monochrome."

FIG. 11A illustrates user spoken phrases according to the embodiment. FIG. 11B illustrates an intent name according to the embodiment. FIG. 11C illustrates the entity information according to the embodiment. As indicated in FIGS. 11A to 11C, by operating the operation unit 39 on a screen displayed on the display unit 38 provided for the cloud service, the user spoken contents can be dragged. Alternatively, by operating an operation unit on a screen displayed on a display unit of a device that accesses the cloud service via the network, the user spoken contents can be dragged.

With this configuration, the entity information, which is a target of association, can be selected. Further, when a value ("VALUE" in FIG. 11C) is set for the selected entity information, the parameter, which is entered as the response, is changed. For example, if the user outputs (speaks) "Please copy by black and white," and the value is "SprintColor," a return value of "printColor=monochrome" is returned. In contrast, if the value is "SprintColor.original," then a return value of "printColor=black and white" is returned. In this case, if the value is "SprintColor.original," the user spoken contents itself can be returned as the parameter of the response.

Interactive Operation:

Hereinafter, a description is given of an interactive operation system implemented in the audio-based operation system of the embodiments, in which the interactive operation system responds based on audio contents input by a user. In the audio-based operation system of the embodiments, in addition to responding to common phrases necessary for the interactive operation, an interactive MFP operation system is implemented by performing two types of responses, such as "input insufficient feedback" and "input confirmation feedback" as the responses specifically set for the operation of the MFP 1.

The "input insufficient feedback" is a response that is output when information required to execute a job is not enough. If the information contents input by the user cannot be recognized by the system, or if the required parameter is determined to be insufficient, the "input insufficient feedback" is output. That is, for parameters other than the required parameters (hereinafter, non-relevant parameter), it is not necessary to provide insufficient feedback even if the non-relevant parameter is not instructed. Further, in addition to the parameters, a process of checking to-be-used functions, such as a copying function and a scanning function, can be also included in the "input insufficient feedback."

For example, depending on the type of an external apparatus connected to a cloud service apparatus for communication, the functions and the parameters to be confirmed by the user can be changed. In this case, the apparatus information acquisition unit 163 acquires information indicating the type and function of the external apparatus at a given timing after the communication with the external apparatus is established, and then the feedback unit 153 determines which functions and parameters are to be confirmed by the user based on the acquired information.

For example, if the type of external apparatus is MFP 1, the functions included in MFP 1 such as copying, printing, scanning, facsimile can be confirmed by the user, and the functions, such as copying, printing, scanning, facsimile, included only in the MFP 1 can be confirmed by the user. Further, the required parameter can be changed in accordance with the setting conditions designated by the user. That is, if the printing condition designated by the user is variable magnification printing, the setting of to-be-printed sheet size is set as the required parameter, if the printing condition designated by the user is the duplex printing, the setting of one face or both faces is set as the required parameter, and if the printing condition designated by the user is the magazine binding, the setting of the finishing size and the setting of the number of pages to be included in one page are set as the required parameters.

The "input confirmation feedback" is a response that is output when the information required to execute the job is completely prepared. That is, the input confirmation feedback is output only when all of the required parameters are instructed. Further, the input confirmation feedback is performed to prompt the user to select whether to execute the job using the current setting values or to change the current setting values. In order to confirm whether or not to execute the job using the current setting values, all of the parameters (any required parameter and any non-required parameter) instructed by the user can be output as an audio sound so that the parameters can be confirmed by the user.

Interactive Operation when MFP Performs Copying of Plurality of Copies on Both Faces:

FIGS. 26 to 34 are sequence diagrams illustrating a flow of an interactive operation using the MFP 1.

Figure 26:
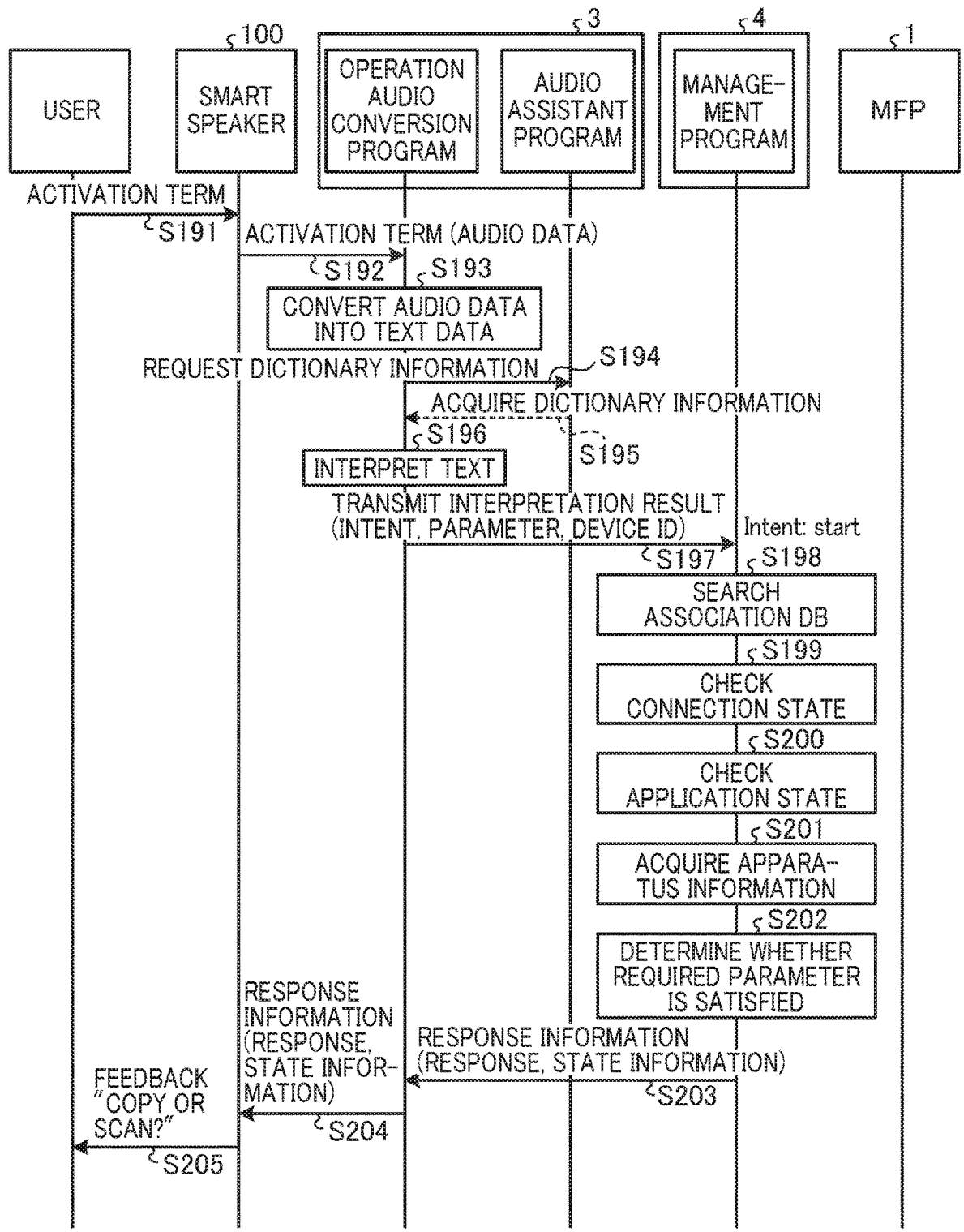
FIG. 26 is a sequence diagram illustrating a flow of an activation operation of an audio assistant program according to the second embodiment.

Flow of Activation Operation of Audio Assistant Program:

A sequence diagram of FIG. 26 illustrates a flow of an activation operation of the audio assistant program. In FIG. 26, at first, a user activates the operation audio processing program of the smart speaker 100, and then instructs an activation of the audio assistant program using, for example, by an audio input. For example, if the user outputs (speaks) an activation term to activate the audio assistant program, the audio assistant program of the audio recognition server 3 can be activated (step S191).

Then, the communication control unit 152 of the smart speaker 100 transmits audio data of the activation term to the audio recognition server 3 (step S192).

Then, the text conversion unit 156 of the audio recognition server 3 converts the audio data of the activation term into text data (step S193).

Then, the interpretation unit 157 of the audio recognition server 3 refers to the dictionary information (e.g., dictionary information stored in the HDD 34) provided by the audio assistant program (steps S194, S195) to convert the text data of the activation term into an intent and parameter (text interpretation) (step S196), and then transmits the text data to the AI assistant server 4 together with the device ID of the smart speaker 100 (step S197).

Then, the execution determination unit 164 of the AI assistant server 4 determines whether or not all conditions necessary for the job execution are set based on the intent and parameter (steps S198 to S202).

Specifically, the execution determination unit 164 determines whether the required parameter is satisfied (step S202). If the required parameter is not satisfied, the execution determination unit 164 transmits response information to the smart speaker 100 via the operation audio conversion program of the audio recognition server 3 (steps S203, S204).

The response information includes, for example, text data, audio data, image data, and the like. In this example case, text data of "copy or scan?" is transmitted to the smart speaker 100. The content is not limited to a message prompting the user to input the type of job or the job setting conditions. Further, if the text data cannot be converted into audio data at the smart speaker 100, the audio data can be transmitted to the smart speaker 100. Further, the feedback to the user can be performed not only by outputting an audio but also by displaying text or image on the touch panel 27. As a result, the feedback unit 153 of the smart speaker 100 performs an audio feedback of "copy or scan?" (step S205).

If the type and setting conditions of the job are designated when the audio assistant program of the audio recognition server 3 is instructed to be activated, the above described steps can be omitted. Further, prior to transmitting the response information, the execution determination unit 164 of the AI assistant server 4 can search the MFP 1, associated with the acquired device ID of the smart speaker 100, from the association DB 102.

In this case, if the MFP 1 associated with the device ID of the smart speaker 100 is not stored in the association DB 102, the execution determination unit 164 notifies the user that the smart speaker 100 is not connected to the communication target apparatus. For example, the execution determination unit 164 generates response information including a response that "this device is not associated with the apparatus." In this case, the execution determination unit 164 can include a method of associating the device and the communication target apparatus in the response. Further, searching of the MFP 1 from the association DB 102 and generation of the response information can be performed at any timing when the device ID of the smart speaker 100 is acquired.

Further, the execution determination unit 164 can be configured to check an apparatus state of the communication target apparatus prior to transmitting the response information. By obtaining or acquiring the apparatus information using the apparatus information acquisition unit 163, or by referring to the apparatus information acquired in advance by the apparatus information acquisition unit 163, the execution determination unit 164 determines whether the communication can be performed with the communication target apparatus, and determines whether the communication target apparatus can be used. At this timing, if the connection with the MFP 1 associated with the device ID of the smart speaker 100 is not established, or if the MFP 1 cannot be used due to the activation of MFP 1, the execution determination unit 164 notifies a given response to the user.

For example, the execution determination unit 164 generates response information including a response that "apparatus is offline" or "apparatus is in sleep mode." In this case, the execution determination unit 164 can include a countermeasure method in the response. Further, checking of the apparatus status can be performed at any timing when the intent, parameter, and device ID are acquired from the operation audio conversion program of the audio recognition server 3.

Further, prior to transmitting the response information, the execution determination unit 164 can check the state of application that is used to execute the function designated by the user at the communication target apparatus. By obtaining or acquiring the apparatus information using the apparatus information acquisition unit 163, or by referring to the apparatus information acquired in advance by the apparatus information acquisition unit 163, the execution determination unit 164 determines whether the application is installed, or whether the application is in a state that the application can be executed.

For example, if the application related to the copy function, instructed to be executed, is not installed on the MFP 1 associated with the device ID of the smart speaker 100, or if the application related to the copy function cannot be used due to the activation of the application, the execution determination unit 164 notifies a given response to the user. For example, the execution determination unit 164 generates response information including a response of "no application is installed" or "application is not currently available." In this case, the execution determination unit 164 can include a countermeasure method in the response.

Further, checking of the state of application can be performed at any timing when the intent, the parameter and the device ID are acquired from the operation audio conversion program. Further, prior to transmitting the response information, the execution determination unit 164 can acquire the apparatus information by using the apparatus information acquisition unit 163, or by reading the apparatus information acquired in advance by the apparatus information acquisition unit 163. For example, the acquired apparatus information is used to determine whether the job type and job condition instructed by the user can be executed at the communication target apparatus.

Figure 27:
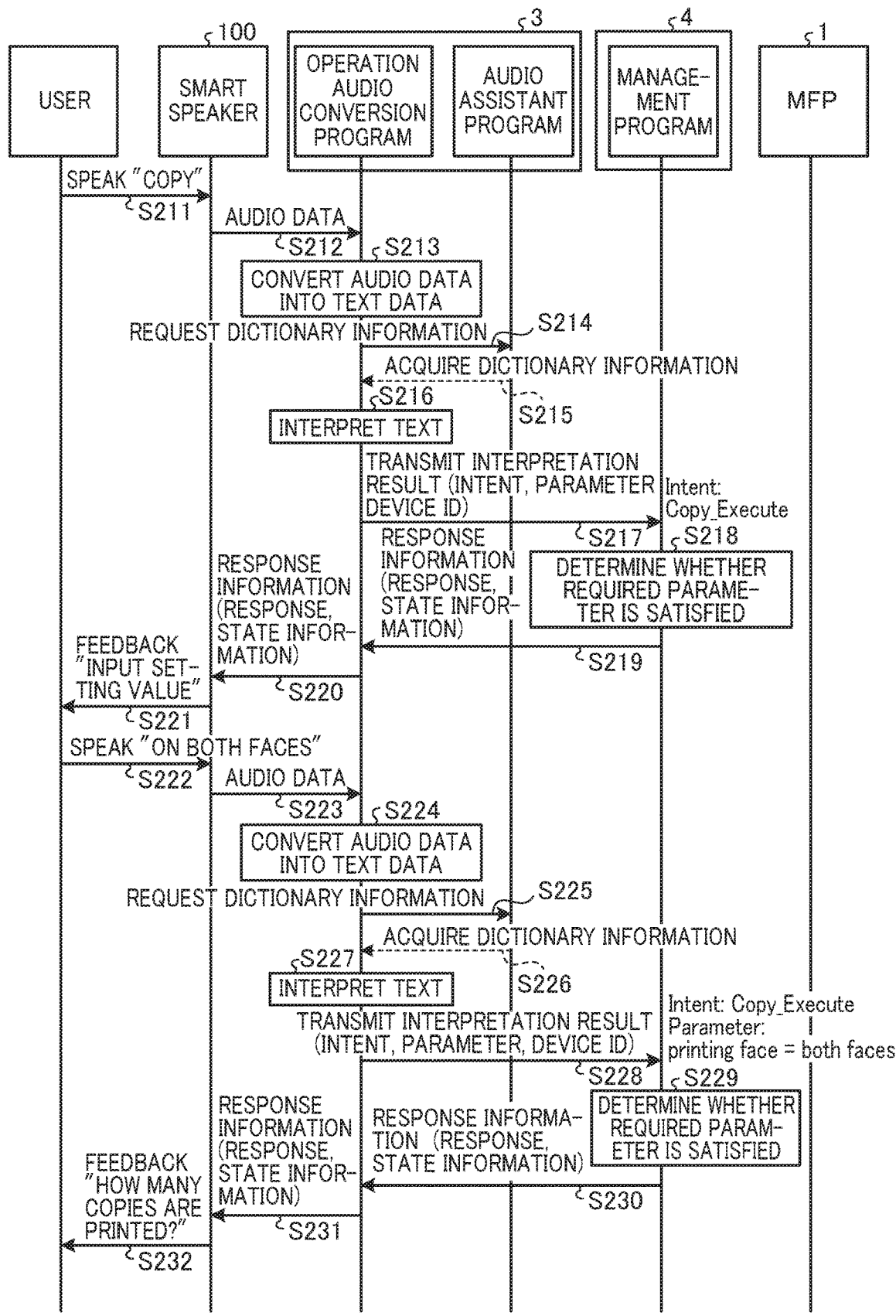
FIG. 27 is a sequence diagram illustrating a flow of an operation when a copy function is instructed according to the second embodiment.

Flow of Activation Operation of Audio Assistant Program:

FIG. 27 is a sequence diagram illustrating a flow of an operation when a copy function is instructed. If the user outputs (speaks) "copy" (step S211) in response to the audio feedback of "copy or scan?" in step S205 of FIG. 26, or if the user outputs (speaks) "copy" when instructing the activation of the audio assistant program, the communication control unit 152 of the smart speaker 100 transmits audio data of "copy" to the audio recognition server 3 (step S212).

Then, the text conversion unit 156 implemented by the operation audio conversion program of the audio recognition server 3 converts the audio data of "copy" into text data (step S213).

As described with reference to FIGS. 10 and 11, the interpretation unit 157 of the audio recognition server 3 interprets a phrase spoken by the user indicated by the text data (steps S214 to S216), and then transmits an intent and one or more parameters as an interpretation result to the AI assistant server 4 together with the device ID of the smart speaker 100. In this example case, an intent of "COPY_EX- ECUTE" is generated as the interpretation result and then transmitted to the management program (step S217).

In this example case, since the user only outputs (speaks) "copy," the number of copies and the copying format such as one face (one-sided) or two faces (two-sided) are not instructed (input insufficient). Therefore, the execution determination unit 164 implemented by the management program of the AI assistant server 4 determines that the required parameter is not satisfied (step S218). As a result, the AI assistant server 4 inquires the insufficient parameter to the smart speaker 100 (steps S219, S220).

Specifically, the execution determination unit 164 of the AI assistant server 4 generates response information (Response) of, for example, "input setting value." Then, the notification unit 165 implemented by the management program of the AI assistant server 4 transmits the response information to the smart speaker 100 via the audio conversion program of the audio recognition server 3 (steps S219, S220).

Then, the feedback unit 153 of the smart speaker 100 outputs (speaks) an audio of "input setting value" via the smart speaker 100 and also instructs the touch panel 27 to display the text of "input setting value" (step S221: input insufficient feedback). Further, any one of the audio output and the text display on the touch panel can be omitted.

Further, when transmitting the response information to the operation audio conversion program, the notification unit 165 implemented by the management program of the AI assistant server 4 can transmit state information indicating that a session is being continued. The state information is information indicating the state of session. For example, if the transmission of a job execution instruction to an external apparatus such as the MFP 1 has not yet performed and the job setting processing by the user is being continued, the state information indicating that the session is being continued is transmitted. Further, if the transmission of the job execution instruction to the external apparatus is completed, the state information indicating that the session has completed is transmitted.

However, the state information is not limited to thereto, but can be changed to any information indicating the state of session in more details. Specifically, the interpretation unit 157 implemented by the operation audio conversion program of the audio recognition server 3 determines whether the session is to be continued or terminated in accordance with the state information. That is, even if a user designates the job setting condition using a plurality of user spoken contents, separately spoken, while the session is being continued, the interpretation unit 157 of the operation audio conversion program determines that the plurality of job setting conditions belongs to one job, and if the session is terminated, the interpretation unit 157 determines that the job setting condition included in the user spoken contents belongs to a new job. Thus, the operation audio conversion program of the audio recognition server 3 can determine whether the job type and the job setting condition belong to the same job or to another new job even if the instruction of job type and the job setting condition of the job setting condition is performed for a plurality of times.

Further, the operation audio conversion program of the audio recognition server 3 can determine that the session is terminated if a state not receiving a signal from the smart speaker 100 continues for a given time period or more. Even if the audio recognition server 3 manages the session, the communication target apparatus (e.g., MFP 1) can execute the job regardless of the session. In this case, in response to acquiring the job execution instruction, the MFP 1 over-writes and sets the job conditions included in the acquired job execution instruction to the job conditions currently retained by the MFP 1, in which the job conditions included in the job execution instruction can be set by deleting all of the job conditions previously retained by the communication target apparatus or by returning the job conditions retained by the communication target apparatus to the default conditions.

As to given job conditions included in the job execution instruction that are different from the job conditions retained in the communication target apparatus, the given job conditions included in the job execution instruction can be used to overwrite the job conditions retained in the communication target apparatus with a higher priority, and as to the given job conditions included in the job execution instruction that are the same as the job conditions retained in the communication target apparatus, the job condition retained in the communication target apparatus can be maintained and used. Further, if the job execution is completed, the job conditions included in the job execution instruction can be deleted from the communication target apparatus, and then the communication target apparatus can be set with the default state registered for the communication target apparatus.

Then, in response to the input insufficient feedback output from the smart speaker 100, the user outputs (speaks) an instruction of copying format, such as "on both faces" (step S222).

Then, the communication control unit 152 of the smart speaker 100 transmits audio data of "on both faces" to the audio recognition server 3 with an audio-to-text conversion request (step S223).

Then, the text conversion unit 156 implemented by the operation audio conversion program of the audio recognition server 3 converts the audio data of "on both faces" into text data (step S224).

Then, the interpretation unit 157 of the audio recognition server 3 interprets a phrase spoken by the user indicated by the text data (steps S225 to S227), and then transmits an intent and parameter as an interpretation result to the AI assistant server 4 together with the device ID of the smart speaker 100 (step S228).

In this example case, the Parameter of "printing face=both faces" is generated as the interpretation result. In this case, the interpretation unit 157 transmits the interpretation result including the Intent of "COPY_EXECUTE" and the Parameter of "printing face=both faces" to the AI assistant server 4 together with the Intent and Parameter included in the previously spoken contents.

In this example case, since the user only outputs (speaks) "copy" and "on both faces," the number of copies is unknown (again, the required parameter is insufficient). In the above description, the operation audio conversion program of the audio recognition server 3 integrates the interpretation result of the previous spoken contents and the interpretation result of the currently spoken contents to generate the intent and the parameter, but not limited thereto. That is, the management program of the AI assistant server 4 can store the interpretation result of the previous spoken contents and integrate the interpretation result of the previous spoken contents and the interpretation result of the currently spoken contents to generate the intent and the parameter. In this example case, the interpretation unit 157 of the audio recognition server 3 can transmit only the Parameter of "printing face=both faces" newly acquired by the currently spoken contents to the management program of the AI assistant server 4.

Further, the required parameters among a plurality of parameters can be stored in the storage unit such as the HDD 44 of the AI assistant server 4 in advance. In this case, based on information of all of the required parameters stored in the storage unit, the execution determination unit 164 of the AI assistant server 4 can determine whether the parameters acquired from the smart speaker 100 are sufficient to set all of the required parameters, and can prompt the user, via the smart speaker 100, to set the required parameter if the setting of required parameter has not been completed.

Therefore, the execution determination unit 164 implemented by the management program of the AI assistant server 4 generates response information (Response) of "How many copies are printed" (step S229).

Then, the notification unit 165 of the AI assistant server 4 transmits the response information to the smart speaker 100 via the operation audio conversion program of the audio recognition server 3 (steps S230, S231).

Then, the feedback unit 153 of the smart speaker 100 outputs an audio of "How many copies are printed?" via the speaker 28, and also instructs the touch panel 27 to display the text of "How many copies are printed?" (step S232: input insufficient feedback).

Figure 28:
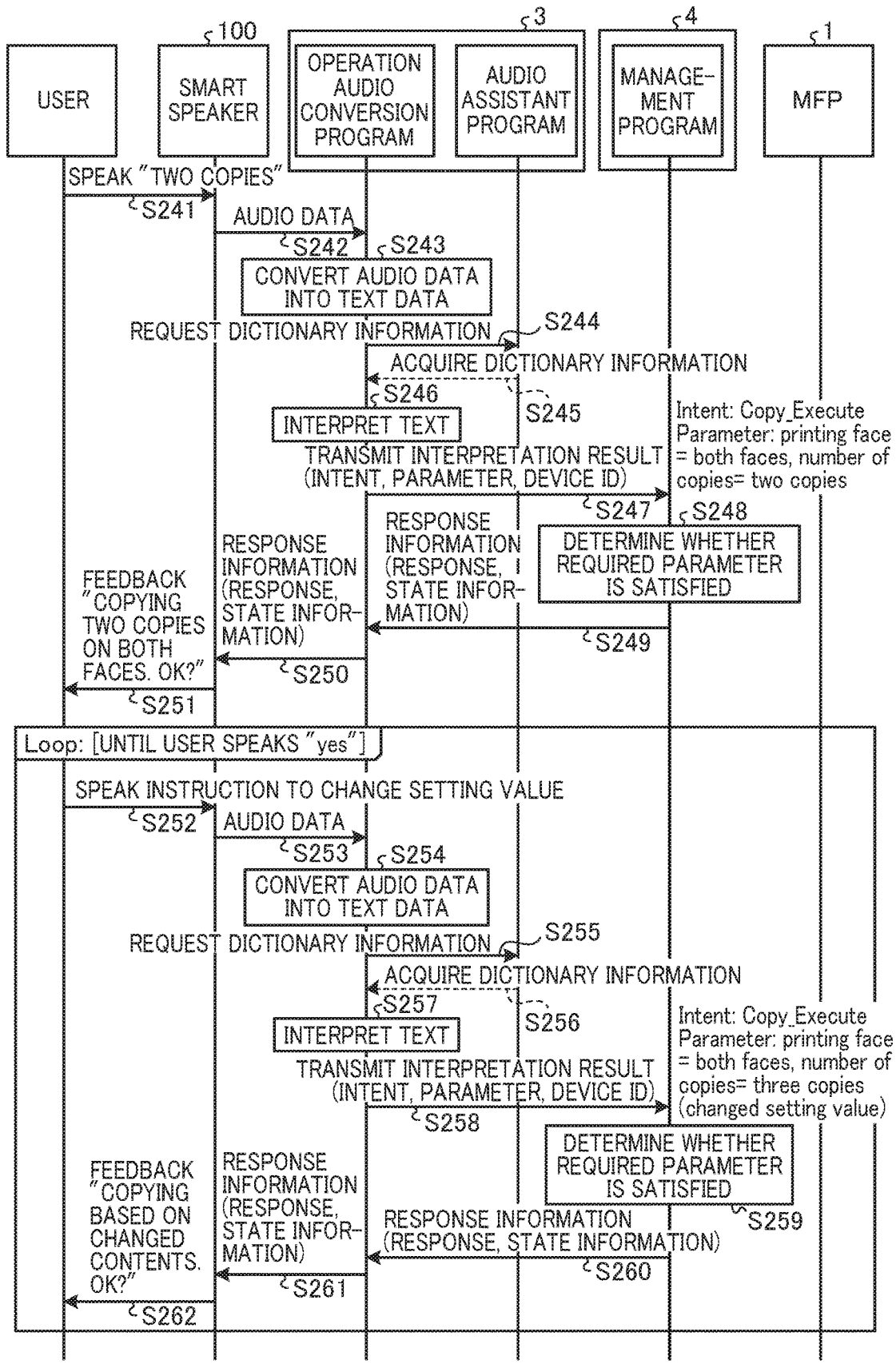
FIG. 28 is a sequence diagram illustrating a flow of an operation when a number of copies is set according to the second embodiment.

Setting of Number of Copies:

FIG. 28 is an example of a sequence diagram illustrating a flow of an operation of setting the number of copies. Since the input insufficient feedback of "How many copies are printed?" is output (spoken) via the smart speaker 100 in step S232 of the sequence diagram (FIG. 27), the user outputs (speaks), for example, "two copies" (step S241).

Then, the communication control unit 152 of the smart speaker 100 transmits audio data of "two copies" to the audio recognition server 3 with an audio-to-text conversion request (step S242).

Then, the text conversion unit 156 implemented by the operation audio conversion program of the audio recognition server 3 converts the audio data of "two copies" into text data (step S243).

Then, the interpretation unit 72 of the operation audio conversion program interprets a phrase spoken by the user indicated by the text data based on the dictionary information (steps S244 to S246). In this example case, the interpretation unit 72 generates an interpretation result setting the Parameter of "number of copies=two copies."

Then, the interpretation unit 72 transmits the interpretation result including the Intent of "COPY_EXECUTE" and the Parameter of "printing face=both faces, number of copies=two copies" to the AI assistant server 4 together with the Intent and Parameter included in the previous spoken contents (step S247).

If the execution determination unit 164 of the AI assistant server 4 receives the Parameter of "printing face=both faces, number of copies=two copies," the execution determination unit 164 determines that the state of insufficient parameter required for the copy job has been solved by determining that the required parameter is satisfied (step S248), and then the execution determination unit 164 generates response information of "Copying two copies on both faces. OK?"

Then, the response information is transmitted to the smart speaker 100 via the notification unit 165 and the audio recognition server 3 (steps S249, S250).

Based on the Response included in the response information, the audio feedback unit 55 of the smart speaker 100 outputs an audio and text of the input confirmation feedback such as "copying two copies on both faces. OK?" indicating that the state of insufficiency of required parameter has been solved and is ready to start copying (step S251).

Instead of outputting the text data and audio data included in the response information, text data, which is generated from the text data stored in the storage unit of the smart speaker 100 and the information included in the response information, can be output as an audio (e.g., sound) or text image. In response to this input confirmation feedback, the user instructs to change the setting value or to start copying.

Changing of Setting Value:

When a change of setting value is instructed, the user performs an audio input of to-be-changed setting value to the smart speaker 100 (step S252). For example, when the number of copies is to be changed from two to three, the user outputs (speaks) "three copies" to input "three copies." Further, when the printing face is changed from both faces to one face, the user outputs (speaks) "one face" to input "one face" as the printing face. Based on this audio input, the AI assistant server 4 determines whether the required parameter is satisfied, and then, based on the response information from the AI assistant server 4, the smart speaker 100 outputs (speaks), for example, an input confirmation feedback of "copying based on changed contents. OK?" (steps S253 to S262).

The operation of changing the setting value (steps S252 to S262) is repeated until the user outputs (speaks) an audio (i.e., inputs audio) that can be used as the setting value in response to the input confirmation feedback, in which the user can input an instruction of the setting value using a text input or a button input. That is, the operation of changing the setting value is repeated until the user outputs (speaks) an audio of "YES" that accepts the setting value set for the input confirmation feedback.

Figure 29:
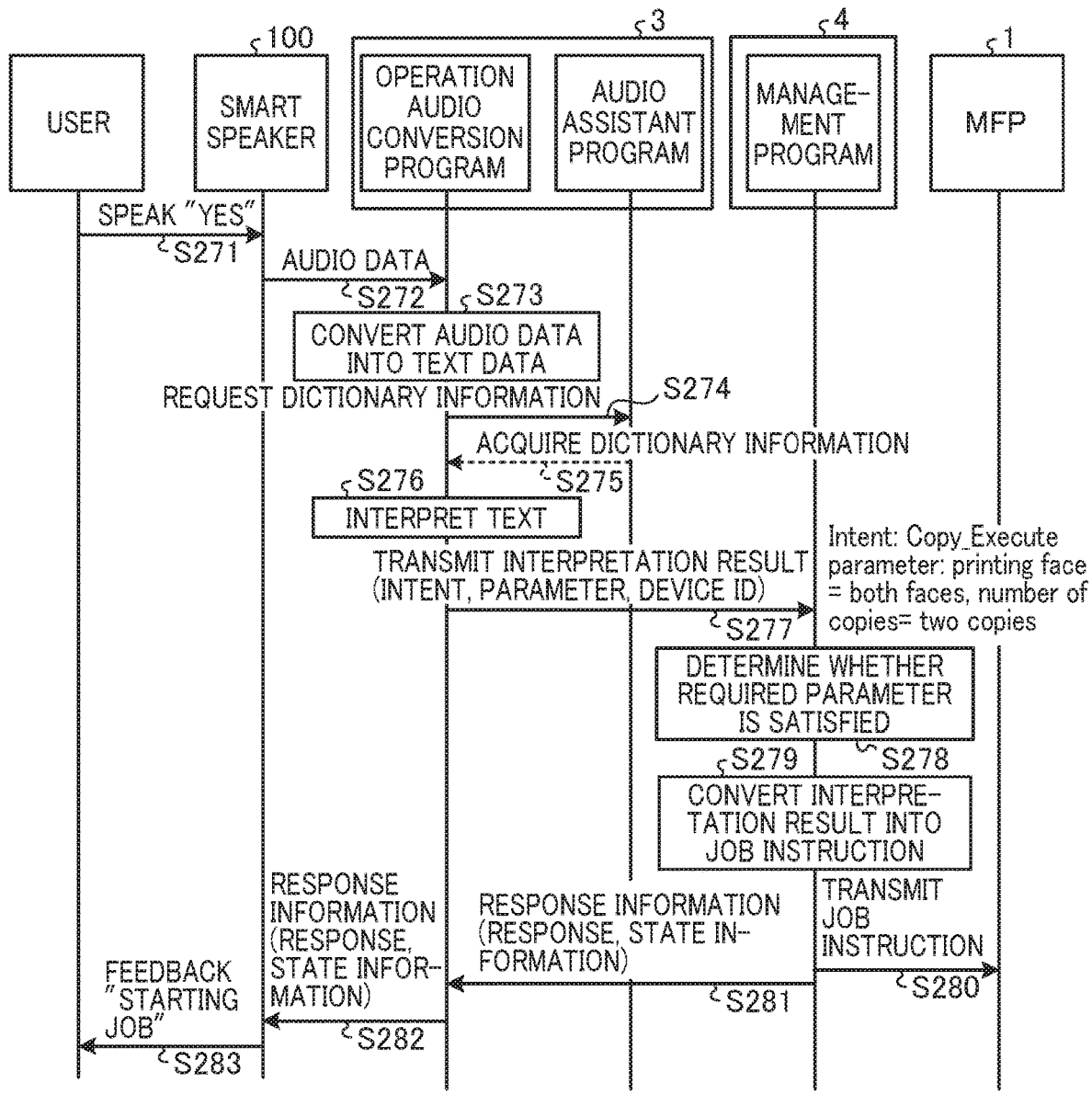
FIG. 29 is a sequence diagram illustrating a flow of an operation when a job execution instruction is transmitted to an MFP according to the second embodiment.

Flow of Operation of Job Execution Instruction to MFP:

FIG. 29 is a sequence diagram illustrating a flow of operation of the job execution instruction to the MFP 1. If the user outputs (speaks) "YES" to the input confirmation feedback as above described (step S271), audio data of "YES" is converted to text data by the operation audio conversion program of the audio recognition server 3 (steps S272, S273).

If the interpretation unit 157 implemented by the operation audio conversion program of the audio recognition server 3 recognizes a copy start instruction based on the text data, the interpretation unit 157 generates an interpretation result adding the Parameter of "printing face=both faces, number of copies=two copies" to the Intent of "COPY_EXECUTE," and transmits the interpretation result to the management program (steps S274 to S277).

If the execution determination unit 164 implemented by the management program of the AI assistant server 4 determines that the interpretation result satisfies the required parameter (step S278), the interpretation result conversion unit 161 converts the interpretation result into a job instruction of the MFP 1 (step S279).

Then, the execution instruction unit 162 transmits the job instruction information to the MFP 1 (step S280). As a result, the functions of the MFP 1 such as copying, scanning, the number of copies such as one copy and two copies, and the execution mode of one face or both faces can be set by performing the audio input, with which the operation of the MFP 1 can be controlled.

When the job execution is instructed to the MFP 1 (step S280), the execution instruction unit 162 of the AI assistant server 4 generates information indicating that the job execution is instructed to the MFP 1 and the response information including the current job execution state (the current state of the MFP).

Then, the notification unit 165 of the AI assistant server 4 transmits the response information to the smart speaker 100 via the audio recognition server 3 (steps S281, S282).

When the smart speaker 100 detects the information indicating that the job execution is instructed from the response information, the smart speaker 100 outputs, for example, an audio feedback and/or a text feedback, such as "starting (designated) job" (step S283). Thus, the user can recognize that the execution of the designated job has been started in the MFP 1.

Further, if the execution determination unit 164 implemented by the management program of the AI assistant server 4 determines that the interpretation result satisfies the required parameter (step S278), the feedback operation to the smart speaker 100 can be omitted.

Feed Back Information from AI Assistant Server:

As above described, the feedback unit 153 of the smart speaker 100 outputs the text data and/or audio data included in the response information. However, the feedback unit 153 can generate the text data corresponding to the response information based on the text data stored in the storage unit of the smart speaker 100, and can output a feedback, such as audio output and text output.

Specifically, as described above with reference to Table 2, for example, the Intent of "COPY_PARAMETER_SETTING" for prompting the input of job setting value and "COPY_CONFIRM" for prompting the confirmation of the job setting value can be included in the response information, and then the response information is fed back to the smart speaker 100 from the AI assistant server 4.

The feedback unit 153 of the smart speaker 100 determines a feedback to a user in accordance with the Intent, Parameter, and Response included in the response information. The feedback unit 153 can be configured to store the information corresponding to Table 2 in the storage unit of the smart speaker 100, and refer to the information corresponding to Table 2 to determine the feedback contents.

Table 2 describes a case of copying, but "PARAMETER_SETTING" for prompting the user to input the job setting value and "CONFIRM" for prompting the user to confirm the job setting value can be used as the Action of "printing, scanning, and facsimile" as similar to Table 2. The response information includes the Intent and at least one of the Parameter and Response.

Further, the parameters, such as the setting values of printing face indicating both faces or one face, and the number of copies, can be included in the response information and fed back to the mobile terminal 2. Further, if the required parameter is determined to be insufficient, a message for prompting the input of the missing parameter (insufficient parameter) can be included in the response, and then the response is fed back to the smart speaker 100.

Operation when Error Occurs in MFP:

Hereinafter, a description is given of an operation when a job is executed and an error occurs in the MFP 1. When the MFP 1 executes the job and the job is completed without any problems, a completion message (audio and/or text message), such as "Job is completed. Do not forget sheets" is output via the smart speaker 100.

On the other hand, in a case when an error occurs due to a lack of sheet, the AI assistant server 4 provides a job confirmation feedback, such as "There is no sheet. Refill sheet to continue or cancel job" to the smart speaker 100. If the user refills sheets in the MFP 1 and responds with "Continue" in response to receiving this job confirmation feedback, the execution instruction unit 162 of the audio recognition server 3 instructs the MFP 1 to continue the job, and the job is restarted in the MFP 1.

On the other hand, if the user outputs (speaks) "Cancel" in response to receiving this job confirmation feedback, the execution instruction unit 162 of the AI assistant server 4 instructs the MFP 1 to cancel the job, and the execution of the job in the MFP 1 after the error occurrence is canceled. In this case, the job confirmation feedback, such as "Job is cancelled" is output via the smart speaker 100 using audio data and text data.

Figure 30:
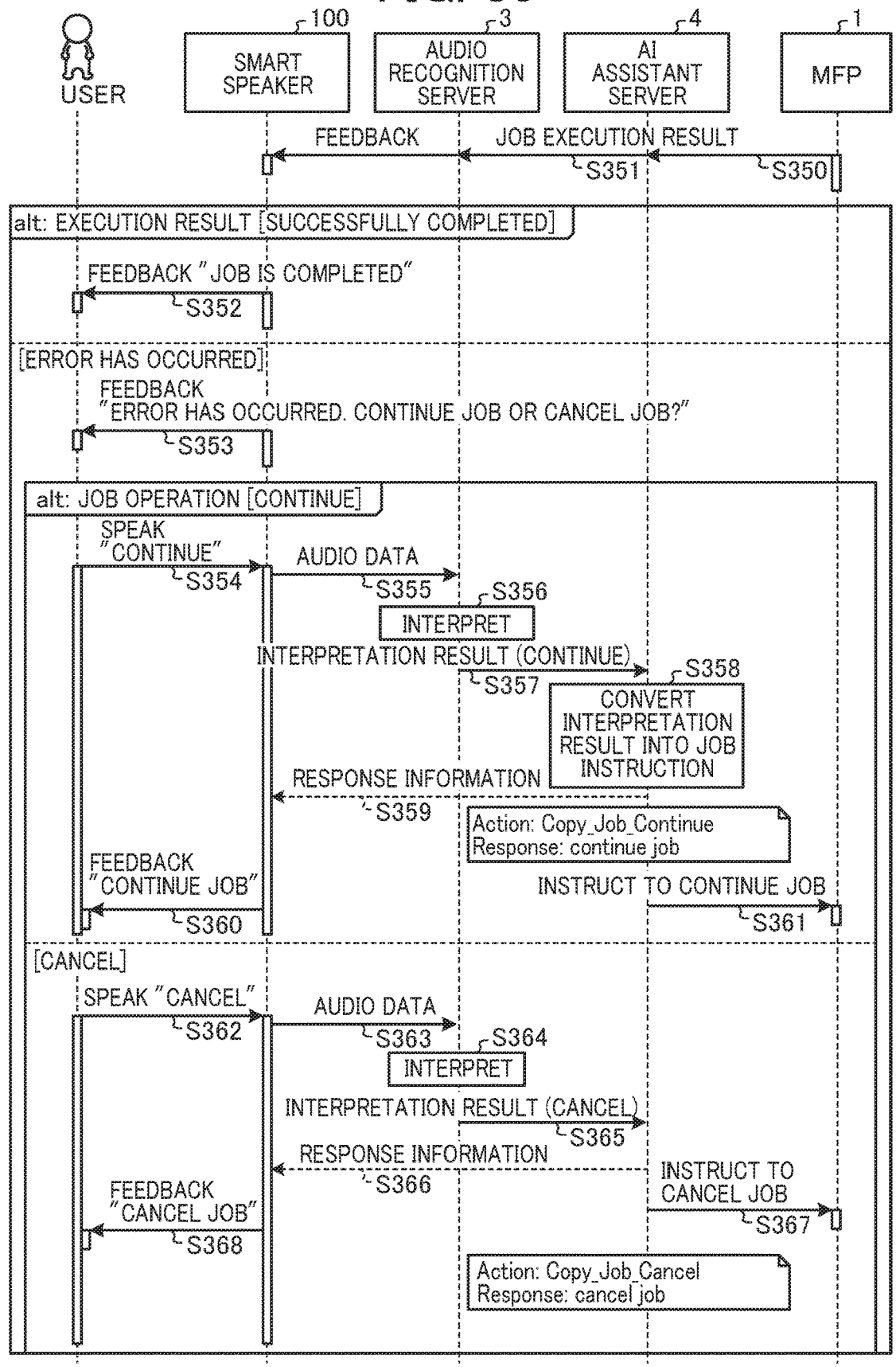
FIG. 30 is a sequence diagram illustrating a flow of an interactive operation when a job is executed and when an error occurs according to the second embodiment.

FIG. 30 is a sequence diagram illustrating a flow of an interactive operation when a job is executed and an error occurs according to the embodiment.

At first, the MFP 1 notifies a job execution result to the AI assistant server 4 (step S350). When the audio recognition server 3 receives the job execution result at the MFP 1 via the AI assistant server 4, the audio recognition server 3 transmits a feedback to the smart speaker 100 (step S351), such as one feedback indicating that the job has been successfully completed (step S352) or another feedback indicating that the error has occurred (step S353).

If the smart speaker 100 receives the execution result indicating that the job has been successfully completed, the feedback unit 153 of the smart speaker 100 outputs, for example, an audio message of "Job is completed" (step S352). On the other hand, if the smart speaker 100 receives the execution result indicating that the error has occurred, the feedback unit 153 of the smart speaker 100 outputs, for example, an audio message of "Error has occurred. Continue job or cancel job?" (step S353).

Specifically, when the job is completed, the MFP 1 transmits a completion notification to the management program of the AI assistant server 4. Further, in a case when the error has occurred, the MFP 1 transmits error information related to the error, such as error contents, to the AI assistant server 4. Further, in response to the information acquired from the MFP 1, the management program of the AI assistant server 4 generates response information including, for example, "Job is completed" or "Error has occurred. Continue job or cancel job?" and transmits the response information to the smart speaker 100 via the audio recognition server 3.

In FIG. 30, steps S354 to S361 indicate a sequence diagram illustrating a flow of operation of each part when the user designates a continuation of job. That is, if the user notices an inquiry of "Error has occurred. Continue job or cancel job?" and the user removes the cause of the error and outputs (speaks) "Continue" (step S354), audio data of "Continue" is transmitted to the audio recognition server 3 (steps S355), and converted into text data by the operation audio conversion program of the audio recognition server 3 as above described, and interpreted by the audio recognition server 3 (step S356).

Then, the operation audio conversion program of the audio recognition server 3 generates an interpretation result setting the Intent of "COPY_JOB_CONTINUE" and transmits the interpretation result to the management program of the AI assistant server 4 (step S357).

Then, the interpretation result conversion unit 161 implemented by the management program of the AI assistant server 4 converts the interpretation result into a job instruction (step S358), and the notification unit 165 implemented by the management program of the AI assistant server 4 generates response information setting "continue job" and transmits the response information to the smart speaker 100 via the audio recognition server 3 (step S359).

Further, the feedback unit 153 of the smart speaker 100 outputs (speaks) an input confirmation feedback of "continue job" (step S360).

Further, the execution instruction unit 162 implemented by the management program of the AI assistant server 4 instructs the MFP 1 to continue the job by transmitting the job instruction (step S361).

On the other hand, in FIG. 30, steps S362 to S368 indicate a sequence diagram illustrating a flow of operation of each part when the user designates cancellation of job. That is, if the user notices an inquiry of "Error has occurred. Continue job or cancel job?" and the user outputs (speaks) "Cancel" as a response (step S362), audio data of "Cancel" is transmitted to the audio recognition server 3 (step S363).

Then, the interpretation unit 157 implemented by the operation audio conversion program of the audio recognition server 3 converts the audio data into text data and interprets the text data (step S364).

Then, the interpretation unit 157 generates an interpretation result setting the Intent of "COPY_JOB_CANCEL" and transmits the interpretation result to the management program of the AI assistant server 4 (step S365). Then, the execution determination unit 164 implemented by the management program of the AI assistant server 4 generates response information of "cancel job."

Then, the notification unit 165 transmits the response information to the smart speaker 100 (step S366).

As a result, the feedback unit 153 of the smart speaker 100 outputs (speaks) an input confirmation feedback of "cancel job" (step S368). Further, the execution instruction unit 54 implemented by the management program of the AI assistant server 4 instructs the MFP 1 to cancel the job (step S367).

Figure 31:
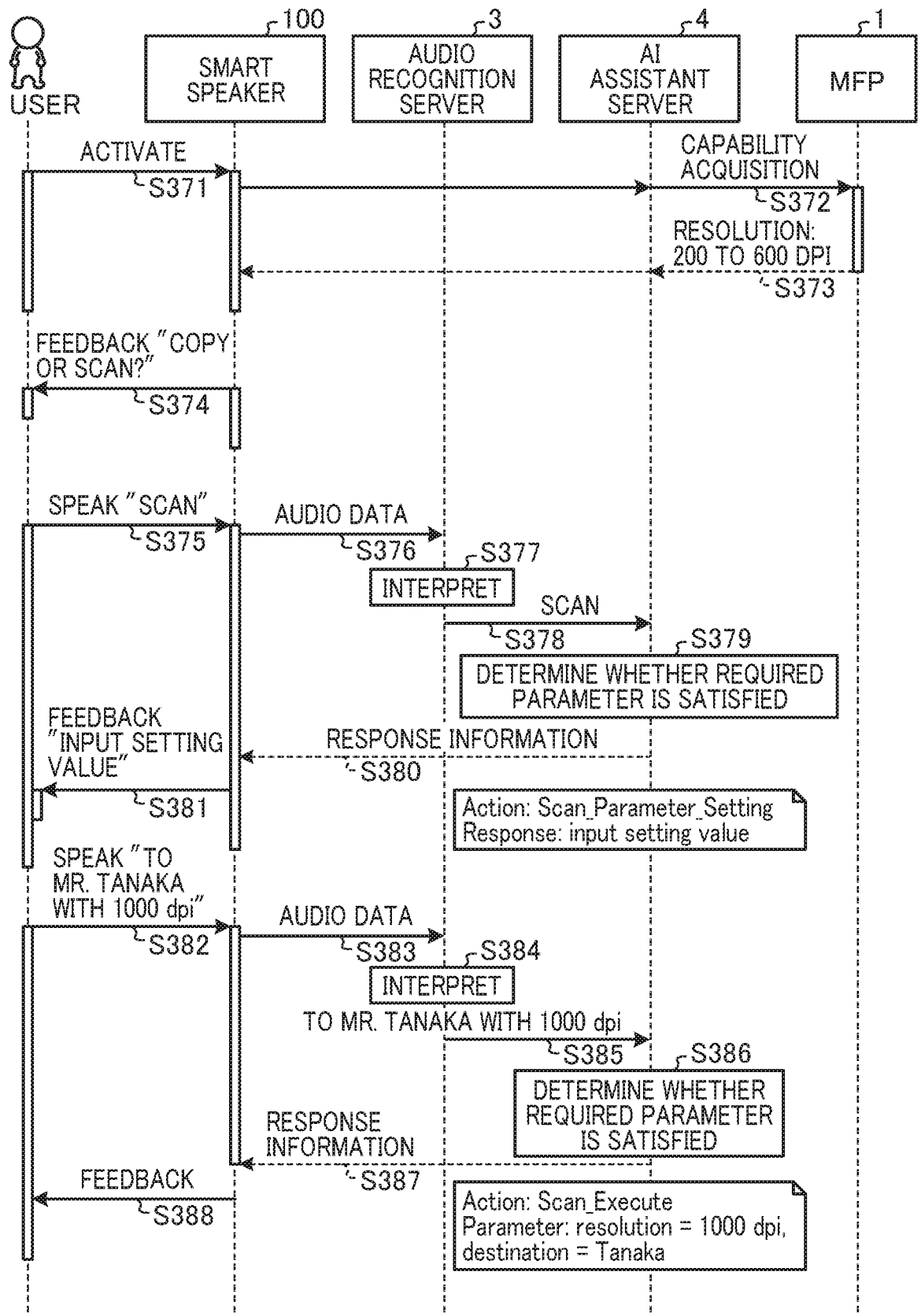
FIG. 31 is a sequence diagram illustrating a flow of an operation of determining whether an MFP has apparatus capability required for a job instructed by a user according to the second embodiment.
Figure 32:
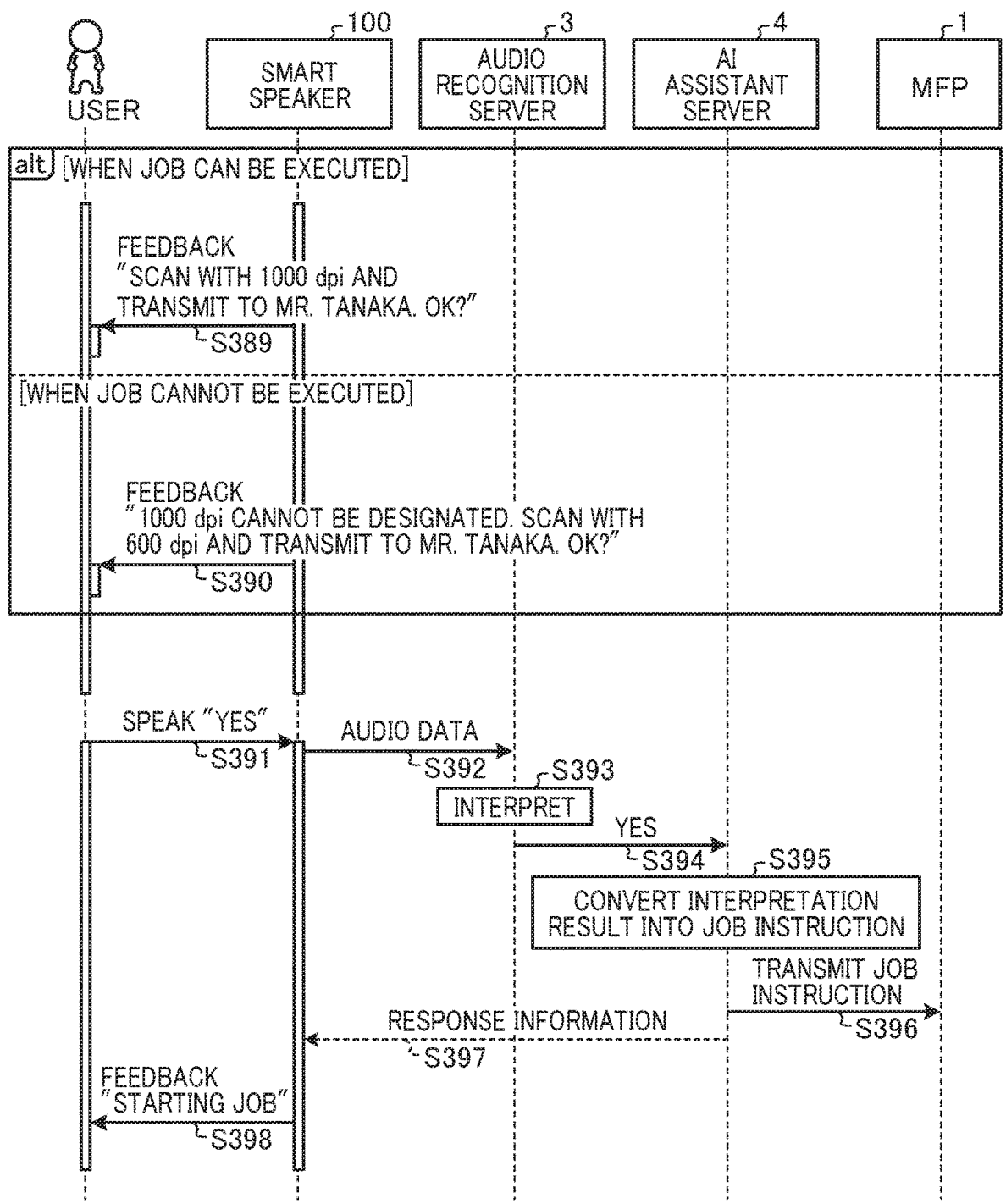
FIG. 32 is a sequence diagram illustrating a flow of operation when a job can be executed and when a job is difficult to execute using apparatus capability of an MFP according to the second embodiment.

Adjustment of Parameter in Line with Apparatus Capability of MFP:

Hereinafter, a description is given of an example of implementing an interactive operation for executing a job in line with apparatus capability of the MFP 1 with reference to sequence diagrams of FIGS. 31 and 32. FIG. 31 is a sequence diagram illustrating a flow of an operation of determining whether the MFP 1 has the apparatus capability required for a job instructed by the user according to the embodiments. FIG. 32 is a sequence diagram illustrating a flow of operation when the job can be executed and when the job is difficult to execute using the apparatus capability of the MFP 1 according to the embodiment.

In the sequence diagram illustrated in FIG. 31, if a user instructs "activate" (step S371) to the smart speaker 100, the apparatus information acquisition unit 163 implemented by the management program of the AI assistant server 4 transmits, for example, an inquiry of a processable resolution to the MFP 1 (capability acquisition: step S372).

In response to this inquiry, the MFP 1 transmits the processable resolution, such as "200 dpi to 600 dpi," to the AI assistant server 4 (step S373). Then, the AI assistant server 4 transmits the information indicating the processable resolution of the MFP 1 to the smart speaker 100. As a result, the resolution of the MFP 1 can be recognized at the smart speaker 100.

The apparatus information acquisition unit 163 of the AI assistant server 4 can acquire the processing capability information from the MFP 1 at a given timing after the communication with the MFP 1 has been established. Further, when registering the smart speaker 100 and the MFP 1 in the management table of the association DB 102, the processing capability information of the MFP 1 can be acquired and registered by the apparatus information acquisition unit 163. Further, the apparatus information acquisition unit 163 of the AI assistant server 4 can be configured to acquire the processing capability information periodically from the MFP 1. Further, the apparatus information acquisition unit 163 can be configured to acquire the processing capability information from the MFP 1 at a timing when the audio recognition server 3 receives the activation of the audio assistant program from the smart speaker 100, or at a timing when the job execution instruction is received from the smart speaker 100.

The acquired processing capability information can be stored in the storage unit such as the HDD 44 of the AI assistant server 4, or can be stored in the management table of the association DB 102 in association with the MFP 1. Further, the processing capability information can be acquired by another program, and then the apparatus information acquisition unit 163 can acquire the processing capability information from another program, in which the apparatus information acquisition unit 163 acquires the processing capability information of the MFP 1 indirectly. Further, the information acquired by the apparatus information acquisition unit 163 from the MFP 1 is not limited to the processing capability information. For example, the apparatus information acquisition unit 163 can acquire information on the type of job and the job setting conditions executable by the MFP 1, such as type and version of application installed on the MFP 1, printing speed, processable file format, connection state of optional devices including a finisher, and the like.

If the user has activated the operation audio processing program of the smart speaker 100 and then the user outputs (speaks), for example, an audio of "activate" (an instruction by audio input), the communication control unit 152 of the smart speaker 100 transmits audio data of "activate" to the audio recognition server 3. As a result, audio data of "activate" is converted into text data by the audio recognition server 3, and an interpretation result of the text data is notified to the AI assistant server 4. Then, the execution determination unit 164 of the AI assistant server 4 determines whether the required parameter is satisfied.

At this timing, since the job type is not yet designated and the required parameter is not satisfied, the AI assistant server 4 transmits response information for prompting an input of the job type, such as "copy or scan?" to the smart speaker 100. In this configuration, the audio feedback unit 153 of the smart speaker 100 outputs (speaks) an audio feedback of "copy or scan?" for prompting the user to enter or input a job instruction (step S374).

Then, if the user outputs (speaks) "scan" (step S375), the smart speaker 100 transmits audio data of "scan" to the audio recognition server 3 (step S376), and then the audio recognition server 3 converts the audio data of "scan" into text data using the operation audio conversion program and interprets the text data (step S377).

Then, the interpretation unit 377 of the audio recognition server 3 generates an interpretation result setting the Intent of "SCAN_EXECUTE" and transmits the interpretation result to the management program of the AI assistant server 4 (step S378).

Then, the execution determination unit 164 of the AI assistant server 4 determines whether the required parameter is satisfied based on the received interpretation result (step S379), in which the scan instruction alone lacks the required parameter. Therefore, the execution determination unit 164 generates response information of "input setting value" and transmits the response information to the smart speaker 100 (step S380).

Based on this response information, the feedback unit 153 of the smart speaker 100 outputs (speaks) an input insufficient feedback of "input setting value" (step S381).

Then, if the user outputs (speaks) "to Mr. Tanaka with 1000 dpi" (step S382) in response to the input insufficient feedback, the smart speaker 100 transmits audio data of "to Mr. Tanaka with 1000 dpi" to the audio recognition server 3 (step S383), and then the audio data of "to Mr. Tanaka with 1000 dpi" is converted into text data and interpreted by the audio recognition server 3 (step S384).

Then, the interpretation unit 157 of the audio recognition server 3 generates an interpretation result setting the Intent of "SCAN_EXECUTE" and the Parameter of "resolution=1000 dpi, destination=Tanaka" and transmits the interpretation result to the management program of the AI assistant server 4 (step S385).

Then, the execution determination unit 164 implemented by the management program of the AI assistant server 4 refers to the Parameter included in the interpretation result and the processing capability information of the MFP 1 acquired in advance by the apparatus information acquisition unit 163 to determine whether the job can be executed at the MFP 1, which is the communication target apparatus, using the settings designated by the user (step S386).

Then, the execution determination unit 164 generates response information corresponding to a determination result, and the notification unit 165 notifies the response information to the smart speaker 100 (step S387).

Thus, a feedback corresponding to the determination result is performed via the smart speaker 100 (step S388).

Specifically, in the sequence diagram illustrated in FIG. 32, if the MFP 1 has the capability of processing the resolution of 1000 dpi, the execution determination unit 164 generates response information of "Scan with 1000 dpi and transmit to Mr. Tanaka. OK?" Then, the notification unit 165 transmits the response information to the smart speaker 100. As a result, the feedback unit 153 of the smart speaker 100 outputs (speaks) an input confirmation feedback of "Scan with 1000 dpi and transmit to Mr. Tanaka. OK?" (step S389).

If the user outputs (speaks) "YES" to the input confirmation feedback as a response (step S391), the smart speaker 100 transmits audio data of "YES" to the audio recognition server 3 (step S392), and then the interpretation unit 157 of the audio recognition server 3 converts the audio data of "YES" into text data and interprets the text data (steps S393).

Then, the interpretation unit 157 generates an interpretation result setting the Intent of "SCAN_EXECUTE" and the Parameter of "resolution=1000, destination=Tanaka" and transmits the interpretation result to the management program of the AI assistant server 4 (step S394).

Then, the interpretation result conversion unit 161 implemented by the management program of the AI assistant server 4 converts the interpretation result into a job instruction (step S395).

Then, the execution instruction unit 162 implemented by the management program transmits the job instruction of "transmit image scanned with 1000 dpi to Mr. Tanaka" to the MFP 1 (step S396). As a result, the designated job is executed in the MFP 1.

Then, the execution determination unit 164 of the AI assistant server 4 generates response information of "starting job" indicating that an execution of the instructed job has been started, and the notification unit 165 transmits the response information to the smart speaker 100 (step S397).

Then, the feedback unit 153 of the smart speaker 100 outputs (speaks) an input confirmation feedback of "starting job" to the user (step S398).

On the other hand, if the resolution of 600 dpi is the upper limit of processing capability of the MFP 1, the image processing using the resolution of 1000 dpi designated by the user is difficult to execute in MFP 1. Based on the processing capability information of the MFP 1 acquired in advance by the apparatus information acquisition unit 163, the execution determination unit 164 of the AI assistant server 4 determines that the image processing designated by the user is difficult to execute in MFP 1. In this case, the execution determination unit 164 generates response information of "1000 dpi cannot be designated. Scanning is performed with 600 dpi and then transmitted to Mr. Tanaka. OK?" (step S390). Then, the notification unit 165 transmits the response information to the smart speaker 100. With this configuration, the smart speaker 100 outputs (speaks) a confirmation feedback of "1000 dpi cannot be designated. Scanning is performed with 600 dpi and then transmitted to Mr. Tanaka. OK?" to the user.

More specifically, the execution determination unit 164 of the AI assistant server 4 can select the function or processing capability value that is the closest to the function or processing capability value designated by the user within a range of processing capability of the MFP 1. For example, if the processable resolution of the MFP 1 is designed in a range of 200 dpi to 600 dpi, the execution determination unit 164 selects 600 dpi, which is the closest to 1000 dpi instructed by the user. Then, the feedback unit 153 of the smart speaker 100 outputs the capability or value selected by the execution determination unit 57 as a confirmation feedback.

That is, if the execution determination unit 164 determines that the job, indicated by the Intent and Parameter included in the interpretation result corresponding to the user instruction, is difficult to execute at the MFP 1, the execution determination unit 164 selects the setting conditions that can be executed at the MFP based on the processing capability information of the MFP 1. Then, the response information is generated based on the selected setting conditions.

Further, the management program of the AI assistant server 4 acquires the device ID (audio-input source device ID) identifying the smart speaker 100 as the audio-input source in addition to the interpretation result from the interpretation unit 157 implemented by the operation audio conversion program of the audio recognition server 3. Therefore, the execution determination unit 164 can refer to the association DB 102 to identify the MFP 1 associated with the audio-input source device ID identifying the smart speaker 100, and then to determine whether the job execution can be performed by referring to the processing capability of the identified MFP 1. Further, if the user instructs the execution of function that is not provided in the identified MFP 1, the execution determination unit 164 can transmit response information indicating that the job cannot be executed to the smart speaker 100. Further, the execution determination unit 164 can transmit information related to the selected setting conditions to the operation audio conversion program of the audio recognition server 3.

If the user outputs (speaks) "YES" in response to the confirmation feedback of step S390 (step S391), the smart speaker 100 transmits audio data of "YES" to the audio recognition server 3 (step S392), and then the text conversion unit 156 of the audio recognition server 3 converts the audio data of "YES" into text data and interprets the text data (step S393).

Then, the interpretation unit 157 of the audio recognition server 3 generates an interpretation result setting the Intent of "SCAN_EXECUTE" and the Parameter of "resolution=600, destination=Tanaka" based on the text data, and transmits the interpretation result to the management program of the AI assistant server 4 (step S394).

Then, the interpretation result conversion unit 161 implemented by the management program of the AI assistant server 4 converts the interpretation result into a job execution instruction of the MFP 1 (step S395).

Then, the execution instruction unit 162 implemented by the management program of the AI assistant server 4 transmits the job execution instruction to the MFP 1 (step S396). As a result, even if the instruction of the user does not fit within the processing capability of the MFP 1, and thereby difficult to execute the job, the contents of the instruction can be automatically changed to an instruction which can be executed within the processing capability of the MFP 1, and then the job instructed by the user can be executed.

In the MFP 1, by referring to the address book stored in the storage unit such as the HDD 13 in the MFP 1, the address information corresponding to "Tanaka" is searched. The transmission destination information includes information, such as an e-mail address, a facsimile number, or the like. If the address information corresponding to "Tanaka" exists in the address book, the image data scanned by the MFP 1 can be transmitted to the transmission destination.

Further, the address information can be displayed using the operation unit 16 of the MFP 1 for prompting the user to confirm whether there is an error in the transmission destination, and then the scanned image data can be transmitted to the transmission destination when the user operates an OK button. Further, if there are two or more addresses exist for "Tanaka" in the address book, all of the relevant transmission destination information can be displayed using the operation unit 16 of the MFP 1 and then selected by the user.

Operation of Searching and Printing Print Target

Figure 33:
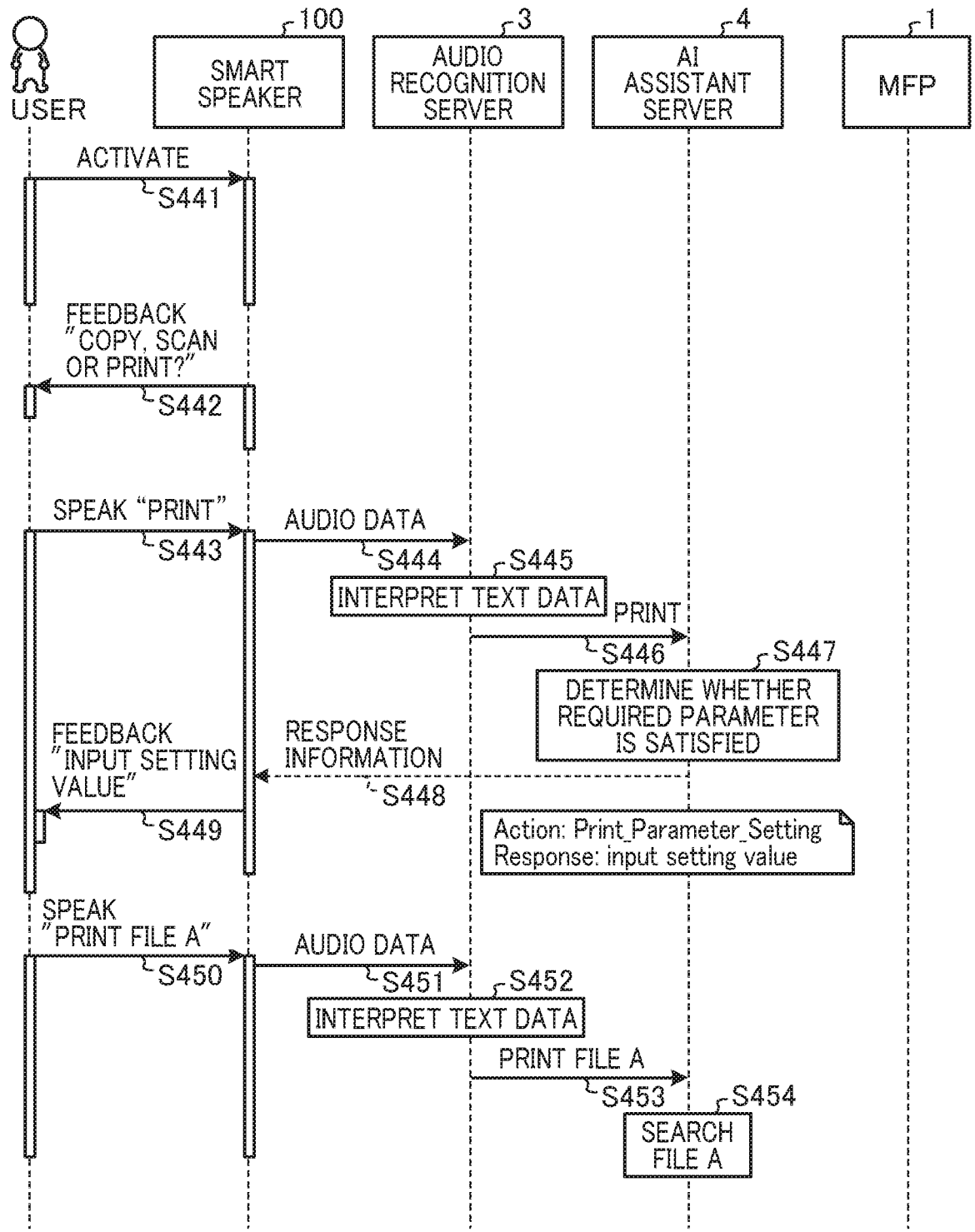
FIG. 33 is a sequence diagram illustrating an operation until a file designated by a user is searched according to the second embodiment.
Figure 34:
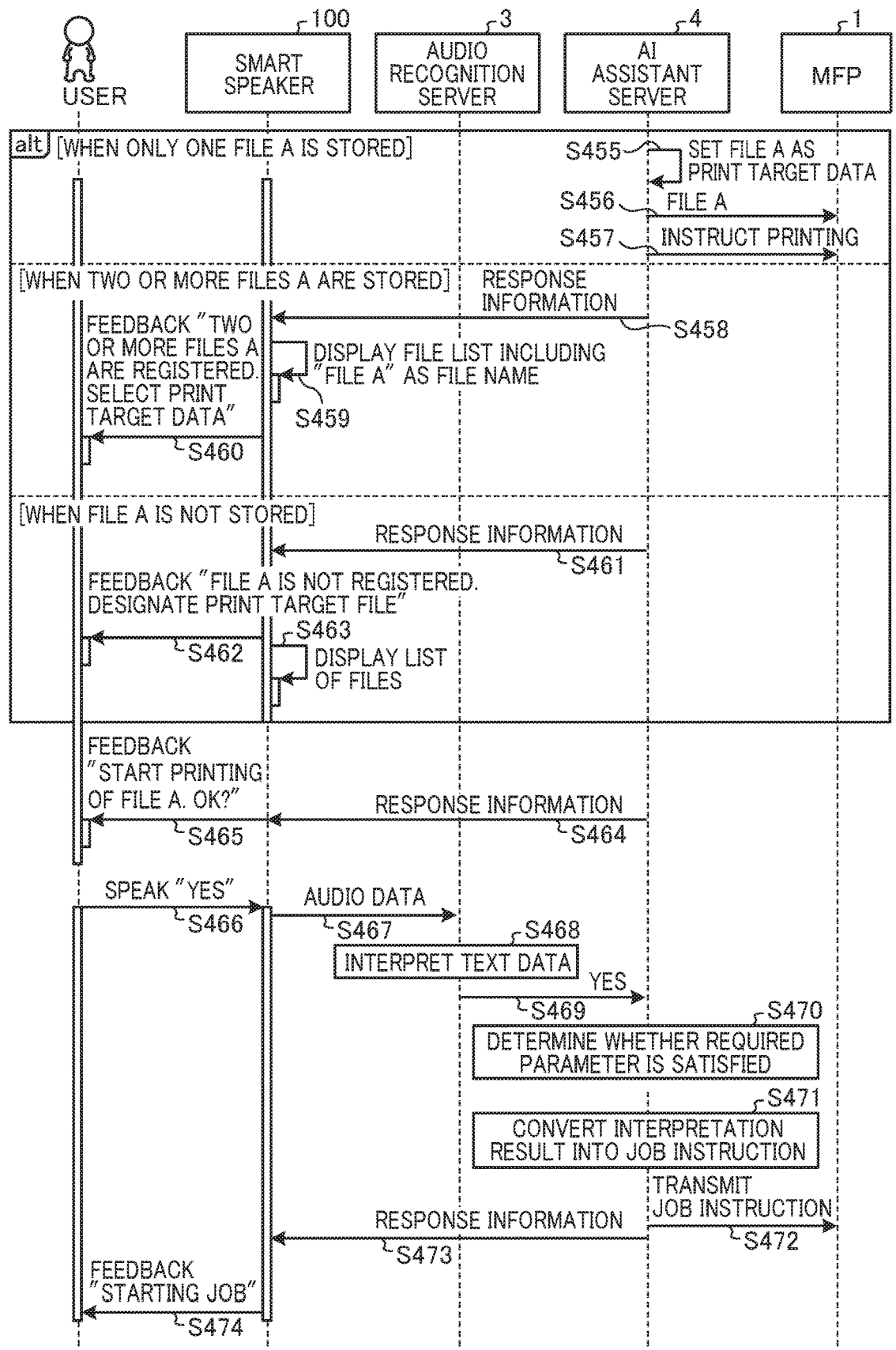
FIG. 34 is a sequence diagram illustrating an operation until a file designated by a user is printed according to the second embodiment.

Hereinafter, a description is given of an operation of printing a file designated by a user using a sequence diagram of FIGS. 33 and 34. FIG. 33 is a sequence diagram illustrating an operation until a file designated by the user is searched according to the second embodiment. FIG. 34 is a sequence diagram illustrating an operation until the file designated by the user is printed according to the second embodiment.

At first, in the sequence diagram of FIG. 33, after the operation audio processing program of the smart speaker 100 is activated, a user instructs, for example, an activation of the audio assistant program by performing, for example, an audio input. Then, the communication control unit 152 of the smart speaker 100 transmits audio data of "activate" to the audio recognition server 3 (step S441). Then, the text conversion unit 156 of the audio recognition server 3 converts the audio data of "activate" into text data, converts the text data into the Intent and Parameter, and transmits the Intent and Parameter to the management program of the AI assistant server 4.

Then, the execution determination unit 164 implemented by the management program of the AI assistant server 4 determines whether the required parameter is satisfied. When the audio data of "activate" is input, for example, the required parameter such as the job type is not yet satisfied, and thereby the execution determination unit 164 generates response information of "copy, scan or print?" for prompting the user to enter or input a job instruction. Then, the notification unit 165 transmits the response information to the smart speaker 100.

Then, the feedback unit 153 of the smart speaker 100 generates an audio feedback of "copy, scan or print?" for prompting the user to enter or input the job instruction (step S442).

Then, if the user outputs (speaks) "print" (step S443), the smart speaker 100 transmits audio data of "print" to the audio recognition server 3 (step S444), and then the audio data of "print" is converted into text data by the text conversion unit 156 implemented by the operation audio conversion program of the audio recognition server 3, and interpreted by the interpretation unit 157 (step S445).

Then, the interpretation unit 157 generates an interpretation result setting the Intent of "PRINT_EXECUTE" and transmits the interpretation result to the management program of the AI assistant server 4 (step S446).

Then, the execution determination unit 164 implemented by the management program of the AI assistant server 4 determines whether the required parameter is satisfied based on the received interpretation result (step S447).

Then, since the "print" instruction alone lacks the required parameter, the execution determination unit 164 generates response information of "input setting value" and transmits the response information to the smart speaker 100 via the notification unit 165 (step S448).

Based on this response information, the feedback unit 153 of the smart speaker 100 outputs (speaks) an input insufficient feedback of "input setting value" (step S449).

Then, if the user outputs (speaks) "print file A" to the input insufficient feedback (step S450), audio data of "print file A" is transmitted to the audio recognition server 3 (step S451).

Then, the audio recognition server 3 convers the audio data into text data and interprets the text the data (step S452), and then generates an interpretation result setting the Intent of "Print_Exetute" and the Parameter of "print target=file A" and transmits the interpretation result to the AI assistant server 4 (step S453).

Then, the search unit 167 implemented by the management program of the AI assistant server 4 searches the file A from the management DB 101 based on the Parameter included in the interpretation result (step S454).

The search area to be searched may be not limited to the management DB 101, but can be a database connected to a cloud service apparatus via a network, such as the audio recognition server 3 and/or the AI assistant server 4. Further, in addition to searching a file name containing a character string included in the Parameter, the search unit 167 can search a file containing the character string, included in the Parameter, in the file data. Further, the search unit 167 can search a file based on attributes of file, such as file creation date and file creator.

When Only One File is Stored:

If the above described searching is performed when only one file A is recorded or stored in the management DB 101, the search unit 167 of the AI assistant server 4 sets the file A as print target data (step S455) in the sequence diagram illustrated in FIG. 34.

Then, the execution instruction unit 162 of the AI assistant server 4 transmits the print target data of the file A to the MFP 1 (step S456) and instructs the MFP 1 to print the print target data of the file A (step S457). As a result, the MFP 1 executes printing of the print target data of the file A.

When Two or More Files are Stored:

On the other hand, if two or more files A are searched from the management DB 101, that is, if a plurality of files is searched as a result of searching by the search unit 167, the execution determination unit 164 of the AI assistant server 4 generates response information of "two or more files A are registered. Select print target data."

Then, the notification unit 165 transmits the response information to the smart speaker 100 (step S458). In step S458, the response information can include information identifying each file, such as file creation date, file creator, and thumbnail image.

Then, the feedback unit 153 of the smart speaker 100 displays a list of searched files on the touch panel 27 based on the response information (step S459).

Further, the feedback unit 153 outputs (speaks) an input insufficient feedback of "two or more files A are registered. Select print target file" (step S460).

Further, to facilitate the selection of a desired file from the searched files displayed as a file list, the file creation and file creator can be fed back using audio, or the file creation and file creator can be displayed on the touch panel 27. Further, the thumbnail images can be displayed as the file list to prompt the user to select the desired thumbnail image.

Further, when the file A is selected, the desired file can be selected by speaking information related to the file, such as file creation date or file creator, or the desired file can be selected by a touching operation on the file list displayed on the touch panel 27.

When File is not Stored:

Further, if the file A designated by the user is not stored in the management DB 101 (the search unit 167 cannot search the file A), the execution determination unit 164 of the AI assistant server generates response information of "file A is not registered in memory." Further, the execution determination unit 164 acquires list information of files stored in the management DB 101 from the management DB 101, and then adds the list information of files in the response information. Then, the notification unit 165 transmits the response information to the smart speaker 100 (step S461) Then, the feedback unit 153 of the smart speaker 100 outputs (speaks) a feedback of "File A is not registered. Designate print target file" based on the response information (step S462).

Concurrently, the feedback unit 153 displays a list of files stored in the management DB 101 on the touch panel 27 based on the list information of files included in the response information (step S463). Then, the user selects a file to be printed based on the list of files to designate the print target file.

Printing of Selected File:

Further, if only one file A exists in the management DB 101 and the user instructs to print the file A, the execution determination unit 164 generates response information of "start printing of file A. OK?" and transmits the response information to the smart speaker 100 (step S464).

Then, the feedback unit 153 of the smart speaker 100 outputs (speaks) a confirmation feedback of "start printing of file A. OK?" (step S465).

If the user outputs (speaks) "YES" to the confirmation feedback (step S466), the response audio data of "YES" is transmitted from the smart speaker 100 to the audio recognition server 3 (step S467).

Then, the text conversion unit 156 of the audio recognition server 3 converts the audio data into text data, and the interpretation unit 157 interprets the text data converted from the audio data (step S468).

Then, the interpretation unit 157 generates an interpretation result setting the Intent of "PRINT_EXECUTE" and the Parameter of "print target=file A, file identification information X," and transmits the interpretation result to the management program of the AI assistant server 4 (step S469). The file identification information X is added as information for identifying the file A selected by the user when two or more files A exist in the management DB 101, and the file identification information X includes, for example, information of file creation date and/or file creator, or the like.

Then, the execution determination unit 164 implemented by the management program of the AI assistant server 4 determines whether the required parameter is satisfied based on the interpretation result (step S470).

In this case, since the required parameters have been set completely, the interpretation result conversion unit 161 converts the interpretation result into a job instruction of the MFP 1 (step S471).

Then, the execution instruction unit 162 transmits the file A selected by the user to the MFP 1 and instructs the MFP 1 to execute the printing of the file A (step S472). As a result, the MFP 1 executes the printing of the file A desired by the user.

When the print execution instruction is transmitted to the MFP 1, the notification unit 165 of the AI assistant server 4 transmits response information of "starting job" indicating that the printing has been started to the smart speaker 100 (step S473).

As a result, the feedback of "starting job" is performed (output) by the feedback unit 153 of the smart speaker 100, and the user is notified that the printing has been started (step S474).

In the above description, the search unit 167 of the AI assistant server 4 searches the print target data (e.g., file data) and transmits the searched file data to the MFP 1, but not limited thereto. For example, the search unit 167 of the AI assistant server 4 can transmit a job instruction setting the "print target=file A" to the MFP 1, and the file A can be searched in the HDD 13 or the management DB 101 in the MFP 1, and printed. Further, if two or more files are searched and exist, a file list can be displayed on a display of the MFP 1, and the user can select one or more files from the file list.

As above described in the second embodiment, the audio-based operation system of the second embodiment installs the operation audio processing program as a platform application program on the smart speaker 100, and the platform application program is executed to communicate with a cloud service apparatus. When the user speaks to the microphone 29 provided for the smart speaker 100, the cloud service apparatus analyzes the content of the user spoken contents and instructs the MFP 1 to perform the operation instructed by the user (audio input operation).

In this configuration, a complicated operation can be instructed using the audio input without operating a graphical user interface (GUI) displayed on the touch panel 27 or the like. Therefore, even if a user familiar with the operation by the GUI of the touch panel, the input operation can be performed further quickly and easily. Further, even if elder persons or users inexperienced in the operation using the GUI of the touch panel are to perform the input operation, the operation desired by the user, such as complicated network setting, advanced job setting and/or installing of a new application can be quickly and easily performed using the interactive operation assistance or support.

Further, since the user intention is analyzed based on the text of the user spoken contents, the AI assistant server 4 can determine the processing contents based on the user spoken contents.

As to the above described embodiments, the information processing system, the information processing apparatus, the information processing method and the information processing program can perform quick and simple input operation by omitting the need for operation using an operation unit such as a display device, with which the input operation can be performed quickly and easily.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

For example, in the above described first embodiment, the text data corresponding to the audio spoken by the user is generated by the audio recognition server 3, and then an operation intended by the user is interpreted based on the text data in the AI assistant server 4, but not limited thereto. For example, the above described audio recognition function and interpretation function can be provided in the mobile terminal 2, in which an operation intended by the user can be interpreted in the mobile terminal 2, and the audio recognition server 3 and the AI assistant server 4 can be omitted, with which the system configuration can be simplified.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. An information processing apparatus comprising circuitry configured to:
  acquire audio information via the information processing apparatus to be used for executing an information processing capability of a remote target apparatus;
  recognize the audio information;
  transmit audio data representing the audio information to at least one remote server;
  receive specific text instruction information corresponding to the acquired audio information from the at least one remote server that includes a job type and a job setting value indicating specific information processing to be instructed to the target apparatus based on a recognition result of the acquired audio information;
  convert the received specific text instruction information into specific operation execution information described in an information format interpretable by the remote target apparatus based on the job type and the job setting value included in the specific text instruction information;
  transmit the specific operation execution information from the information processing apparatus to the remote target apparatus;
  wherein the circuitry provides verbal feedback comprising dot per inch resolution for scan or copy.

2. The information processing apparatus according to claim 1,
  wherein the circuitry detects information processing capability of the target apparatus including identifying the target apparatus and available print job capabilities of the target apparatus,
  wherein the circuitry generates modification information to be used for prompting a modification of the specific text instruction information indicating the specific information processing so that the specific information processing indicated by the specific text instruction information is executable at the target apparatus using the detected information processing capability of the target apparatus, and
  wherein the circuitry outputs a message for prompting the modification of the specific text instruction information based on the generated modification information.

3. The information processing apparatus according to claim 2, further comprising:
  an interface configured to connect with a microphone and a speaker,
  wherein the circuitry acquires the audio information from the microphone via the interface, and outputs audio of the message for prompting the modification of the specific text instruction information from the speaker via the interface.

4. The information processing apparatus according to claim 2,
  wherein the circuitry determines whether the specific text instruction information is insufficient for operating the target apparatus,
  wherein the circuitry outputs an instruction for prompting an input of the specific text instruction information determined to be insufficient, and
  wherein, in response to an input of all of the specific text instruction information required for operating the target apparatus, the circuitry confirms the input of all of the specific text instruction information required for operating the target apparatus, converts the specific text instruction information to the specific operation execution information for operating the target apparatus, and outputs the specific operation execution information to the target apparatus.

5. The information processing apparatus according to claim 2, wherein the circuitry acquires information indicating a type and a function of the remote target apparatus for which communication has been established.

6. The information processing apparatus according to claim 1,
  wherein the circuitry converts the audio information into text information, and
  wherein the circuitry obtains the specific text instruction information from the text information.

7. The information processing apparatus according to claim 1,
  wherein the circuitry obtains print target information instructed by the specific text instruction information from a memory, and
  wherein the circuitry outputs the detected print target information to the target apparatus together with the specific operation execution information.

8. The information processing apparatus according to claim 1, wherein the circuitry outputs, together with the specific operation execution information, an electronic mail address used as a transmission destination of image information generated by the target apparatus.

9. The information processing apparatus according to claim 1,
wherein the circuitry of the information processing apparatus transmits audio data of the acquired audio information to the at least one remote server and transmits an audio-to-text conversion request to the at least one remote server.

10. A method of processing information, the method comprising:
acquiring audio information via an information processing apparatus to be used for executing an information processing capability of a remote target apparatus;
recognizing the audio information;
transmitting audio data representing the audio information to at least one remote server;
receiving specific text instruction information corresponding to the acquired audio information from the at least one remote server that includes a job type and a job setting value indicating specific information processing to be instructed to the target apparatus based on a recognition result of the acquired audio information;
converting the received specific text instruction information into specific operation execution information described in an information format interpretable by the target apparatus based on the job type and the job setting value included in the specific text instruction information;
transmitting the specific operation execution information to the remote target apparatus;
wherein the circuitry provides verbal feedback comprising dot per inch resolution for scan or copy.

11. A non-transitory computer readable storage medium storing one or more instructions that, when performed by one or more processors, cause the one or more processors to execute a method of processing information, the method comprising:
acquiring audio information via an information processing apparatus to be used for executing an information processing capability of a remote target apparatus;
recognizing the audio information;
transmitting audio data representing the audio information to at least one remote server:
receiving specific text instruction information corresponding to the acquired audio information from the at least one remote server that includes a job type and a job setting value indicating specific information processing to be instructed to the target apparatus based on a recognition result of the acquired audio information;
converting the received specific text instruction information into specific operation execution information described in an information format interpretable by the target apparatus based on the job type and the job setting value included in the specific text instruction information;
transmitting the specific operation execution information to the remote target apparatus;
wherein the circuitry provides verbal feedback comprising dot per inch resolution for scan or copy.

\* \* \* \* \*